(12) United States Patent
Namizuka et al.

(10) Patent No.: US 7,038,818 B2
(45) Date of Patent: May 2, 2006

(54) METHOD AND APPARATUS FOR IMAGE PROCESSING METHOD, AND A COMPUTER PRODUCT

(75) Inventors: Yoshiyuki Namizuka, Tokyo (JP); Yuji Takahashi, Tokyo (JP); Hiroyuki Kawamoto, Tokyo (JP); Hideto Miyazaki, Tokyo (JP); Shinya Miyazaki, Tokyo (JP); Takeharu Tone, Tokyo (JP); Fumio Yoshizawa, Tokyo (JP); Hiroaki Fukuda, Tokyo (JP); Rie Ishii, Tokyo (JP); Sugitaka Oteki, Tokyo (JP); Yasuyuki Nomizu, Tokyo (JP)

(73) Assignee: Ricoh Company, LTD, Tokyo (JP)

( * ) Notice: Subject to any disclaimer, the term of this patent is extended or adjusted under 35 U.S.C. 154(b) by 859 days.

(21) Appl. No.: 09/748,262

(22) Filed: Dec. 27, 2000

(65) Prior Publication Data
US 2001/0015821 A1    Aug. 23, 2001

(30) Foreign Application Priority Data
Dec. 27, 1999    (JP)    ................................ 11-371897
Jan. 17, 2000    (JP)    ............................. 2000-008375

(51) Int. Cl.
*H04N 1/00*    (2006.01)
*H04N 1/32*    (2006.01)

(52) U.S. Cl. ...................... 358/468; 358/404; 358/444

(58) Field of Classification Search ................ 358/468, 358/404, 444, 448, 401, 471, 451, 452, 449
See application file for complete search history.

(56) References Cited

U.S. PATENT DOCUMENTS

| | | | | |
|---|---|---|---|---|
| 5,050,221 A | | 9/1991 | Ohta et al. ...................... 382/9 |
| 5,245,444 A | * | 9/1993 | Hashimoto ................... 358/445 |
| 5,987,274 A | * | 11/1999 | Satoh ........................... 399/69 |
| 5,987,494 A | * | 11/1999 | Ouchi ......................... 718/107 |
| 6,041,139 A | | 3/2000 | Okubo et al. ................ 382/266 |
| 6,088,476 A | * | 7/2000 | Shimamura ................. 382/164 |
| 6,151,457 A | | 11/2000 | Kawamoto ................. 358/1.14 |
| 6,393,164 B1 | * | 5/2002 | Shimizu et al. ............. 382/325 |
| 6,750,908 B1 | * | 6/2004 | Kubo ....................... 348/231.1 |
| 6,862,101 B1 | * | 3/2005 | Miyazaki et al. .......... 358/1.13 |
| 6,900,909 B1 | * | 5/2005 | Namizuka et al. ........... 358/2.1 |

FOREIGN PATENT DOCUMENTS

| | | |
|---|---|---|
| JP | 06-282639 | 10/1994 |
| JP | 8-274986 | 10/1996 |
| JP | 10-28189 | * 1/1998 |

(Continued)

OTHER PUBLICATIONS

U.S. Appl. No. 09/024,290, filed Feb. 17, 1998, Allowed.

(Continued)

*Primary Examiner*—Jerome Grant, II
(74) *Attorney, Agent, or Firm*—Oblon, Spivak, McClelland, Maier & Neustadt, P.C.

(57) ABSTRACT

The image processing apparatus comprises an image data control section and a system controller. The image data control section is connected to any one or more of a sensor board unit, an image-memory access control section, an image processor, a video data control section, and a facsimile control unit. The system controller switches, when the image data to be transmitted to the image data control section conflicts with one another, a transmission mode of the image data in conflict with one another. Further, the image-memory access control section and the image processor share jobs of performing image processing on the image data.

42 Claims, 40 Drawing Sheets

FOREIGN PATENT DOCUMENTS

| | | |
|---|---|---|
| JP | 2789560 | 6/1998 |
| JP | 11-215272 | 8/1999 |
| JP | 11-284835 | 10/1999 |
| JP | 11-311927 | 11/1999 |

OTHER PUBLICATIONS

U.S. Appl. No. 09/122,108, filed Jul. 24, 1998, Pending.
U.S. Appl. No. 09/161,225, filed Sep. 28, 1998, Pending.
U.S. Appl. No.09/266,800, filed Mar. 12, 1999, Pending.
U.S. Appl. No. 09/262,317, filed Mar. 4, 1999, Pending.
U.S. Appl. No. 09/348,631, filed Jul. 6, 1999, Pending.
U.S. Appl. No. 09/437,088, filed Nov. 9, 1999, Pending.
U.S. Appl. No. 09/443,889, filed Nov. 19, 1999, Pending.
U.S. Appl. No. 09/468,954, filed Dec. 22, 1999, Pending.
U.S. Appl. No. 09/484,254, filed Jan. 18, 2000, Pending.
U.S. Appl. No. 09/551,509, filed Apr. 17, 2000, Pending.
U.S. Appl. No. 09/748,262, filed Dec. 27, 2000, Namizuka et al.
U.S. Appl. No. 10/360,749, filed Feb. 10, 2003, Namizuka.
U.S. Appl. No. 10/716,429, filed Nov. 20, 2003, Nomizu et al.
U.S. Appl. No. 10/797,129, filed Mar. 11, 2004, Nomizu.
U.S. Appl. No. 10/641,049, filed Aug. 15, 2003, Nomizu.
U.S. Appl. No. 09/748,262, filed Dec. 17, 2000, Namizuka et al.
U.S. Appl. No. 10/647,337, filed Aug. 26, 2003, Sakuyama et al.
U.S. Appl. No. 10/646,754, filed Aug. 25, 2003, Kodama et al.
U.S. Appl. No. 10/632,957, filed Aug. 4, 2003, Namizuka.
U.S. Appl. No. 10/393,945, filed Mar. 24, 2003, Namizuka.
U.S. Appl. No. 10/659,349, filed Sep. 11, 2003, Nomizu et al.
U.S. Appl. No. 10/663,804, filed Sep. 17, 2003, Togami et al.
U.S. Appl. No. 10/682,121, filed Oct. 10, 2003, Hara et al.
U.S. Appl. No. 10/691,623, filed Oct. 24, 2003, Hara et al.
U.S. Appl. No. 10/687,625, filed Oct. 20, 2003, Kawamoto et al.
U.S. Appl. No. 10/668,360, filed Sep. 24, 2003, Ohyama et al.
U.S. Appl. No. 10/703,509, filed Nov. 10, 2003, Nomizu et al.
U.S. Appl. No. 10/716,463, filed Nov. 20, 2003, Kodama et al.
U.S. Appl. No. 10/663,784, filed Sep. 17, 2003, Shirata et al.

* cited by examiner

FIG.41
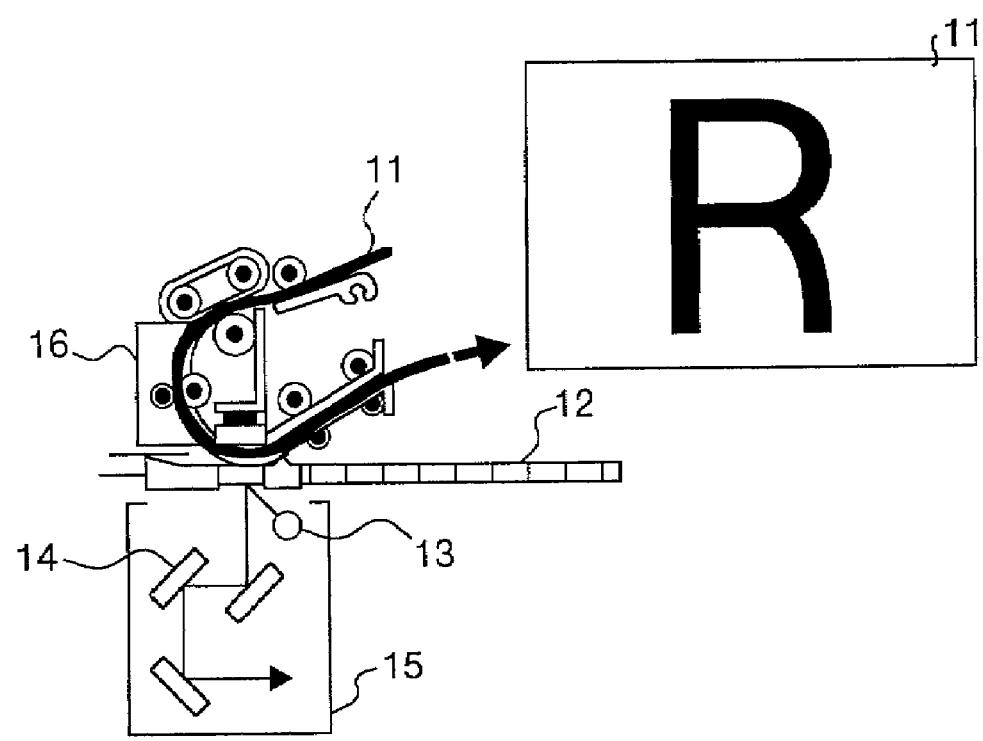
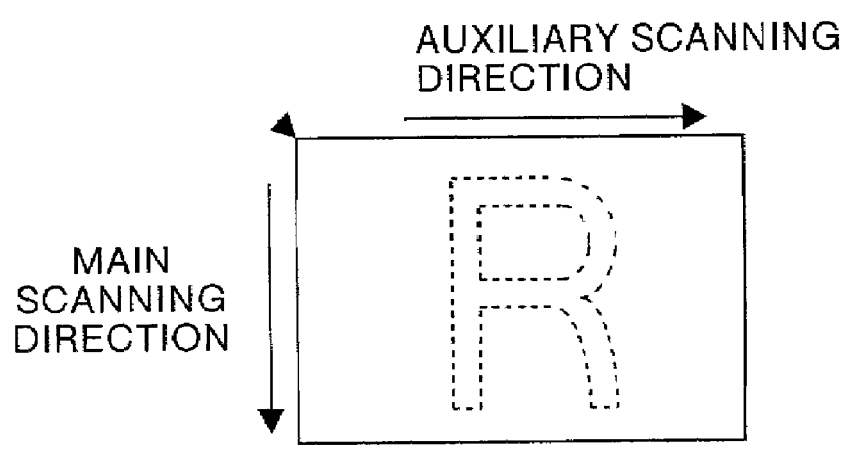

ns mechanism using a sheet-through type auto document feeder.

METHOD AND APPARATUS FOR IMAGE PROCESSING METHOD, AND A COMPUTER PRODUCT

FIELD OF THE INVENTION

The present invention in general relates to a technology of processing digital image data. More particularly, this invention relates to processing image data obtained by a digital multifunction machine.

BACKGROUND OF THE INVENTION

There have been a copier and a scanner as a device to optically scan a document. A system for scanning a document used in these devices includes a platen system using a document scanning unit and a system using a sheet-through type auto document feeder (ADF).

FIG. 40 schematically shows a scanning mechanism by an ordinary document scanning unit. In the platen system, a document 11 to be scanned is placed on a contact glass 12. A carriage 15 with an irradiation lamp 13 and a mirror group 14 is moved along the document 11 to scan in the surface of the document. The carriage 15 is driven by a stepping motor not shown.

In this platen system, a movement rate of the carriage 15 with respect to the document 11 is controlled at the time of scanning the document. Thereby, the number of lines to be optically scanned per unit distance in the movement direction of the carriage 15 (this is referred to as auxiliary scanning direction) is controlled.

In other words, when a document enlarged with respect to the original document 11 is to be output, the carriage 15 is controlled so as to move slower than in a case where a size ratio between the original document 11 and the output document is 1:1. When the carriage 15 moves slower, the number of lines to be scanned per unit distance in the auxiliary scanning direction increases.

When the document 11 is reduced in size, the carriage 15 is controlled so as to move faster. When the carriage 15 moves faster, the number of lines to be scanned in the auxiliary scanning direction decreases. The scaling processing allows the document to be enlarged or reduced in the auxiliary scanning direction in such a manner as explained above. On the other hand, in the direction crossing the auxiliary scanning direction (this is referred to as main scanning direction), by performing electrical scaling processing on one-line data, enlargement or reduction is carried out.

In general, an electrical document size sensor is provided in a copier. This sensor detects the document size before the carriage 15 starts to move, that is, before the document 11 is scanned. Therefore, when a paper size scaling function is selected, the rate of scaling from the document size to a paper size is calculated before starting to scan-in the document.

For example, even if a document of any of various sizes such as A3, B4, A4, or B5 is placed on the contact glass 12 in portrait or landscape orientation, a process controller calculates parameters to control scaling before the carriage 15 starts to move. That is, the movement rate of the carriage 15 is controlled based on the parameters.

FIG. 41 schematically shows a scanning mechanism by an ordinary sheet-through type auto document feeder. In this case, a document 11 to be scanned is conveyed by a sheet-through type auto document feeder 16 with a document feeding mechanism so that the document 11 automatically passes through a scanning position.

During the processing, the carriage 15 remains fixed to the scanning position. That is, in the case of using the platen system, the carriage 15 is moved along the document 11 at a standstill, while in the case of using the sheet-through type auto document feeder 16, the document 11 moves toward the carriage 15 at a standstill.

The movement rate of the document 11 is controlled by the stepping motor not shown. When the document 11 is to be enlarged or reduced in the document feeding direction (which is the auxiliary scanning direction), the movement rate of the document 11 is controlled. That is, in the same manner as the platen system, enlargement or reduction is performed by changing a relative rate for movement between the document 11 and the cartridge 15.

When the sheet-through type auto document feeder 16 is used, a document size is detected by a mechanical sensor. In this case, the document size in the auxiliary scanning direction is detected at the point of time when scanning of the document 11 is finished. That is, at the time before the document is started to be scanned, the size of the document 11 in the auxiliary scanning direction is unknown. Therefore, it is impossible to calculate parameters to control scaling before the document 11 is started to be scanned. Accordingly, a feeding rate of the document 11 according to an enlargement ratio or a reduction ratio can not be controlled.

The same holds true for the direction crossing the auxiliary scanning direction (which is the main scanning direction). A document size in the main scanning direction is detected at the point of time the document 11 reaches a sensor position. Therefore, when there are documents 11 of various sizes, it is impossible to calculate parameters for controlling scaling before starting to scan the document.

The image of the document 11 scanned by the sheet-through type auto document feeder 16 is related, as a mirror image, to the image obtained in the platen mode in the main scanning direction. Therefore, at the time of outputting the image, the processing for mirroring, that the image is reversed left to right, is performed on the image.

Nowadays the copiers include a digital copier as against the conventional analog copier. The digital copier optically scans paper document or the like, and converts the scanned image signal to a digital image signal to perform image processing. Further, the digital copier includes a digital multifunction machine that has functions of a scanner, a printer, and a facsimile other than the copying function.

Some of the digital copiers and the digital multifunction machines (hereafter referred to as digital multifunction machine etc.) enlarge or reduce an image by performing electrical scaling processing on a digital image signal instead of its enlargement or reduction by mechanical control as explained above.

An example of such a device is disclosed in Japanese Patent No. 2789560. Further, as a digital multifunction machine, "Image processing device" concerning image processing of a scanned signal, storage of images in memory, and concurrent operation of a plurality of functions has been disclosed in JP, H08-274986A, for example.

Conventionally, however, there has not been proposed any device, in a document scanning mechanism using the sheet-through type auto document feeder, which can automatically duplicate documents of various sizes while enlarging or reducing each of them. This is because, scaling size can not be determined in the conventional document scanning mechanism since document size can not be determined before starting the scanning of the document.

A method for realizing a device which can automatically duplicate documents of various sizes while enlarging or reducing each of them in the document scanning mechanism using the sheet-through type auto document feeder are known. However, this method requires to perform concurrent operation in processing units by making use of image memory. In this case, system configuration becomes complicated such as increase of the number of ports for transmitting image data or the like in order to effectively perform concurrent operation.

SUMMARY OF THE INVENTION

It is one object of this invention to provide a technology so that it becomes possible to effectively perform processing on image data when concurrent operation is performed.

It is another object of this invention to provide a technology so that it becomes possible to reduce the number of ports for transmitting image data and effectively transmit image data during concurrent operation.

As explained above, according to one aspect of this invention, when image data to be processed by different operation is transmitted or received, the image data can effectively be transmitted or received by avoiding corrosion of these image data, so that the time for its transmission or reception can be reduced.

Further, pre-processing for image processing can be performed on image data to be stored, or image data stored in the memory before it is transmitted to another unit.

Further, one of the units shares a part of the image processing that another unit (e.g., image processing unit) should perform, so that the load on the unit can be reduced by the shared amount and the time for processing as overall processing can be reduced.

Further, one of the units shares a part of the image processing that another unit (e.g., image processing unit) should perform, so that the load on the unit can be reduced by the shared amount and the time for processing as overall processing can be reduced.

Further, image data in conflict with one another can effectively be transmitted, so that the time for its transmission or reception can be reduced.

Further, the image processing can effectively be performed on image data in conflict with one another, so that the time for processing can be reduced.

Further, discrete units can share controls for the switching unit and controls for the image processing unit.

According to another aspect of this invention, image data in conflict with one another can be multiplexed for its transmission between units. Accordingly, the number of ports for transmitting image data can be reduced, thus, it is possible to obtain the image processing apparatus which can effectively transmit image data during concurrent operation.

According to still another aspect of this invention, image data in conflict with one another can be multiplexed for its transmission between units, and discrete image data can be extracted from the multiplexed image data. Accordingly, the number of ports for transmitting image data can be reduced, thus, it is possible to obtain the image processing method in which image data can effectively be transmitted during concurrent operation.

According to still another aspect of this invention, image data in conflict with one another can be multiplexed for its transmission to another unit. Accordingly, the number of ports for transmitting image data can be reduced, thus, it is possible to obtain the image processing method in which image data can effectively be transmitted during concurrent operation.

According to still another aspect of this invention, by recording the program for making a computer execute the method according to the invention in a recording medium, the method according to the present invention can be easily realized on a computer.

Other objects and features of this invention will become apparent from the following description with reference to the accompanying drawings.

BRIEF DESCRIPTION OF THE DRAWINGS

FIG. 41 schematically shows a scanning mechanism by an ordinary sheet-through type auto document feeder.

DESCRIPTION OF THE PREFERRED EMBODIMENTS

Figure 1:
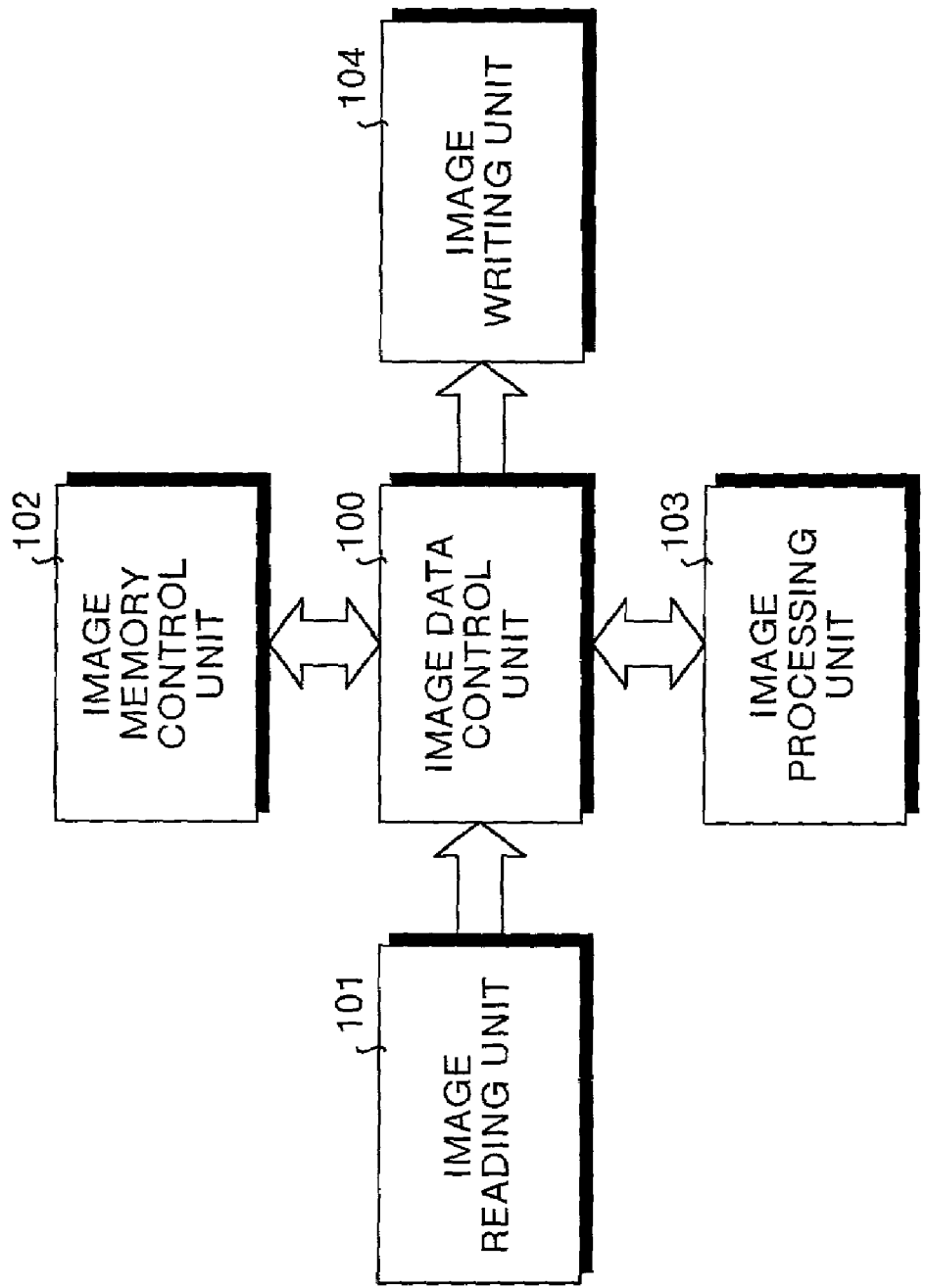
FIG. 1 is a block diagram functionally showing a configuration of an image processing apparatus according to an embodiment of this invention.

A preferred embodiment of the image processing apparatus according to this invention will be explained in detail below with reference to the attached drawings. Principles of the image processing apparatus of the embodiment will be explained first. FIG. 1 is a block diagram functionally showing a configuration of the image processing apparatus according to the embodiment of this invention.

This image processing apparatus comprises an image data control unit 100, an image reading unit 101, an image memory control unit 102, an image processing unit 103, and an image writing unit 104. The image reading unit 101, the image memory control unit 102, the image processing unit 103, and the image writing unit 104 are connected to the image data control unit 100.

The image reading unit 101 reads a document to obtain image data. The image memory control unit 102 writes or reads image data in or from image memory for storing image data. The image processing unit 103 subjects image data to image processing such as processing or editing. The image writing unit 104 writes image data onto paper or the like. Image data control unit 100:

The image data control unit 100 performs, for example, following processing:

(1) Data compression to improve data transmission efficiency on the bus (Primary compression)
(2) Transfer of the primarily compressed data to image data
(3) Image synthesis (Image data from a plurality of units can be synthesized. Further, the synthesis includes image synthesis on the data bus.)
(4) Image shift (Shift of an image in a main scanning direction and an auxiliary scanning direction)
(5) Expansion of an image area (Image area can be expanded to its periphery by an arbitrary amount.)
(6) Image scaling (Scaling fixed to 50% or 200%, for example)
(7) Parallel bus/interface processing
(8) Serial bus/interface processing (Interface to a process controller 211 explained later)

(9) Format conversion between parallel data and serial data
(11) Interface processing to the image reading unit 101
(12) Interface processing to the image processing unit 103

Image Reading Unit 101:

The image reading unit 101 performs, for example, following processing:
(1) Scanning light reflected off a document by an optical system
(2) Conversion of data to electric signals in a photoreceptor
(3) Digitization in an A/D converter
(4) Shading correction (Correction to nonuniformity in illumination distribution of a light source)
(5) Scanner γ-correction (Correction to density characteristics in the scanning system)

Image Memory Control Unit 102:

The image memory control unit 102 performs, for example, following processing:
(1) Control for interface to the system controller
(2) Parallel bus control (Control for interface to the parallel bus)
(3) Network control
(4) Serial bus control (Control for a plurality of external serial ports)
(5) Internal bus interface control (Control for commands with the operation section)
(6) Local bus control (Control for access to ROM, RAM, and font data to start up the system controller)
(7) Control for operation of memory module (Controls for write/read of data in/from the memory module, or the like)
(8) Control for access to the memory module (Processing for controlling memory-access requests from a plurality of units)
(9) Data compression/decompression (Processing for reducing data amounts to make effectively use of the memory)
(10) Image editing (Clearing of data in a memory area, rotation of image data, and image synthesis on the memory, or the like)

Figure 2:
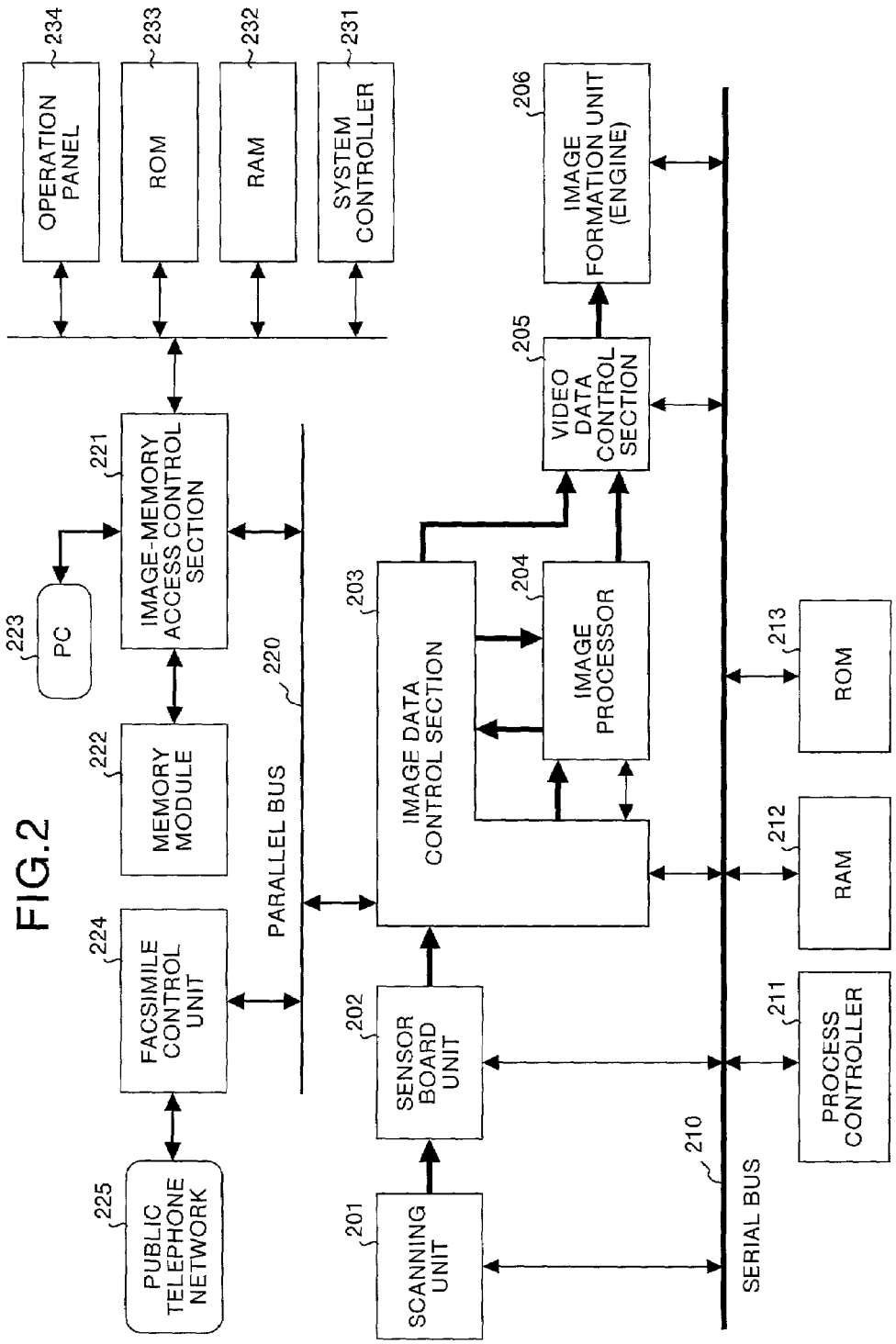
FIG. 2 is a block diagram showing an example of hardware configuration of the image processing apparatus according to the embodiment.

Image Processing Unit 103:

The image processing unit 103 performs, for example, following processing:
(1) Shading correction (Correction to nonuniformity in illumination distribution of the light source)
(2) Scanner γ-correction (Correction to density characteristics in the scanning system)
(3) MTF correction
(4) Smoothing
(5) Scaling to an arbitrary size in the main scanning direction
(6) Density conversion (γ conversion: corresponding to a density notch)
(7) Simple multi-value processing
(8) Simple binarization
(9) Error diffusion
(10) Dithering
(11) Phase control for dot arrangement (dots aligned on the right, dots aligned on the left)
(12) Removal of isolated points
(13) Separation of image area (Determination of color, determination of an attribute, processing for adaptation)
(14) Density conversion Image Writing Unit 104:

The image writing unit 104 performs, for example, following processing:
(1) Edge smoothing (Jaggy correction)
(2) Correction for re-arrangement of dots
(3) Pulse control for image signals
(4) Format conversion between parallel data and serial data The hardware configuration when the image processing apparatus according to the embodiment is the digital multifunction machine is explained below. FIG. 2 is a block diagram showing an example of hardware configuration in the image processing apparatus according to the embodiment.

The image processing apparatus according to the embodiment comprises a scanning unit 201, a sensor board unit 202, an image data control section 203, an image processor 204, a video data control section 205, and an image formation unit (engine) 206. The image processing apparatus also comprises a serial bus 210, a process controller 211, RAM 212, and ROM 213.

The scanning unit 201, the sensor board unit 202, the image data control section 203, the video data control section 205, the image formation unit 206, the process controller 211, the RAM 212, and the ROM 213 are connected to one another via the serial bus 210. The image processor 204 is connected to the image data control section 203 and the video data control section 205.

The image processing apparatus further comprises a parallel bus 220, an image-memory access control section 221, a memory module 222, and a facsimile control unit 224. The image-memory access control section 221, the facsimile control unit 224, and the image data control section 203 are connected to one another via the parallel bus 220.

The memory module 222 is connected to the image-memory access control section 221. The image-memory access control section 221 is connected to an external PC (personal computer) 223. The facsimile control unit 224 is connected to a public telephone network (PN) 225.

The image processing apparatus also comprises a system controller 231, RAM 232, ROM 233, and an operation panel 234. The system controller 231, the RAM 232, the ROM 233, and the operation panel 234 are connected to the image-memory access control section 221.

Correspondence between the components 201 to 206, 221, and 222 shown in FIG. 2 and the respective units 100 to 104 shown in FIG. 1 is as follows. The scanning unit 201 and the sensor board unit 202 have a function of the image reading unit 101 which is a document scanning unit (see FIG. 1). The image data control section 203 has a function of the image data control unit 100 (see FIG. 1). The image processor 204 has a function of the image processing unit 103 (see FIG. 1).

The video data control section 205 and the image formation unit 206 have a function of the image writing unit 104 (see FIG. 1) as an output unit. The image-memory access control section 221 and the memory module 222 have a function of the image memory control unit 102 (see FIG. 1). The memory module 222 has a function of a storage unit.

The contents of each component of the image processing apparatus as shown in FIG. 2 are explained below. The scanning unit 201, that optically scans in a document, comprises a lamp, a mirror, and a lens which are not particularly shown in the figure. The scanning unit 201 allows reflection light on the document due to irradiation from the lamp to be focused to a photoreceptor by the mirror and the lens.

The photoreceptor is configured with a CCD (Charge Coupled Device). The CCD is mounted on the sensor board unit 202. The CCD converts an optical signal reflected by the document into an electric signal. The sensor board unit 202 converts the image data, which has been converted to electric signals, to digital signals, and outputs the converted signals to the image data control section 203.

The image data control section 203 controls transmission of the image data between functional devices (processing units) and data buses. The image data control section 203 performs image-data transfer between the sensor board unit 202, the parallel bus 220, and the image processor 204, and also performs image-data communications between the process controller 211 and the system controller 231 that controls the overall image processing apparatus. The RAM 212 is used as a work area of the process controller 211. The ROM 213 stores a boot program or the like of the process controller 211.

The image data control section 203 transfers the image data sent from the sensor board unit 202 to the image processor 204. The image processor 204 corrects signal degradation (signal degradation in a scanner system) due to the optical system and during quantization of the image data to digital signals. Thus, the image processor 204 has a function of an image processing unit. The image processor 204 corrects signal degradation, and then transfers again the image data to the image data control section 203.

The image-memory access control section 221 controls writing or reading of the image data in or from the memory module 222. The image-memory access control section 221 also controls operations of the respective components connected to the parallel bus 220. The RAM 232 is used as a work area of the system controller 231. The ROM 233 stores a boot program or the like of the system controller 231.

The operation panel 234 is used for inputting processing that has to be done by the image processing apparatus. For example, a type of processing (duplication, facsimile transmission, image scanning, or printing) and a number of copies to be processed are entered through the operation panel 234. Accordingly, control information for the image data can be input. Thus, the operation panel 234 has a function of a scaling specification unit.

Jobs performed by the image processing apparatus are divided into a job that accumulates scanned image data in the memory module 222 and reuses the data and a job that does not accumulate the data in the memory module 222. The respective jobs are explained below.

As an example of the job of accumulating the data in the memory module 222, there is a job of duplicating a sheet of document by plural copies. In this case, the scanning unit 201 is operated only once, so that the document is scanned only once. The obtained image data is accumulated in the memory module 222, and the accumulated image data is read out a plurality of times.

On the other hand, as an example of the job not using the memory module 222, there is a job of duplicating a sheet of document by only a copy. In this case, the image data scanned-in by the scanning unit 201 is reproduced in the image formation unit 206 as it is. Therefore, the image-memory access control section 221 does not access the memory module 222.

Respective flows of data in the job of accumulating the image data in the memory module 222 and the job not using the memory module 222 are explained. The job not using the memory module 222 is explained first.

The data transferred from the image processor 204 to the image data control section 203 is transferred again from the image data control section 203 to the image processor 204. The image processor 204 performs the processing for image quality to convert brightness data obtained by the CCD in the sensor board unit 202 to area gradation.

The image data whose image quality has been processed is transferred from the image processor 204 to the video data control section 205. The video data control section 205 provides pulse controls for the signals converted to the area gradation in order to perform post-processing for dot arrangement and reproduce the dots. The image formation unit 206 forms a reproduction image on paper.

A flow of image data is explained below. More specifically, the flow of image data shows the case where image data is accumulated in the memory module 222 and additional processing, such as rotation of an image direction or synthesis of images, is performed at the time of reading out the images. The image data transferred from the image processor 204 to the image data control section 203 is sent from the image data control section 203 to the image-memory access control section 221 through the parallel bus 220.

The image-memory access control section 221 provides controls, under the control of the system controller 231, for accesses to the image data and the memory module 222, and performs bitmapping of data for printing of an external PC (personal computer) 223 and compression or decompression of the image data to make effective use of the memory module 222.

The image data sent to the image-memory access control section 221 is accumulated in the memory module 222 after the data is compressed. The accumulated image data is read out by the image-memory access control section 221 as required. The image-memory access control section 221 decompresses the read-out image data and restores it to the original image data. The restored data is then transferred from the image-memory access control section 221 to the image data control section 203 through the parallel bus 220.

The image data transferred to the image data control section 203 is transferred to the image processor 204. The image data subjected to processing for image quality in the image processor 204 is transferred to the video data control section 205. The video data control section 205 provides pulse-controls for the image data. The image formation unit 206 forms a reproduction image on paper.

In the flow of the image data, the functions of the digital multifunction machine are performed through the parallel bus 220 and based on bus controls provided by the image data control section 203. The facsimile transmission function is performed by executing image processing on the read-out image data in the image processor 204 and transferring the image data to the facsimile control unit 224 through the image data control section 203 and the parallel bus 220. The facsimile control unit 224 converts the data to that for a communication network and transmits the converted data as facsimile data to a public telephone network 225.

As for the received facsimile data, on the other hand, the facsimile control unit 224 converts the network data from the public telephone network 225 to image data. The converted image data is transferred to the image processor 204 through the parallel bus 220 and the image data control section 203. The image processor 204 transfers the image data to the video data control section 205 without performing specific processing for image quality on the data. The video data control section 205 performs re-arrangement of dots and pulse controls for the image data. Subsequently, the image formation unit 206 forms are production image on paper.

Under the situation that the plurality of jobs such as a copying function, a facsimile transmission/reception function, and a printout function concurrently operate, the system controller 231 and the process controller 211 provide controls for allocation of accesses by the scanning unit 201, the image formation unit 206, and the parallel bus 220 to the respective jobs.

The process controller 211 controls the flow of image data, while the system controller 231 controls the overall system and manages a startup of its resources. Selection of the functions of the digital multifunction machine is executed in the operation panel 234 of the operation section, through which contents of processing for the copying function or the facsimile function are set.

The system controller 231 and the process controller 211 perform interactive communications through the parallel bus 220, the image data control section 203, and the serial bus 210. More specifically, communications between the system controller 231 and the process controller 211 are performed by converting data formats to each other for respective data interfaces to the parallel bus 220 and the serial bus 210 in the image data control section 203.

Figure 3:
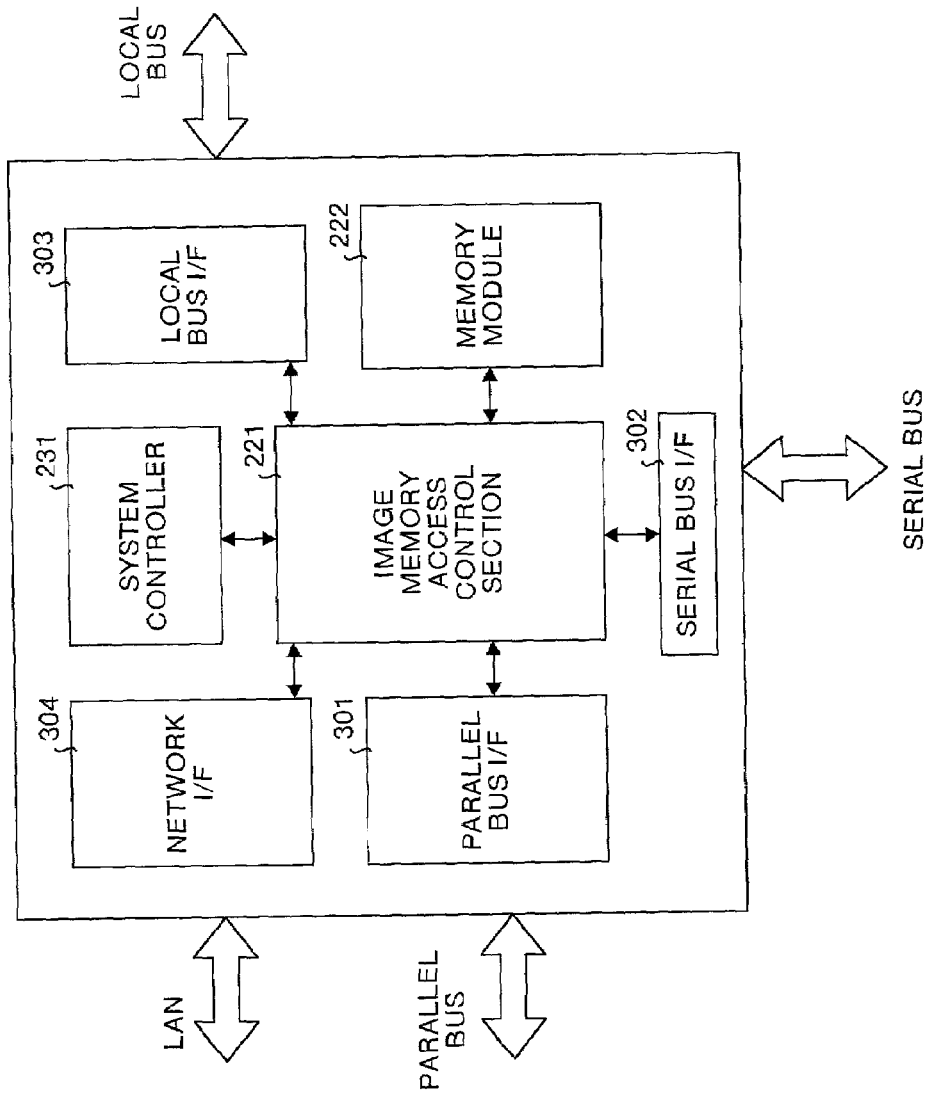
FIG. 3 shows a configuration of a controller unit that performs system controls and memory controls on the image processing apparatus according to the embodiment.

FIG. 3 shows a configuration of a controller unit that controls the system and the memory. The controller unit is formed by integrating the system controller 231 that controls operation of the overall image processing apparatus, the memory module 222, the image-memory access control section 221, and various types of bus interfaces (I/F) into one unit.

The various types of bus interfaces such as a parallel bus interface 301, a serial bus interface 302, a local bus interface 303, and a network interface 304 are connected to the image-memory access control section 221. The controller unit is connected to the relating units through a plurality of types of buses in order to keep its independence in the whole image processing apparatus.

The system controller 231 controls the other functional units through the parallel bus 220. The parallel bus 220 is used for transfer of image data. The system controller 231 issues an instruction to control operation to the image data control section 203 so as to allow the memory module 222 to store image data. This operation control instruction is sent to the image data control section 203 through the image-memory access control section 221, the parallel bus interface 301, and the parallel bus 220.

In response to reception of this operation control instruction, the image data is sent from the image data control section 203 to the image-memory access control section 221 through the parallel bus 220 and the parallel bus interface 301. The image data is stored in the memory module 222 under the control of the image-memory access control section 221.

On the other hand, when called as a printer function from a PC (personal computer) 223, the controller unit shown in FIG. 3 has a function of a printer controller, and a network control and a serial bus control. When the call has been made through the network, the image-memory access control section 221 receives the data requested to print-out through the network interface 304.

When the call has been made through a general-purpose serial bus, the image-memory access control section 221 receives the data requested to print-out through the serial bus interface 302. The general-purpose serial bus interface 302 supports a plurality of standards, for example, interfaces for USB (Universal Serial Bus), and 1284 or 1394 standard.

The system controller 231 bitmaps the data requested to print-out into image data. An area for bitmapping is an area in the memory module 222. Font data required for the bitmapping is referred to and acquired from font ROM (which is included in the ROM 233 in FIG. 2) through the local bus interface 303 and a local bus. The local bus is connected to the ROM 233 and the RAM 232 which are required for control of the controller unit.

The serial bus also has an interface for data transfer with the operation panel 234 as an operation section of the image processing apparatus, other than an external serial port that is used for connection with the PC (personal computer) 223. This interface is not used for the bitmapped data for printing, but is used for communications with the system controller 231 through the image-memory access control section 221 to accept a sequence of processing and display the system status and so on.

Data transmission or reception between the system controller 231 and the memory module 222 and various types of buses is performed through the image-memory access control section 221. The jobs using the memory module 222 are integrally managed in the whole image processing apparatus.

In the image processing apparatus according to the embodiment, performance concerning data access is altered only by replacing the controller unit shown in FIG. 3. The controller unit is adapted to respective performance. More specifically, by selecting performance of the system controller 231 as a single unit, and a memory capacity of and an access speed to the memory module 222 as needed, a unit most appropriate for both the cost and the performance required in the image processing apparatus can be formed.

Figure 4:
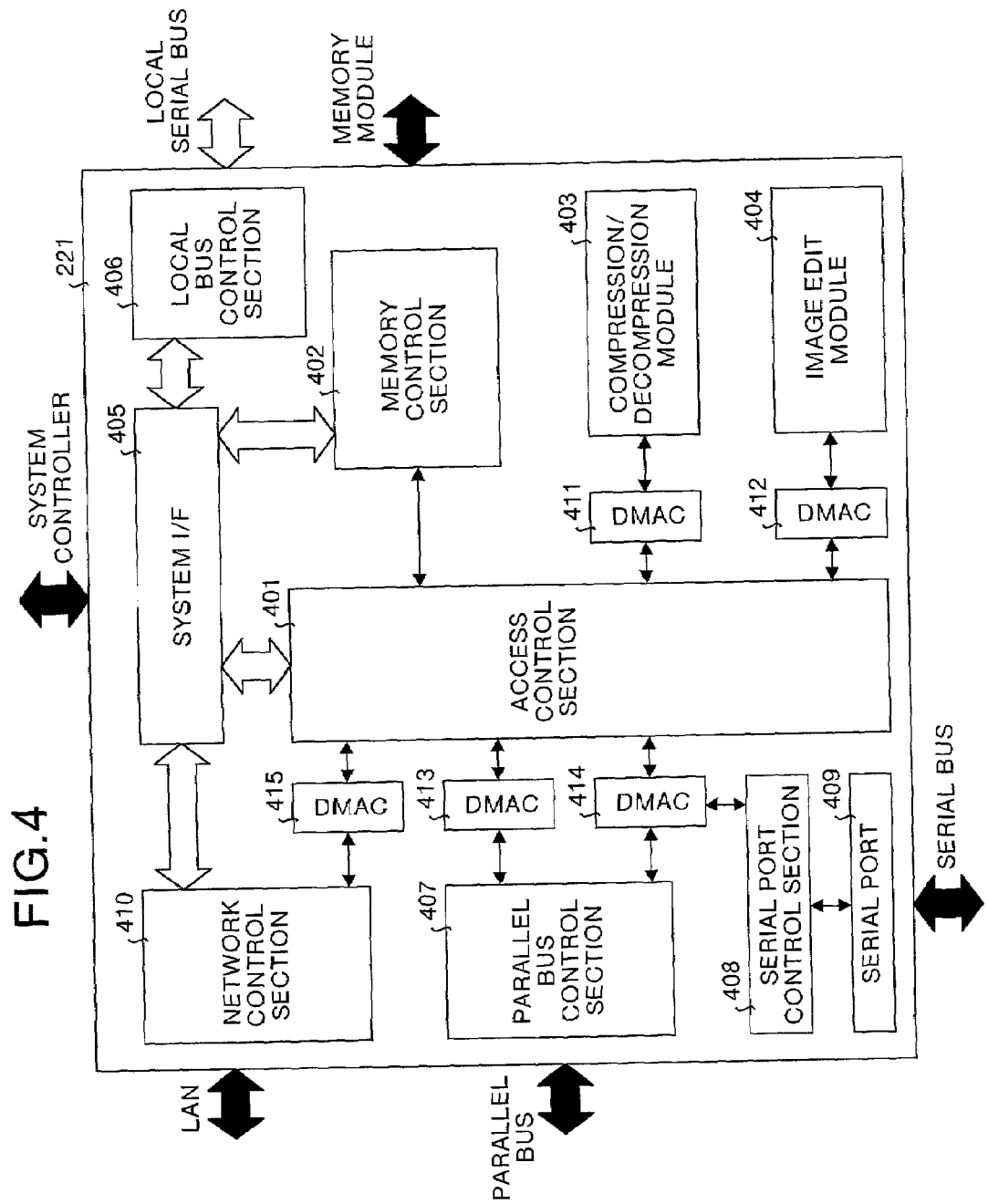
FIG. 4 is a block diagram schematically showing an image-memory access control section of the image processing apparatus according to the embodiment.

FIG. 4 is a block diagram schematically showing the image-memory access control section 221. The image-memory access control section 221 comprises an access control section 401, a memory control section 402, a compression/decompression module 403, an image edit module 404, a system interface 405, a local bus control section 406, a parallel bus control section 407, a serial port control section 408, a serial port 409, and a network control section 410.

The compression/decompression module 403, the image edit module 404, the parallel bus control section 407, the serial port control section 408, and the network control section 410 are connected to the access control section 401 via respective DMACs (Direct Memory Access Control) 411, 412, 413, 414, and 415.

The system interface 405 transmits or receives an instruction or data to or from the system controller 231 (see FIG. 3). Basically, the system controller 231 controls the image processing apparatus as a whole. Further, the system controller 231 manages distribution of memory resources. Controls for the other units are performed using the parallel bus 220 via the system interface 405 and the parallel bus control section 407.

Each of the units of the image processing apparatus is basically connected to the parallel bus 220. Therefore, the parallel bus control section 407 manages data transmission or reception to or from the system controller 231 and the memory module 222 by controlling the bus so as to be occupied only for these two.

The network control section 410 controls connection with a LAN (Local Area Network). The network control section 410 manages data transmission or reception to or from externally extended equipment connected to the network.

The system controller 231 is not involved in the management of operation of the connected equipment on the network, but controls the interface in the image-memory access control section 221. In the embodiment, control for 100Base-T is added although it is not particularly specified.

The serial port 409 connected to the serial bus has a plurality of ports. The serial port control section 408 has port control mechanisms corresponding to the number of types of prepared bus. Although it is not particularly specified, port-controls for USB and 1284 are provided in the embodiment. Separately from the external serial port, acceptance of commands or transmission/reception of data concerning display with the operation section is controlled.

The local bus control section 406 interfaces with the local serial bus connected to the RAM 232 and the ROM 233 required for starting the system controller 231, and also connected to the font ROM with which printer code data is bitmapped.

The operation controls are performed by the system controller 231 by executing command control through the system interface 405. The data controls are performed by managing accesses from external units to mainly the memory module 222. Image data is transferred from the image data control section 203 (see FIG. 2) to the image-memory access control section 221 via the parallel bus 220. The image data is input into the image-memory access control section 221 in the parallel bus control section 407.

Memory access for the input image data is out of management by the system controller 231. That is, the memory access is performed based on the direct memory access control, separately from the system control. The access control section 401 arranges requests for access from a plurality of units to the memory module 222. The memory control section 402 provides controls for access operation to or data read/write from/in the memory module 222.

When an access is made from the network to the memory module 222, the data loaded in the image-memory access control section 221 from the network via the network control section 410 is transferred to the memory module 222 based on the direct memory access control. The access control section 401 controls accesses to the memory module 222 by a plurality of jobs. The memory control section 402 reads or writes data from or in the memory module 222.

When an access is made from the serial bus to the memory module 222, the data loaded in the image-memory access control section 221 via the serial port 409 by the serial port control section 408 is transferred to the memory module 222 based on the direct memory access control. The access control section 401 controls accesses to the memory module 222 by a plurality of jobs. The memory control section 402 reads or writes data from or in the memory module 222.

The system controller 231 bitmaps the data to be printed out, that is sent from the personal computer 223 connected to the network or the serial bus, in a memory area within the memory module 222 using font data on the local bus.

The system controller 231 manages interfaces with respective external units. The respective DMACs 411, 412, 413, 414, and 415 manage memory accesses for data transfer after the data is loaded into the image-memory access control section 221. In this case, each of the DMACs 411, 412, 413, 414, and 415 executes data transfer discretely from one another, therefore, the access control section 401 gives priorities to jobs concerning accesses to the memory module 222 when a collision occurs between the jobs, or to access requests.

The access to the memory module 222 includes an access from the system controller 231 via the system interface (system I/F) 405 in order to bitmap the stored data other than accesses by the DMACs 411, 412, 413, 414, and 415.

The memory control section 402 directly transfers the data from any DMAC, that is permitted to get access to the memory module 222 in the access control section 401, or the data from the system interface 405 to the memory module 222.

The image-memory access control section 221 has the compression/decompression module 403 and the image edit module 404 where data processing is performed. The compression/decompression module 403 compresses or decompresses data so as to enable effective accumulation of image data or code data in the memory module 222. The compression/decompression module 403 controls interface with the memory module 222 through the DMAC 411.

The image data once stored in the memory module 222 is called up from the memory module 222 to the compression/decompression module 403 via the memory control section 402 and the access control section 401 based on the direct memory access control. The image data on which data conversion has been executed in the compression/decompression module 403 is returned to the memory module 222 based on the direct memory access control, or is output to an external bus.

The image edit module 404 controls the memory module 222 by the DMAC 412, and performs data processing in the memory module 222. More specifically, the image edit module 404 performs processing for rotation of image data and synthesis of different images as data processing, other than clearing of a memory area. The image edit module 404 also performs edits so as to convert target data to be processed by controlling it's address on the memory.

The image edit module 404 performs processing on the image bitmapped on the memory module 222. The image edit module 404 can not perform edits on the compressed code data or printer code data. Therefore, image compression for effective accumulation of the images in the memory is executed on the data after the image is edited.

Figure 5:
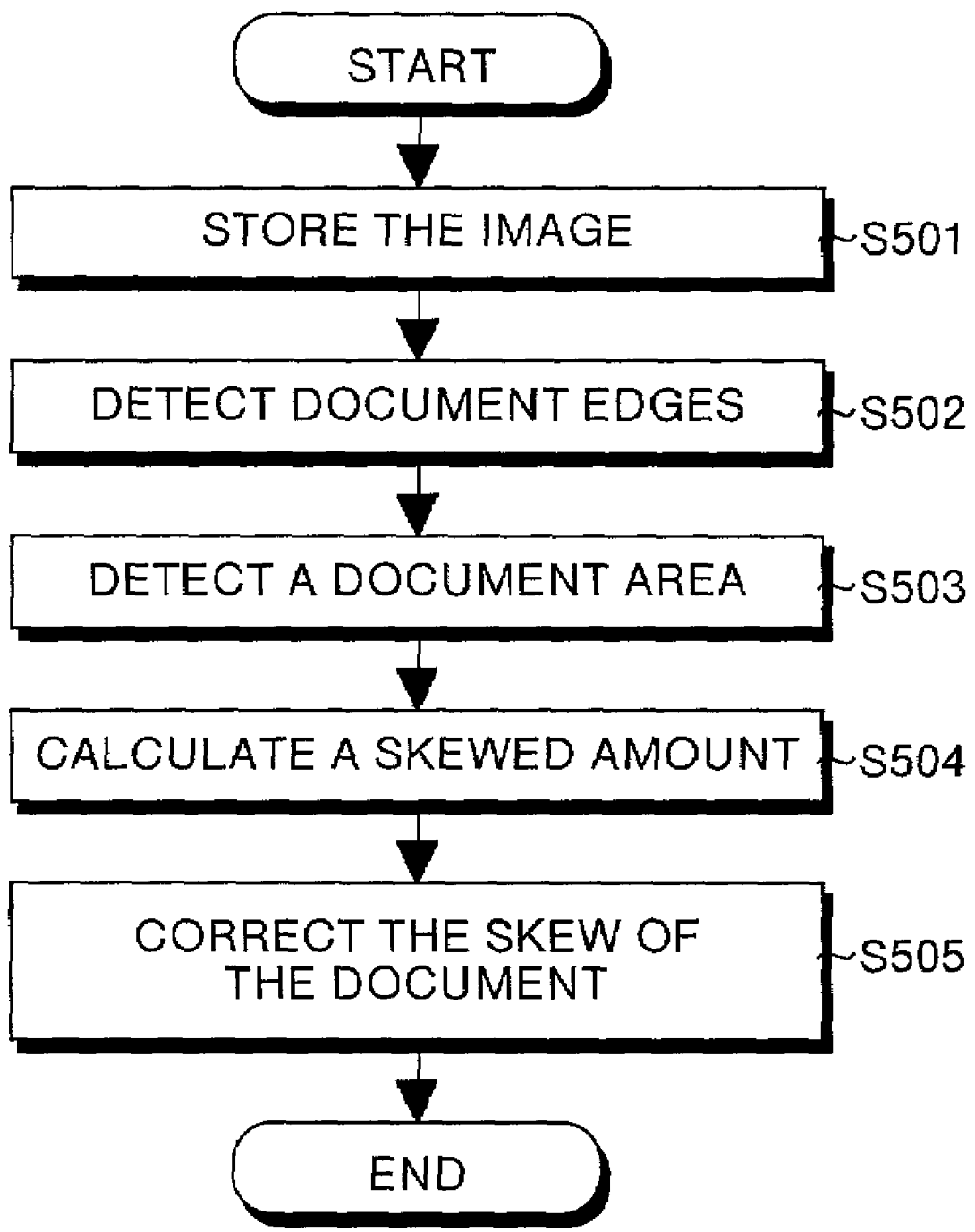
FIG. 5 is a flowchart showing a sequence of pre-processing for image data in the image processing apparatus according to the embodiment.

Processing Before the Proper Image Processing (Pre-processing):

The contents of pre-processing for image data stored in the memory is explained below. The pre-processing includes detection of the size of a scanned document, correction to the skew of the document, and correction to geometrical features of the document from the scanned image data. FIG. 5 is a flowchart showing a sequence of the pre-processing for image data. In the flowchart of FIG. 5, at first, the scanned image data is stored in the memory module 222 via the image-memory access control section 221 (step S501).

Subsequently, document edges are detected on the stored image data (step S502). In scanning of the document by the sheet-though DF, light reflected by the document is input in the scanned image, while light reflected by a background plate is input in an area where the document is not present, so that a density difference between the background of the document and the background plate is detected. The density difference is intentionally set generally by making the background plate brighter than white paper, increasing the reflection light by putting a shine on the plate, or setting a complementary color to a light source of a lamp.

Figure 6:
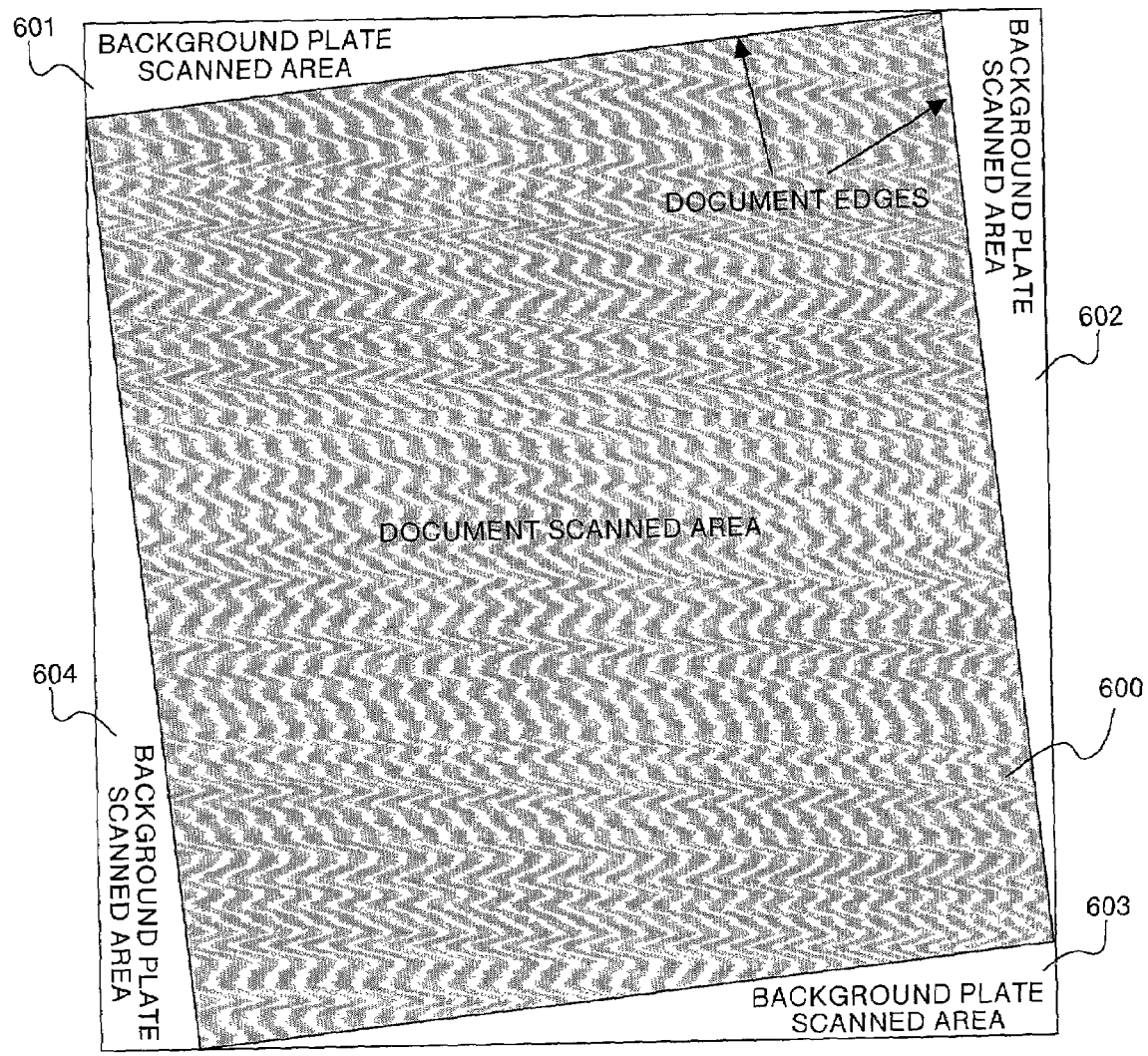
FIG. 6 shows an example of how an image is stored in the image processing apparatus according to the embodiment.

As a result of detecting the edges based on the density difference, a document area is detected/estimated from information for the respective edges (step S503). The amount of inclination of the document is detected from a positional relation of the document area in a storage area. FIG. 6 shows an example of how the image is stored. The scanned image skewed to the left has background-plate scanned areas 601 to 604 in its end surfaces. The image retains a clear density difference existing between the density of the end surfaces and the density of the background section 600 of the document. The amount of inclination of the document is thus detected. A skewed amount is calculated from the detected amount of inclination (step S504).

The skew of the document image is corrected based on each skewed amount of each side calculated in step S504 (step S505) Accordingly, the pixels on the memory are shifted to allow the scanned skewed image to be deformed to a geographically normal position. A correct document size is also calculated from the detection of the document area.

The document size is stored in a memory (e.g., the memory module 222 or the RAM 232) managed by the system controller 231 in order to set a range of scaling. The system controller 231 executes a series of pre-processing via the image-memory access control section 221.

Figure 7:
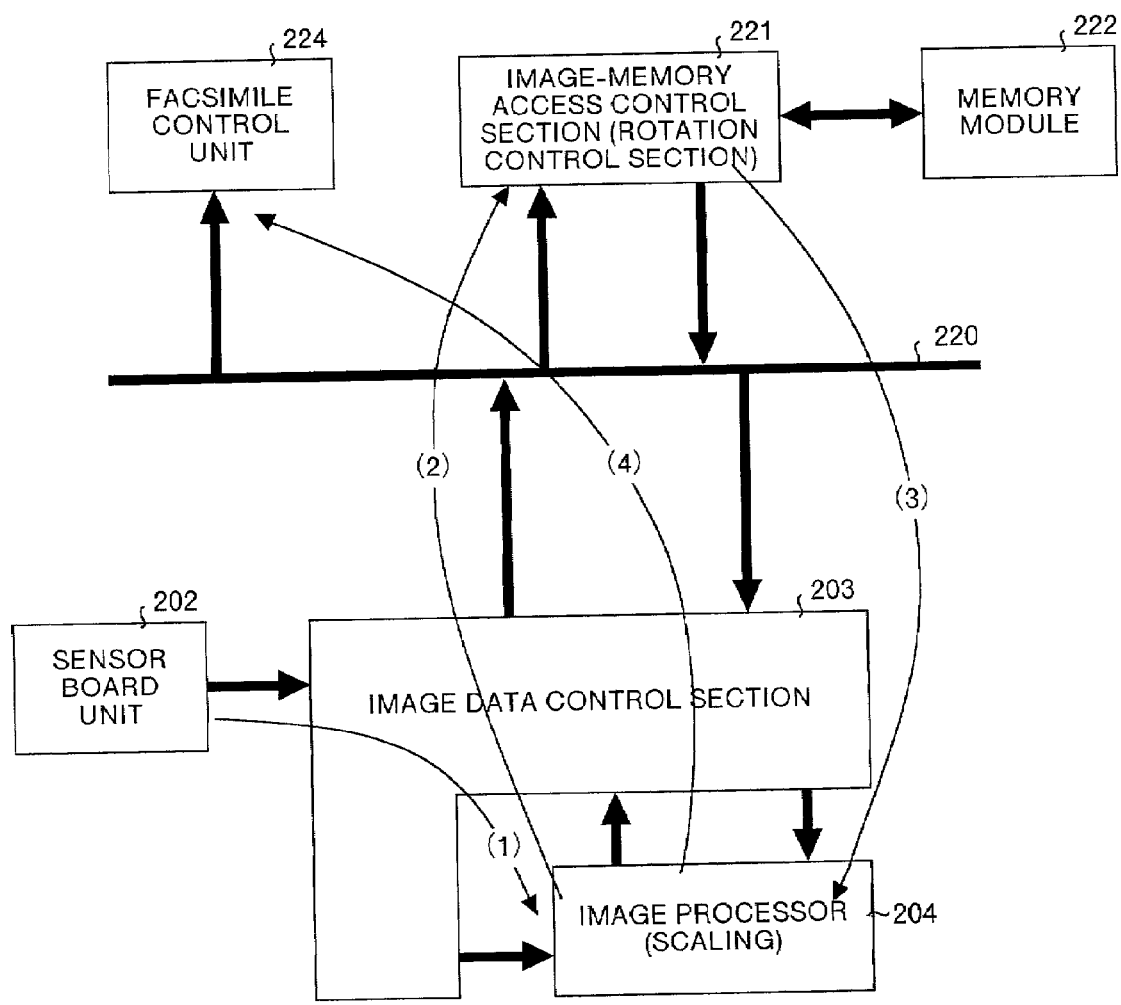
FIG. 7 is a block diagram for explaining respective flows of main/auxiliary electrical scaling processing (Processing 1) in the image processing apparatus according to the embodiment.
Figure 8:
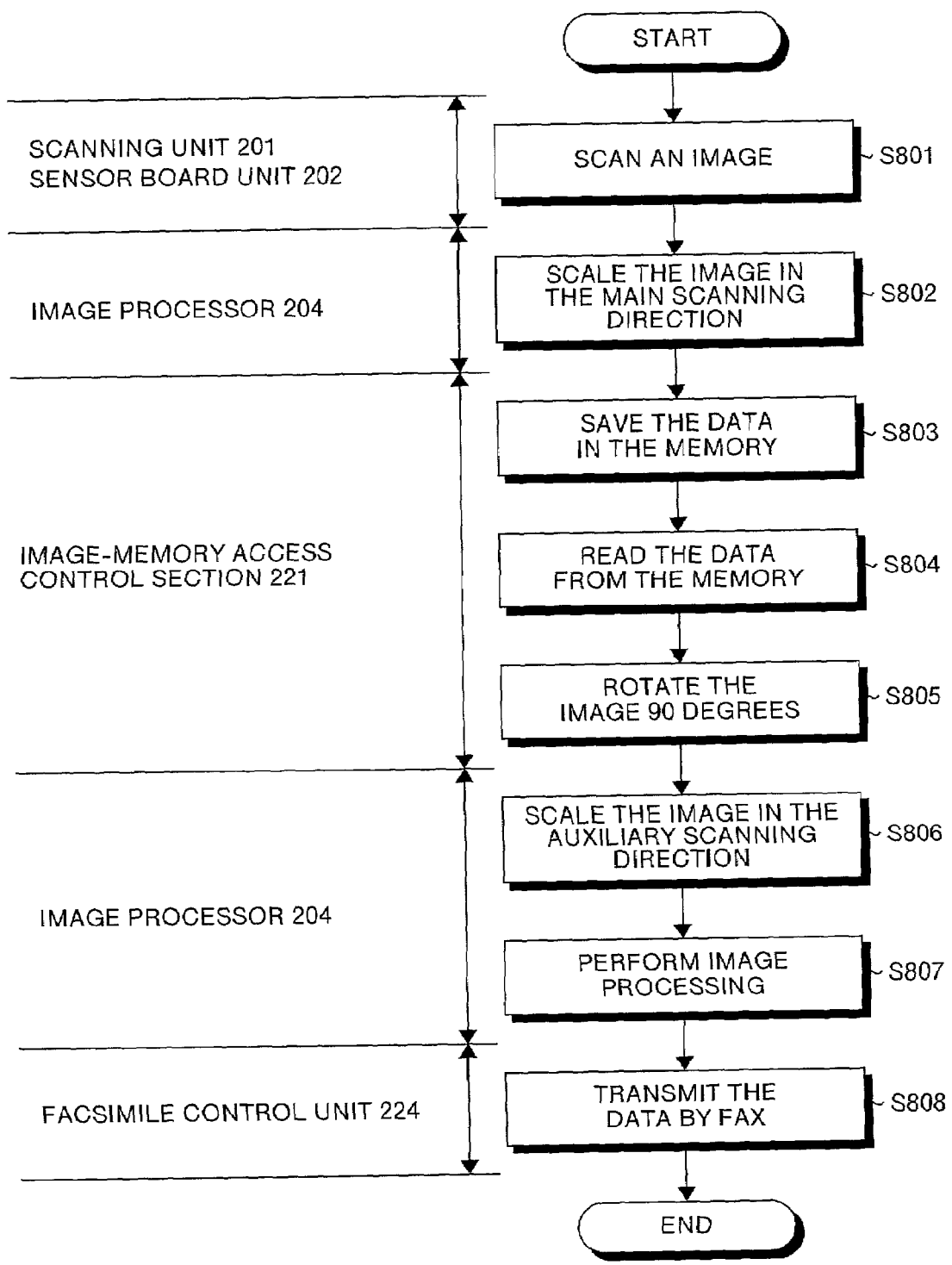
FIG. 8 is a flowchart showing the flow of the main/auxiliary electrical scaling processing (Processing 1) in the image processing apparatus according to the embodiment.

First example of the processing:

The outline of main/auxiliary electrical scaling processing with the processing for image rotation when the scanned image is to be transmitted by facsimile is explained below. FIG. 7 shows respective flows of main/auxiliary electrical scaling processing in the block diagram. FIG. 8 is a flowchart showing the flow of the main/auxiliary electrical scaling processing.

In FIG. 7, the scaling processing is performed by forming a convolution arithmetic module in a one-dimensional direction in a programmable system within the image processor 204. The image data control section 203 performs only a function of data interface, while the image-memory access control section 221 provides controls for accesses to the memory module 222 and 90-degree rotation of image data.

In FIG. 7 and FIG. 8, all the images of documents are scanned in respective unmagnified sizes (step S801), and each of the document images is transferred from the sensor board unit 202 to the image processor 204 via the image data control section 203 ((1) in FIG. 7), and the image processor 204 subjects the image to electrical scaling in the main scanning direction (step S802). The image subjected to the electrical scaling in the main scanning is transferred from the image processor 204 to the image-memory access control section 221 through the image data control section 203 ((2) in FIG. 2), and the image-memory access control section 221 stores the image in the memory module 222 managed thereby (step S803).

At this time, the sensor board unit 202 subjects the image to shading correction, and previously corrects degradation in the image due to nonuniformity of illumination. When the image data is stored in the memory module 222, the detected document size is also stored as additional information with the image data.

The image-memory access control section 221 reads the image data from the memory module 222 (step S804) and rotates the read-out image data 90 degrees (step S805). In the case of the sheet-through DF, the image-memory access control section 221 subjects the image reversed left to right to mirroring, and then rotates the image. The image-memory access control section 221 transfers the rotated image data to the image processor 204 through the image data control section 203 ((3) in FIG. 7). The image processor 204 performs interpolation arithmetic for re-sampled positions (step S806).

Parameters of the interpolation arithmetic are computed in the process controller 211 based on how the image data is stored and its scaling range, and desired settings for the image processor 204 are previously completed. This interpolation arithmetic processing corresponds to scaling processing in the auxiliary scanning direction concerning the direction to which the document is scanned. The scaling settings in the image processor 204 are performed by downloading the setting values for scaling in the main scanning and the auxiliary scanning from the process controller 211 and calculating the image data based on the interpolation arithmetic processing.

The image processor 204 executes image processing such as MTF correction or gradation processing on the image data subjected to electrical scaling in the main and auxiliary directions in a programmable arithmetic processor by downloading the required sequence of processing from the process controller 211 (step S807). The data on which image processing is completed is transferred from the image processor 204 to the facsimile control unit 224 via the image data control section 203 through the parallel bus ((4) in FIG. 7), and the facsimile control unit 224 transmits the data by facsimile (step S808).

Figure 9:
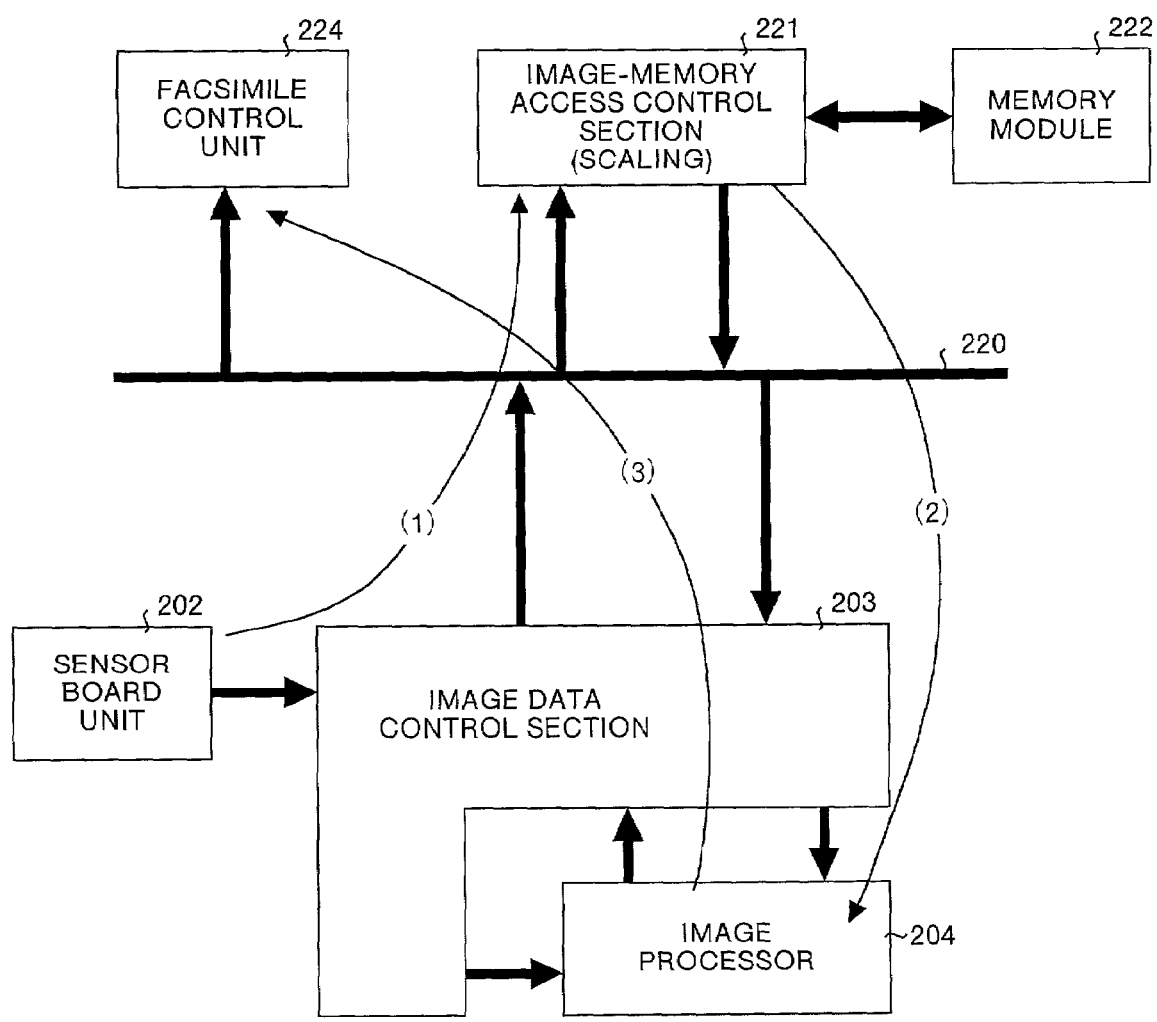
FIG. 9 is a block diagram for explaining respective flows of scaling processing (Processing 2) in the image-memory access control section of the image processing apparatus according to the embodiment.

Sharing of the scaling processing in the image-memory access control section 221 when the scanned image is transmitted by facsimile is explained below. FIG. 9 shows respective flows of scaling processing in the block diagram, and FIG. 10 is a flowchart showing the flow of the scaling processing.

Figure 10:
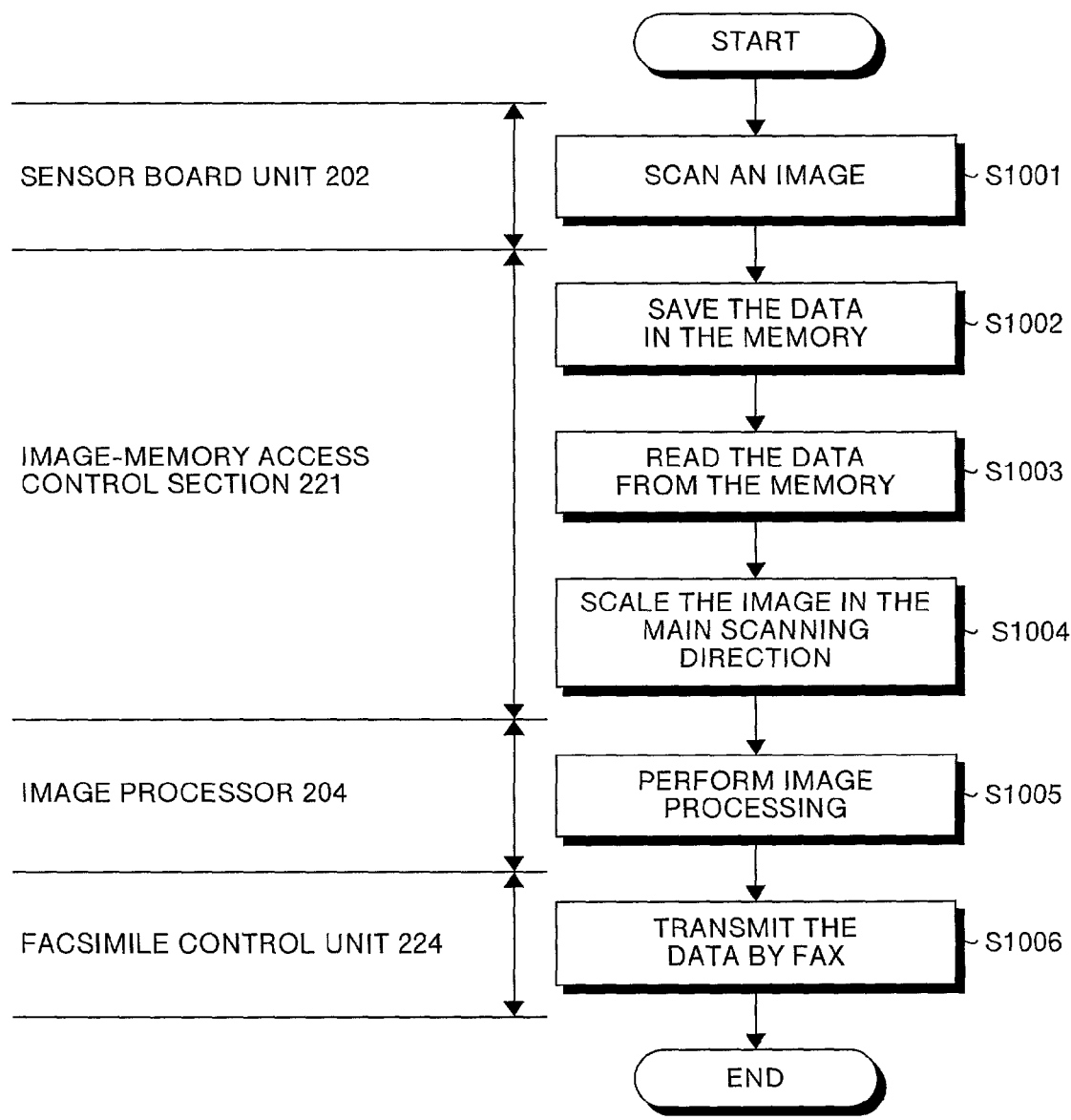
FIG. 10 is a flowchart showing the flow of the scaling processing (Processing 2) in the image-memory access control section of the image processing apparatus according to the embodiment.

Second Example of the Processing:

In FIG. 9 and FIG. 10, regardless of using the sheet-through DF or the platen system, or of documents of any sizes, the sensor board unit 202 scans images of the documents in their unmagnified sizes (step S1001), and transfers the images to the memory module 222 through the image data control section 203 and the image-memory access control section 221 ((1) in FIG. 9), and the images are stored in the memory module 222 (step S1002).

The image-memory access control section 221 detects the document size by performing the pre-processing in the memory module 222 on the stored image data and adds an index to the image data. The system controller 231 computes a position of a pixel to be read-out for re-sampling from this index and conditions of specifying scaling. The image-memory access control section 221 reads out the original image data remaining two-dimensionally arranged from the memory module 222 (step S1003), and performs plane scaling by programmably performing arithmetic processing based on the arithmetic processing in the system controller 231 and the control for memory access in the image-memory access control section 221 (step S1004).

The image data after subjected to the scaling processing is transferred to the image processor 204 through the image data control section 203 ((2) in FIG. 9), and the image processor 204 executes image processing on the image data (step S1005). As explained above, dividing or sharing the jobs is so carried out that the image-memory access control section 221 (system controller 231) performs the scaling processing and the image processor 204 performs image processing such as MTF correction or gradation processing.

The data on which the image processing is completed is transferred from the image processor 204 to the facsimile control unit 224 via the image data control section 203 through the parallel bus ((3) in FIG. 9), and the facsimile control unit 224 transmits the data by facsimile (step S1006)

Figure 11:
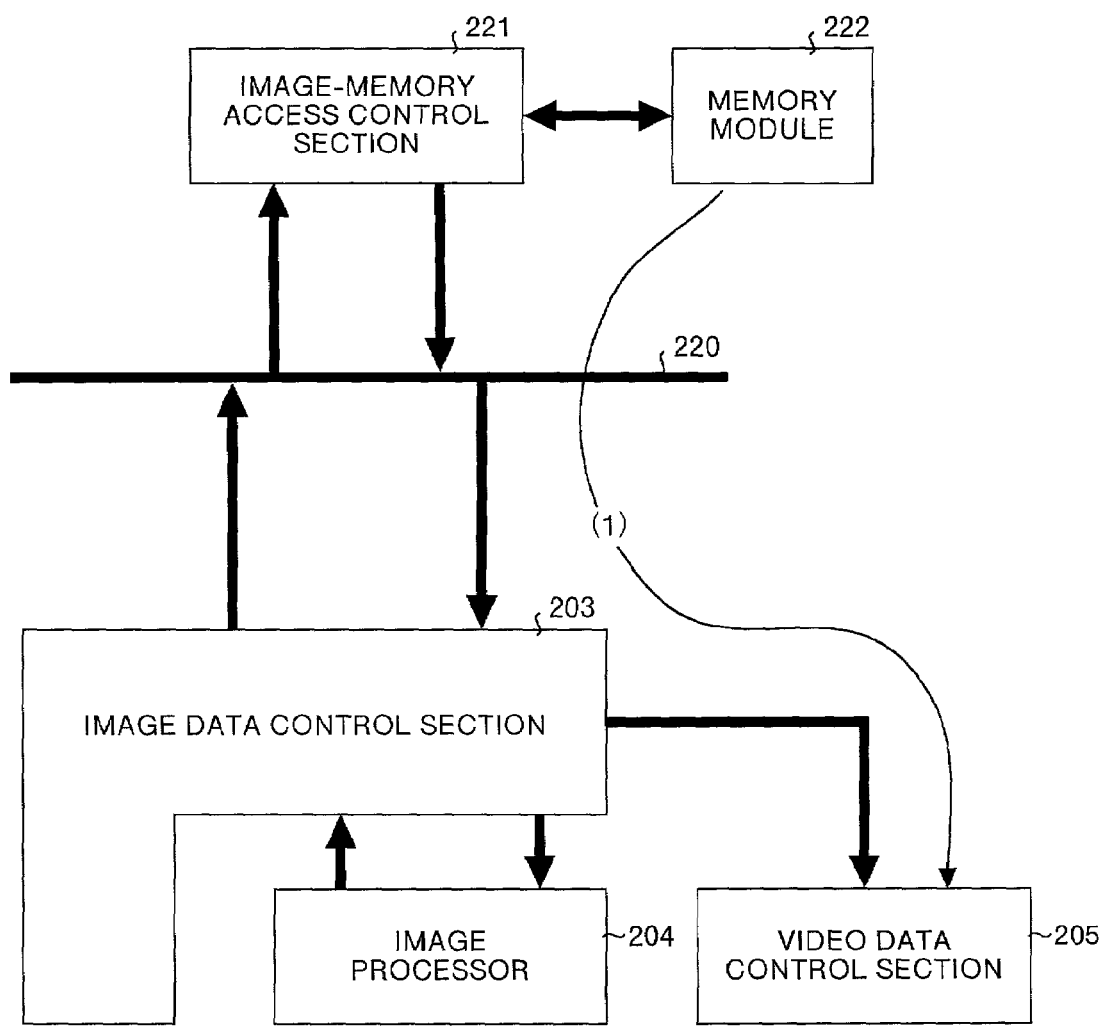
FIG. 11 is a block diagram for explaining respective flows of printout of an image stored in the memory (Processing 3) of the image processing apparatus according to the embodiment.

Third Example of the Processing:

The processing for printing out of images stored in the memory is explained below. FIG. 11 shows respective flows of the processing for printing out in the block diagram, and FIG. 12 is a flowchart showing the flow of the processing for printing out.

Figure 12:
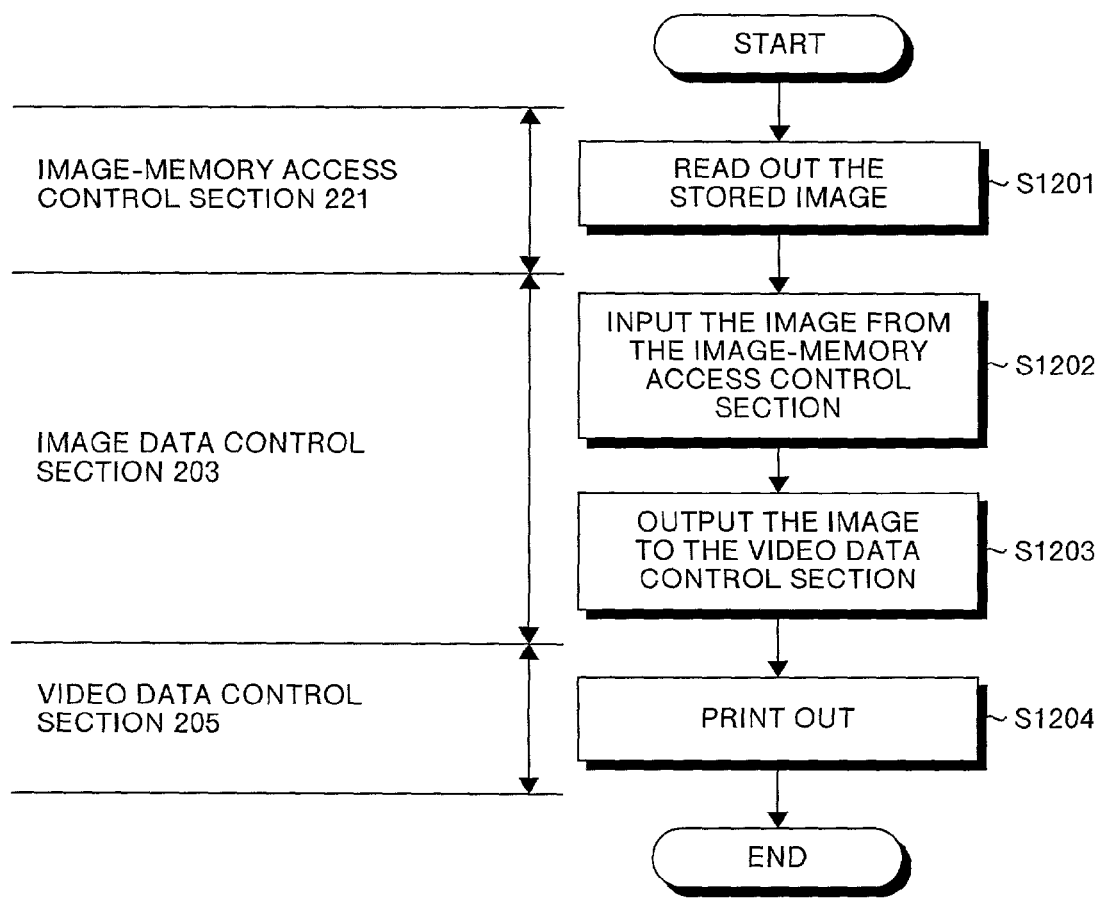
FIG. 12 is a flowchart showing the flow of printout of the image stored in the memory (Processing 3) of the image processing apparatus according to the embodiment.

In FIG. 11 and FIG. 12, when the processing for printing out is finished on data obtained after image processing is subjected to a scanned image or data for printout sent from a PC 223 or data received by facsimile, and when a stored image is to be output for printout, the following steps are executed. That is, the image-memory access control section 221 reads out the stored image (step S1201), and the image data control section 203 receives the image (data) from the image-memory access control section 221 (step S1202), transfers (outputs) the received image (data) to the video data control section 205 (step S1203, (1) in FIG. 11), the video data control section 205 and the image formation unit 206 reproduce (print out) the image (step S1204).

In this case, there is no need to perform image processing in the image processor 204, accordingly, data is not transferred from the image data control section 203 to the image processor 204. Therefore, the process controller 211 controls only the video data control section 205 and the image formation unit 206.

Figure 13:
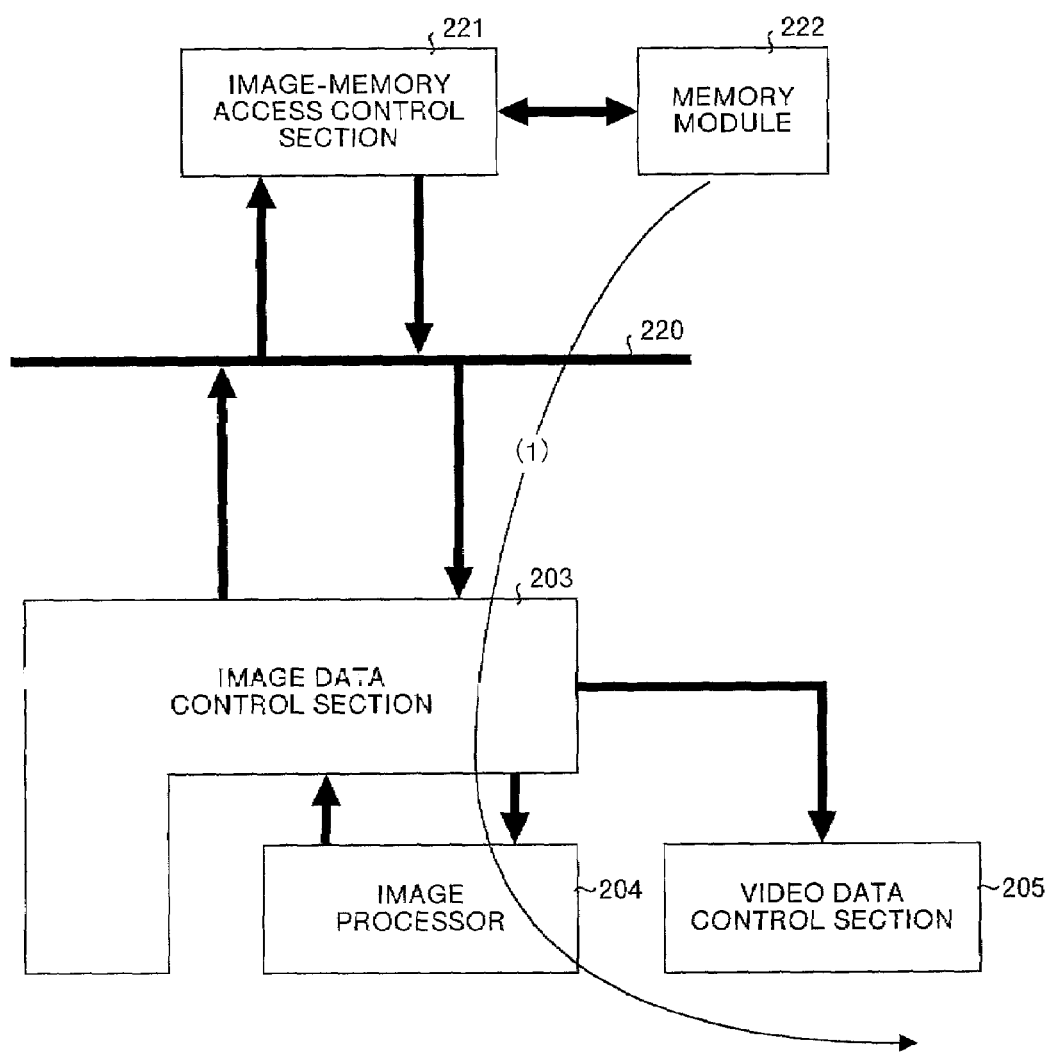
FIG. 13 is a block diagram for explaining respective flows of printout with image processing of an image stored in the memory (Processing 4) of the image processing apparatus according to the embodiment.

Fourth Example of the Processing:

The processing for printing out with the image processing executed on images stored in the memory is explained below. FIG. 13 shows respective flows of the processing for printing out in the block diagram, and FIG. 12 is a flowchart showing the flow of the printing out.

Figure 14:
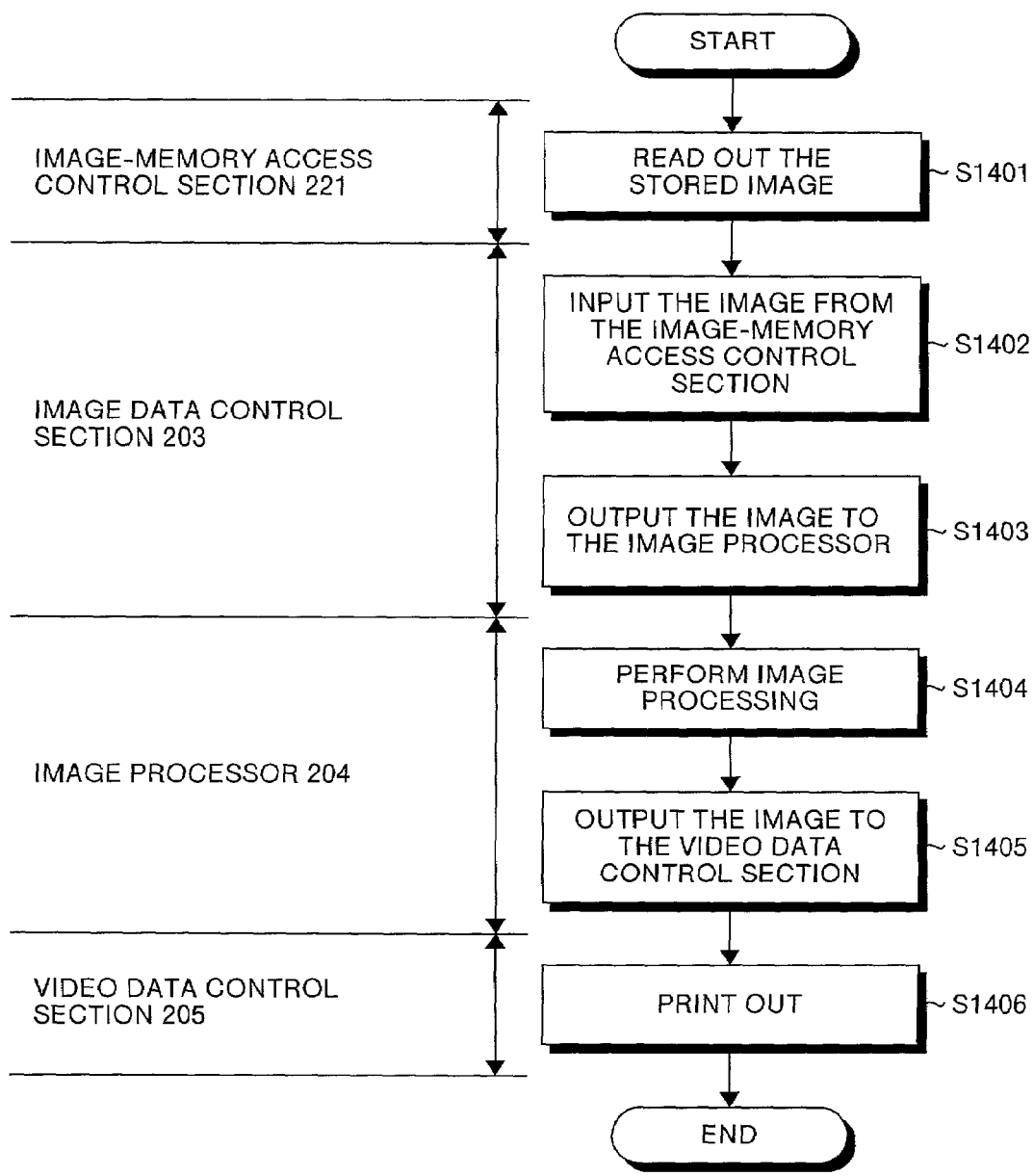
FIG. 14 is a flowchart showing the flow of printout with image processing of the image stored in the memory (Processing 4) of the image processing apparatus according to the embodiment.

In FIG. 13 and FIG. 14, when the scanned documents are stored as they are and the processing for printing out is performed while the contents of the image processing on the identical data is being altered, or when image processing is required to change density of the data for printout sent from the PC 223, the image-memory access control section 221 reads out the stored image (step S1401), and the image data control section 203 receives the image (data) from the image-memory access control section 221 (step S1402) and transfers the received image (data) to the image processor 204 (step S1403).

The image processor 204 alters freely required image processing by changing data to be loaded to the arithmetic processor, and executes the required processing (step S1404) The image processor 204 transfers the data subjected to the processing to the video data control section 205 (step S1405) and the video data control section 205 and the image formation unit 206 reproduce (print out) the image (step S1406).

When the processing is to be altered, the image processor 204 changes the load data, the image-memory access control section 221 again reads out the image stored in the memory, the processing is executed on the image, and the video data control section 205 and the image formation unit 206 print out the image.

Figure 15:
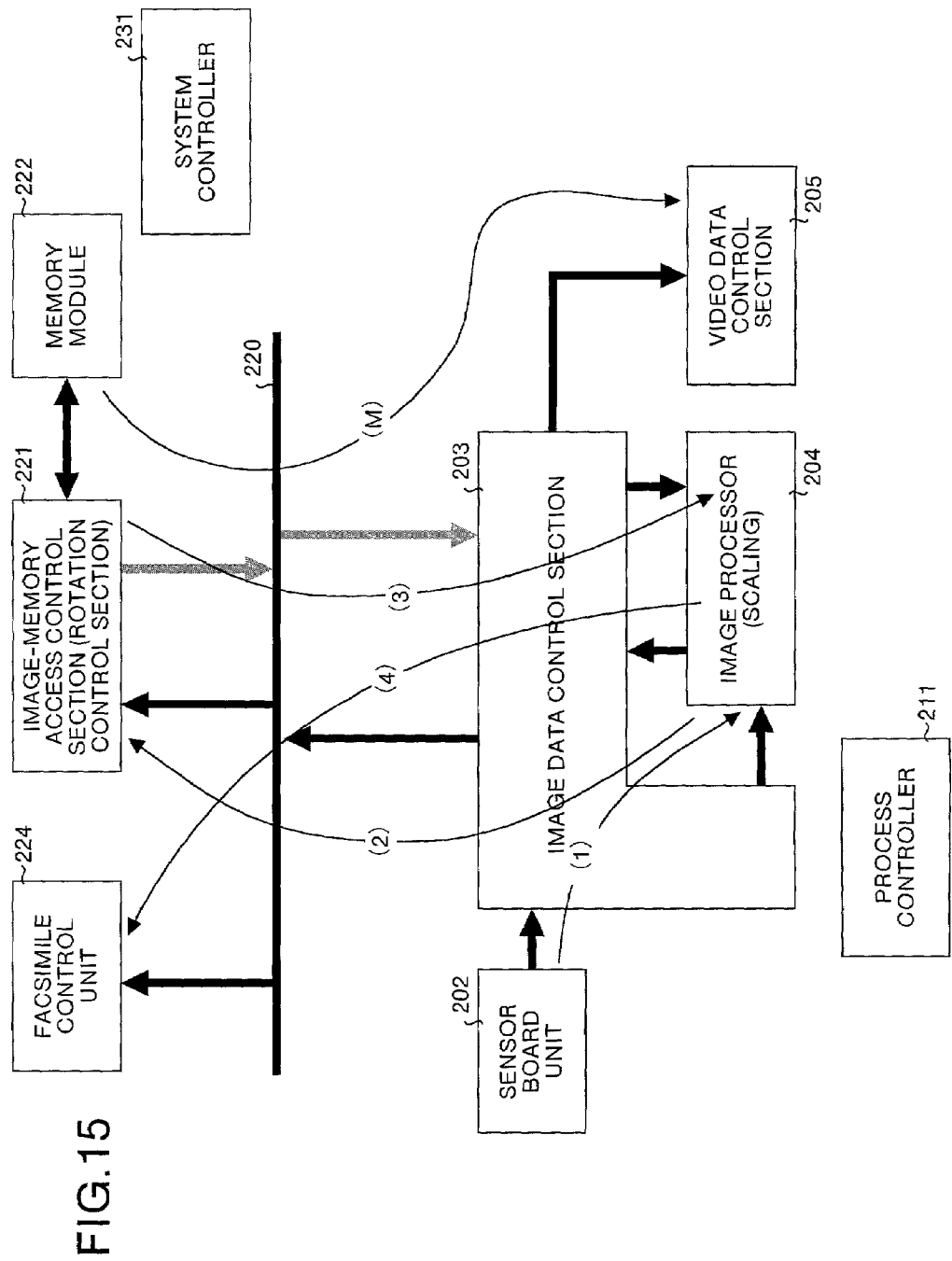
FIG. 15 is a block diagram for explaining respective flows of contents of concurrent operation (Processing 5): facsimile transmission of an image subjected to scaling processing with image rotation, and printout of an image as a result of processing within the memory in the image processing apparatus according to the embodiment.
Figure 16:
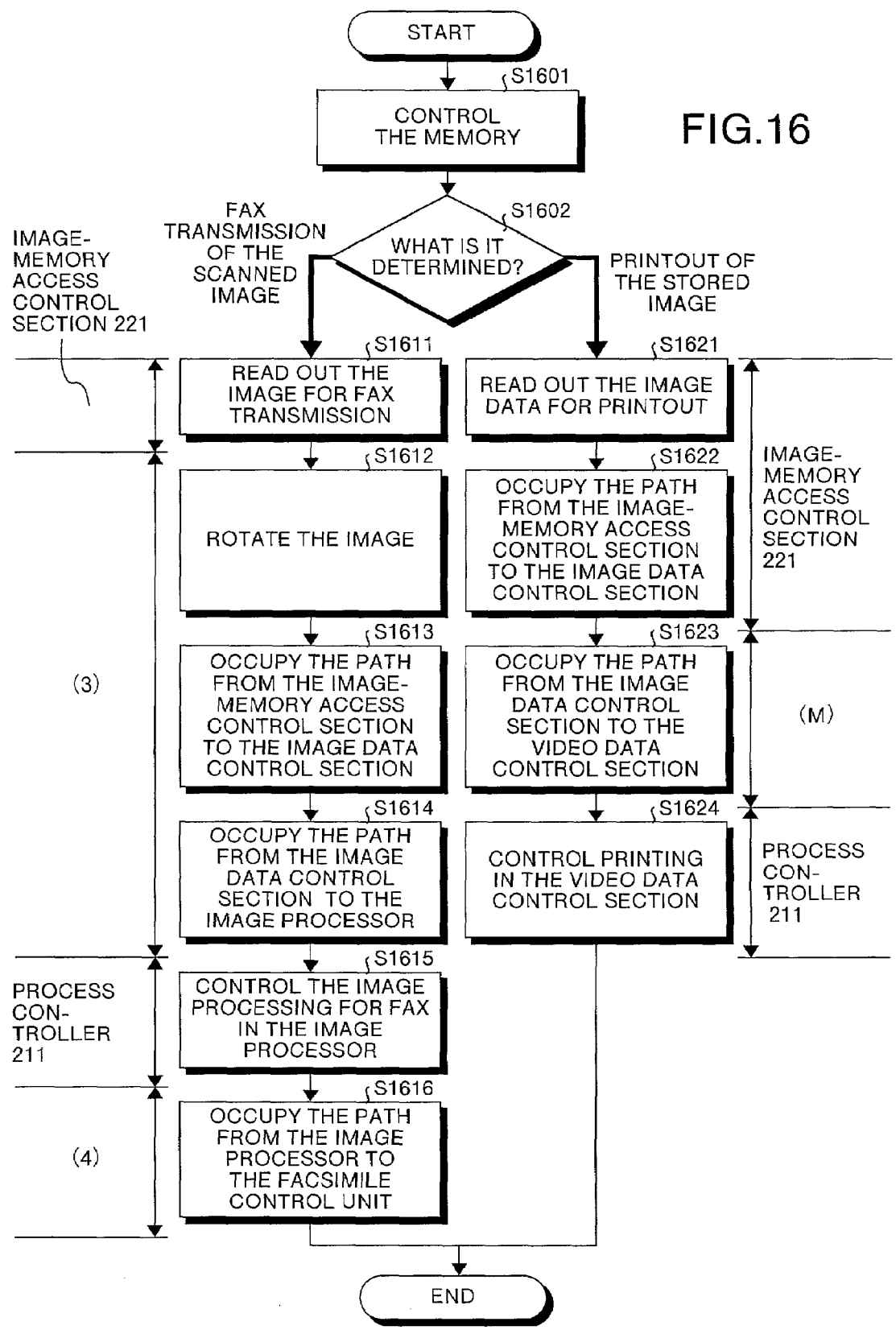
FIG. 16 is a flowchart showing the flow of the contents of the concurrent operation (Processing 5): facsimile transmission of an image subjected to scaling processing with image rotation, and printout of an image as a result of processing within the memory in the image processing apparatus according to the embodiment.

Fifth Example of the Processing:

Contents of concurrent operation: facsimile transmission of an image subjected to scaling processing with image rotation and printout of an image as a result of processing within the memory, are explained below. FIG. 15 shows respective flows of the concurrent operation in the block diagram, and FIG. 16 is a flowchart showing the flows of the concurrent operation.

This chart shows the concurrent operation of the processing shown in FIG. 7 and FIG. 8 and the processing shown in FIG. 11 and FIG. 12. When the two jobs conflict with each other for the video path from the image-memory access control section 221 to the image data control section 203 via the parallel bus 220, the system controller 231 controls the access to the path to perform the concurrent operation.

When the concurrent operation occurs, the system controller 231 controls accesses from the jobs to the memory and the video path. Data is not multiplexed for the video path, but the access rights are allocated to the jobs based on time division. The system controller 231 provides controls for memory via the image-memory access control section 221 (step S1601). The system controller 231 then determines whether memory access is made for scaling of an image at the time of facsimile transmission or for reading data from the memory at the time of printing out (step S1602).

When the read-out image is to be transmitted by facsimile, the video path for which a conflict occurs is relinquished for facsimile transmission. That is, the image-memory access control section 221 reads out an image for facsimile transmission from the memory module 222 (step S1611) and rotates the image 90 degrees (step S1612).

The image data is given, by the system controller 231, the occupation of the video path from the image-memory access control section 221 to the image data control section 203 (step S1613), so that the image-memory access control section 221 transfers the data as facsimile transmission. The image data is also given, by the system controller 231, the occupation of the path from the image data control section 203 to the image processor 204 (step S1614), so that the image data control section 203 transfers the data to the image processor 204.

The image processor 204 downloads the parameters of the image processing for facsimile under the control of the process controller 211 to perform arithmetic processing (step S1615). The image data after being subjected to the arithmetic processing is given, by the system controller 231, the occupation of the video path from the image processor 204 to the facsimile control unit 224 (step S1616).

The image data is transferred from the image processor 204 to the facsimile control unit 224 via the image data control section 203 through the parallel bus 220, and the facsimile control unit 224 transmits the image data by facsimile. That is, it is required to occupy also the parallel bus 220, therefore, the processing for printing out is not executed during the processing for facsimile transmission.

On the other hand, when the stored image is to be printed out, the image-memory access control section 221 reads out the image data for printout from the memory module 222 (step S1621). The image data is given, by the system controller 231, the occupation of the video path from the image-memory access control section 221 to the image data control section 203 (step S1622), so that the image-memory access control section 221 transfers the image data for printout to the image data control section 203.

The arithmetic processing on this data is not needed, therefore, the image data control section 203 transfers the image data to the video data control section 205 in response to reception of the occupation of the video path from the image data control section 203 to the video data control section 205 (step S1623). The video data control section 205 provides pulse-controls for pixels for printing out under the control of the process controller 211, and the image formation unit reproduces the image (step S1624). After the preferential time based on the time division has elapsed, the priority to the video path is canceled and the path is relinquished.

Figure 17:
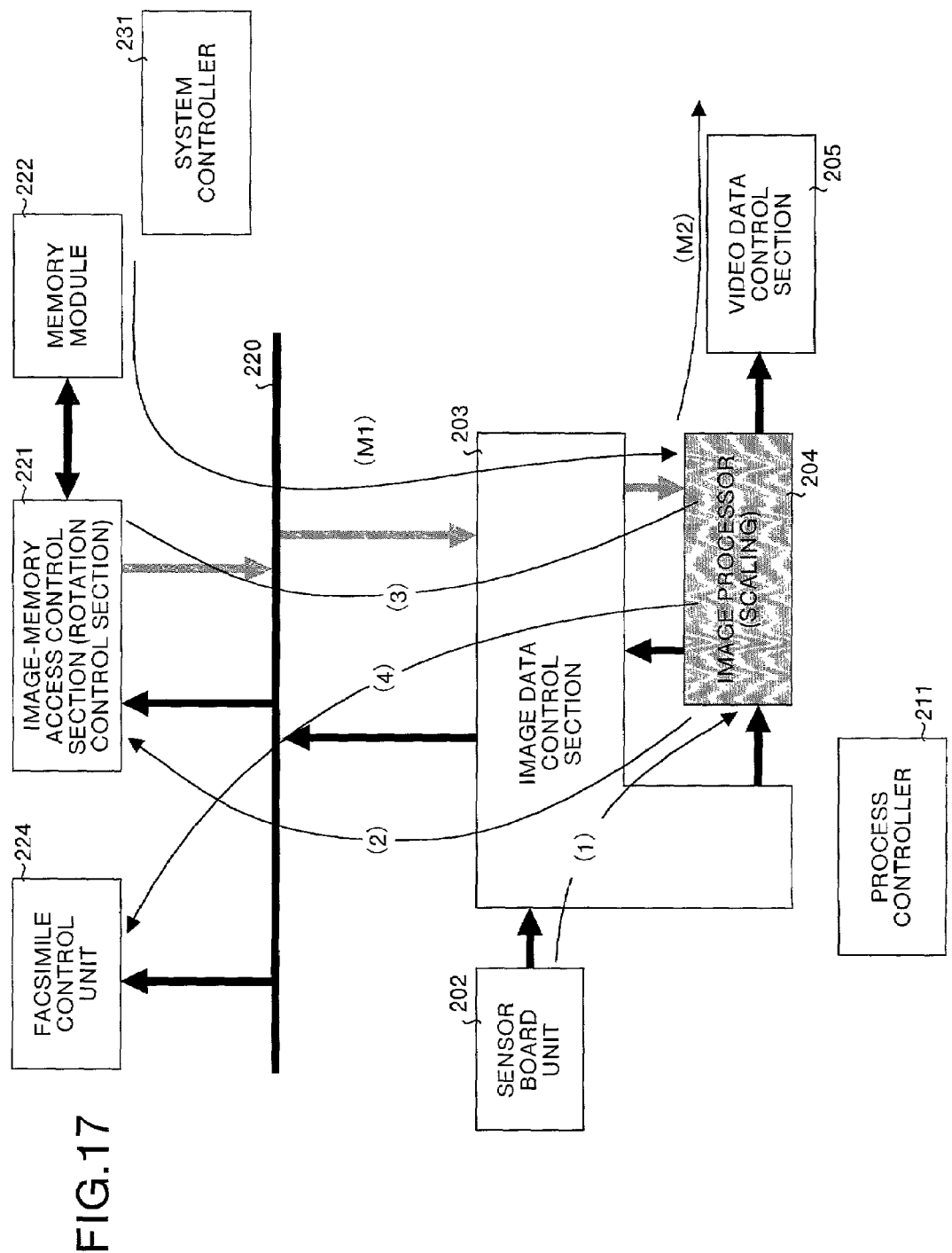
FIG. 17 is a block diagram for explaining respective flows of contents of concurrent operation (Processing 6): facsimile transmission of an image subjected to scaling processing with image rotation, and printout of an image stored in the memory after being subjected to image processing in the image processing apparatus according to the embodiment.
Figure 18:
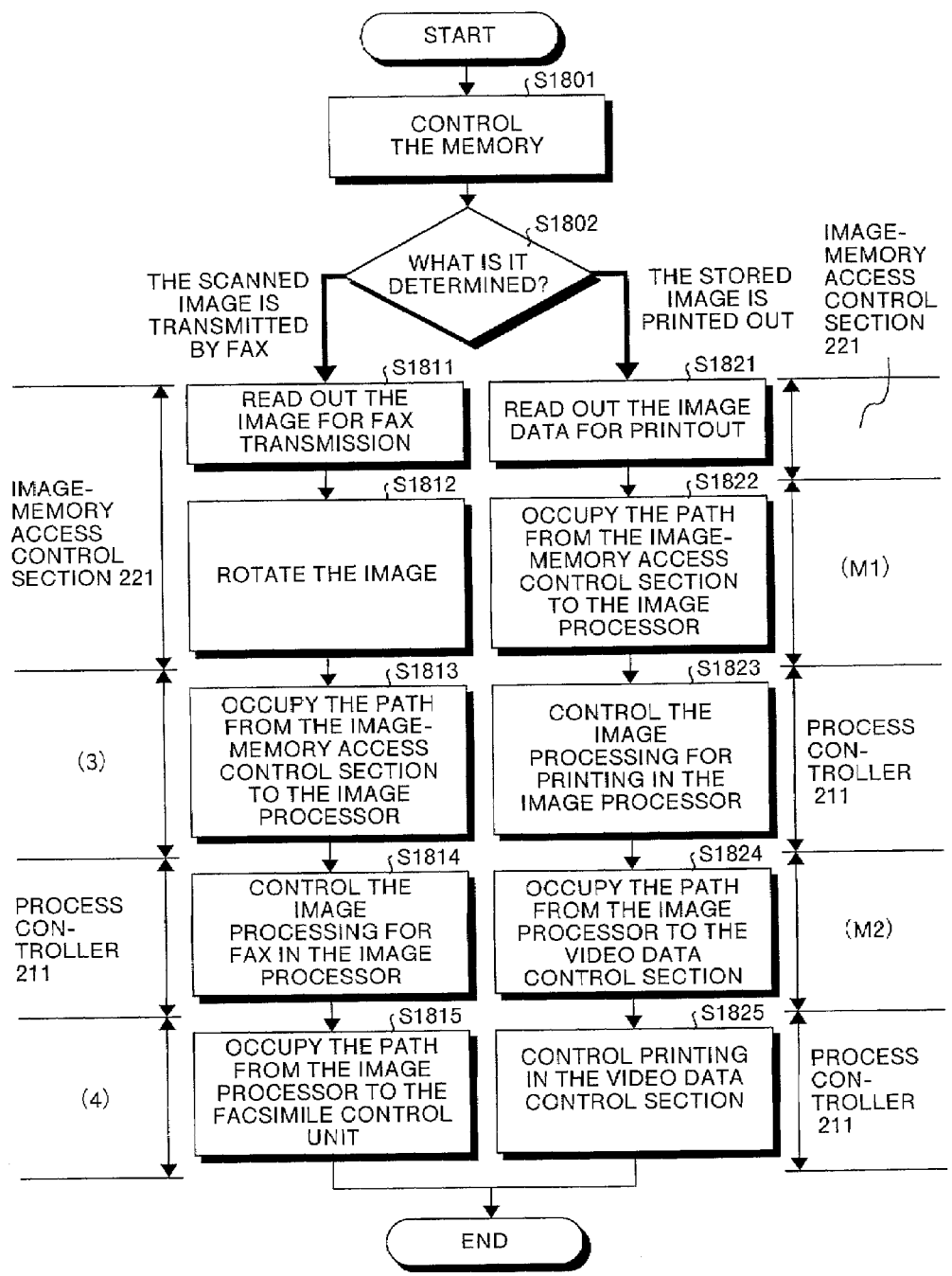
FIG. 18 is a flowchart showing the flow of the contents of the concurrent operation (Processing 6): facsimile transmission of an image subjected to scaling processing with image rotation, and printout of an image stored in the memory after being subjected to image processing in the image processing apparatus according to the embodiment.

Sixth Example of the Processing:

Contents of concurrent operation: facsimile transmission based on scaling processing with image rotation and performance of image processing on the image stored in the memory and printing it, are explained below. FIG. 17 shows respective flows of the concurrent operation in the block diagram, and FIG. 18 is a flowchart showing the flows of the concurrent operation.

This chart shows the concurrent operation of the processing shown in FIG. 7 and FIG. 8 and the processing shown in FIG. 13 and FIG. 14. There is a case where the two jobs conflict with each other for the video path from the image-memory access control section 221 to the image data control section 203 via the parallel bus 220 and for the arithmetic processing in the image processor 204. In this case, in order to perform the concurrent operation, the system controller 231 controls the access to the path, while the process controller 211 controls the operation in the image processor 204. Further, the system controller 231 issues instructions to control the process controller 211.

When the concurrent operation occurs, the system controller 231 controls accesses from the jobs to the memory, the video path, and the image processor 204. Data is not multiplexed for the video path, but the access rights are allocated to the jobs based on time division.

The system controller 231 controls the memory module 222 via the image-memory access control section 221 (step S1801) Further, the system controller 231 determines whether memory access is made for scaling of an image at the time of facsimile transmission or for reading data from the memory module 222 at the time of printing out (step S1802).

When the read-out image is to be transmitted by facsimile, the video path for which a conflict occurs is relinquished for facsimile transmission. That is, the image-memory access control section 221 reads out an image for facsimile transmission from the memory module 222 (step S1811) and also rotates the read-out image 90 degrees (step S1812).

The image is given, by the system controller 231, the occupation of the video path from the image-memory access control section 221 to the image data control section 203, and also the occupation of the video path from the image data control section 203 to the image processor 204 (step S1813), and the image data control section 203 transfers the image data to the image processor 204.

Subsequently, the image processor 204 downloads the parameters of the image processing for facsimile based on the instruction by the process controller 211 and performs the arithmetic processing (step S1814). The data is given, by the system controller 231, the occupation of the video path from the image processor 204 to the facsimile control unit 224 (step S1815).

Accordingly, the image data subjected to the arithmetic processing is transferred from the image processor 204 to the facsimile control unit 224 via the image data control section 203 through the parallel bus 220, and the facsimile control unit 224 transmits the image data by facsimile. It is required to occupy also the parallel bus 220, therefore, the processing for printing out is not executed during the processing for facsimile transmission.

On the other hand, when the stored image is to be printed out, the image-memory access control section 221 reads out the image data for printout from the memory module 222 (step S1821). The image data is given, under the control of the system controller 231, the occupation of the video path from the image-memory access control section 221 to the image data control section 203 and the occupation of the video path from the image data control section 203 to the image processor 204 (step S1822), and the image data for printout is transferred.

By an instruction from the system controller 231, the occupation of the image processor 204 that performs image processing for printing out is given to the data, so that the image processor 204 downloads the parameters of the image processing for printing out and performs arithmetic processing on the data according to an instruction from the process controller 211 (step S1823). The image data is then given the occupation of the video path from the image processor 204 to the video data control section 205 (step S1824), so that the image processor 204 transfers the image data, on which the arithmetic processing has been performed, to the video data control section 205.

The video data control section 205 provides pulse controls for pixels for printing out under the control of the process controller 211 (step S1825), and the image formation unit 206 reproduces the image. After the preferential time based on the time division has elapsed, the priority to the video path and the image processor 204 is canceled, and the path and the image processor 204 are relinquished.

Figure 19:
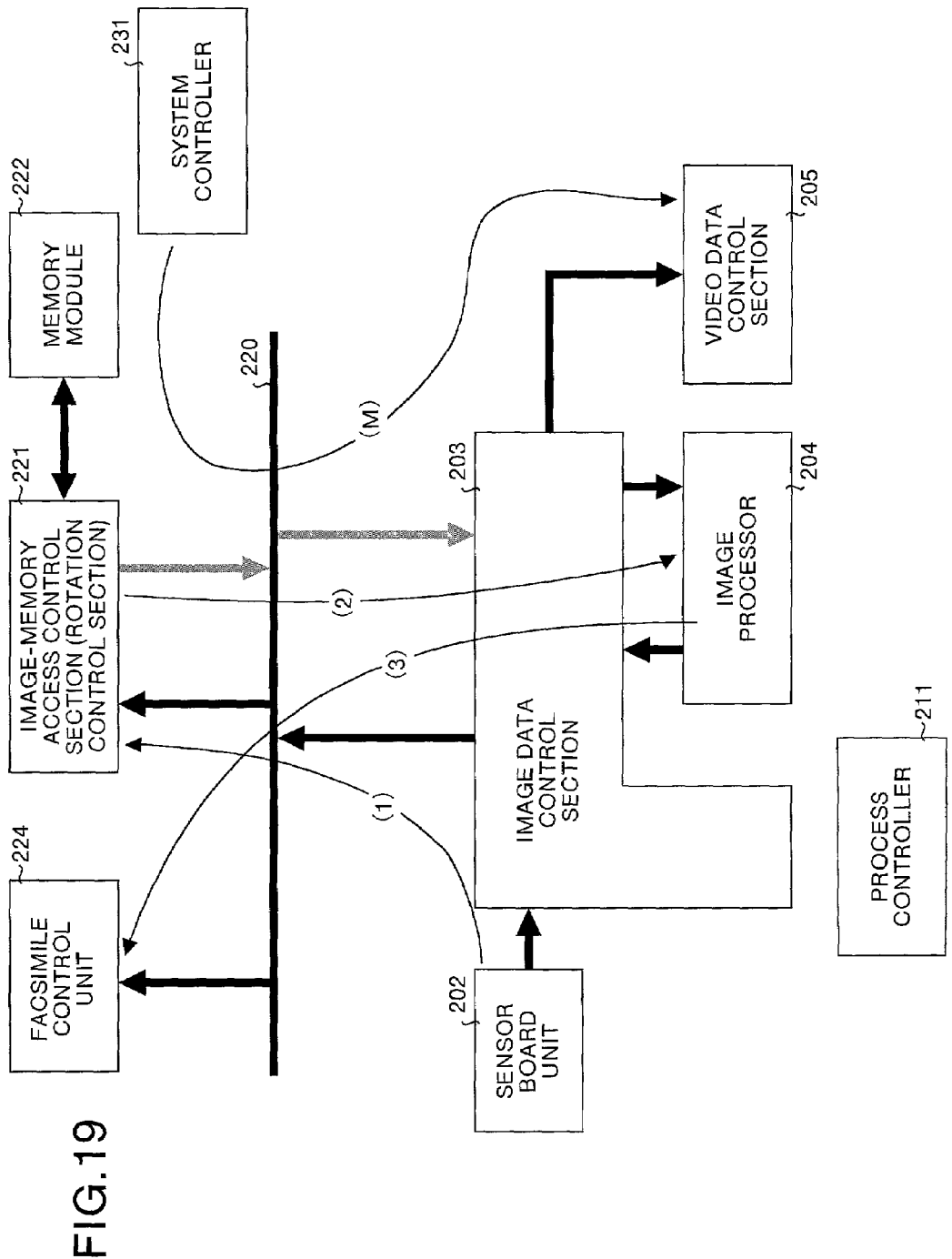
FIG. 19 is a block diagram for explaining respective flows of contents of concurrent operation (Processing 7): facsimile transmission of an image subjected to scaling processing in the image-memory access control section, and printout of an image as a result of processing within the memory in the image processing apparatus according to the embodiment.

Seventh Example of the Processing:

Contents of concurrent operation: facsimile transmission of an image subjected to scaling processing in the image-memory access control section 221 and printout of an image as a result of processing in the memory, are explained below. FIG. 19 shows respective flows of the concurrent operation in the block diagram, and FIG. 20 is a flowchart showing the flows of the concurrent operation.

This chart shows the concurrent operation of the processing shown in FIG. 9 and FIG. 10 and the processing shown in FIG. 11 and FIG. 12. When the two jobs conflict with each other for the video path from the image-memory access control section 221 to the image data control section 203 via the parallel bus 220, the system controller 231 controls the access to the path to perform the concurrent operation. When the concurrent operation occurs, the system controller 231 controls accesses from the jobs to the memory and the video path. Data is not multiplexed for the video path, but the access rights are allocated to the jobs based on time division.

Figure 20:
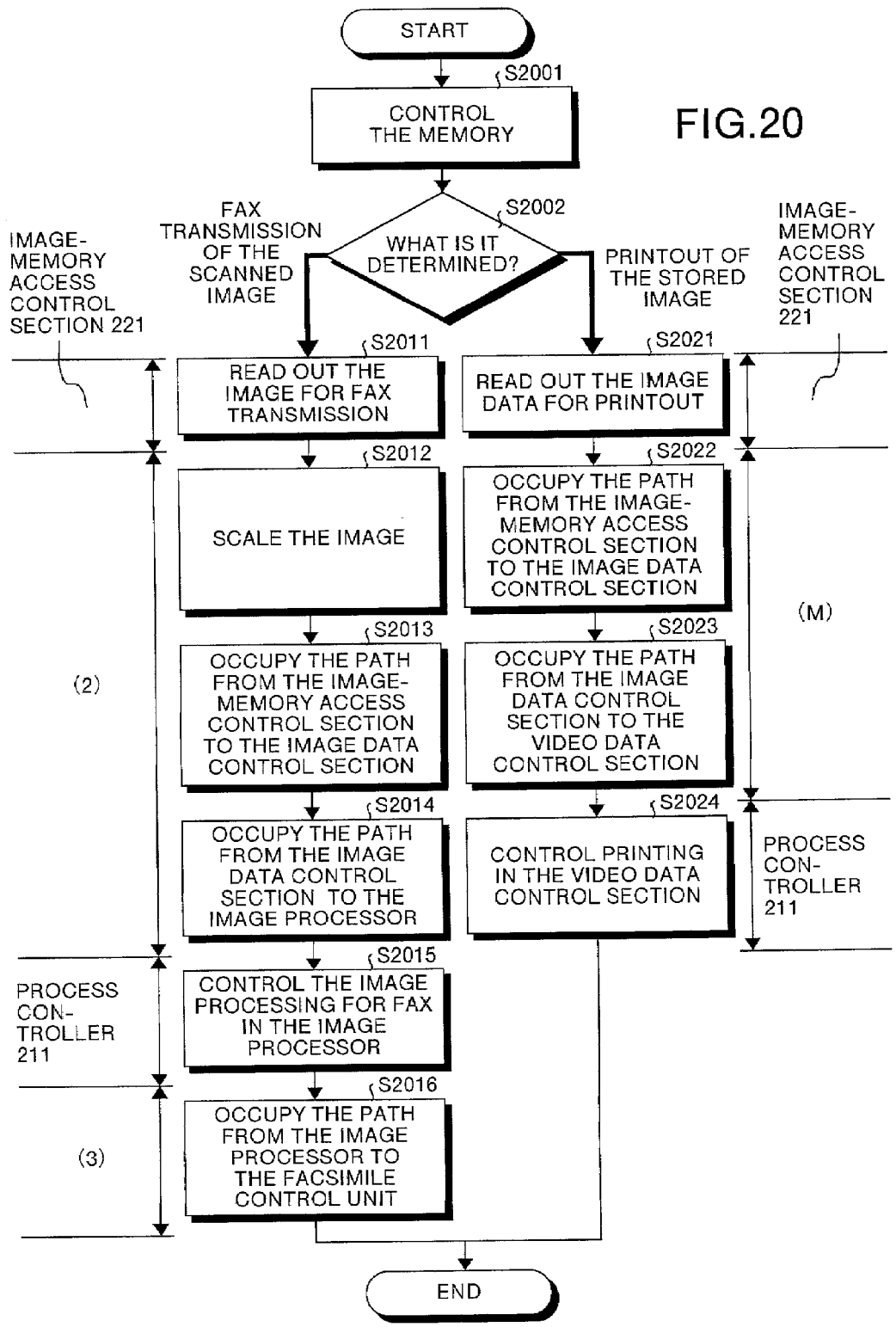
FIG. 20 is a flowchart showing the flow of the contents of the concurrent operation (Processing 7): facsimile transmission of an image subjected to scaling processing in the image-memory access control section, and printout of an image as a result of processing within the memory in the image processing apparatus according to the embodiment.

In FIG. 19 and FIG. 20, the system controller 231 controls the memory module 222 via the image-memory access control section 221 (step S2001). The system controller 231 then determines whether memory access is made for scaling of an image at the time of facsimile transmission or for reading data from the memory at the time of printing out (step S2002).

When the read-out image is to be transmitted by facsimile, the video path for which a conflict occurs is relinquished for facsimile transmission. That is, the image-memory access control section 221 reads out an image for facsimile transmission from the memory module 222 (step S2011) and performs two-dimensional scaling on the image according to an instruction for arithmetic from the system controller 231 (step S2012).

The image data is given, by the system controller 231, the occupation of the video path from the image-memory access control section 221 to the image data control section 203 (step S2013), so that the image-memory access control section 221 transfers the data as facsimile transmission. The image data is also given, by the system controller 231, the occupation of the path from the image data control section 203 to the image processor 204 (step S2014), so that the image data control section 203 transfers the data to the image processor 204.

The image processor 204 downloads the parameters of the image processing for facsimile according to an instruction of the process controller 211 to perform arithmetic processing (step S2015). The data is given, by the system controller 231, the occupation of the video path from the image processor 204 to the facsimile control unit 224 (step S2016). The, image data, on which the arithmetic processing has been performed, is transferred from the image processor 204 to the facsimile control unit 224 via the image data control section 203 through the parallel bus 220, and is further transmitted by facsimile. It is also required to occupy the parallel bus 220, therefore, the processing for printing out is not executed during the processing for facsimile transmission.

On the other hand, when the stored image is to be printed out, the image-memory access control section 221 reads out the image data for printout from the memory module 222 (step S2021). The image data is given, by the system controller 231, the occupation of the video path from the image-memory access control section 221 to the image data control section 203 (step S2022), and the data for printout is transferred to the image data control section 203.

The arithmetic processing on this data is not needed, therefore, the image data control section 203 transfers the image data to the video data control section 205 in response to reception of the occupation of the video path from the image data control section 203 to the video data control section 205 (step S2023). The video data control section 205 provides pulse-controls for pixels for printing out under the control of the process controller 211, and the video data control section 205 and the image formation unit 206 reproduce the image (step S2024). After the preferential time based on the time division has elapsed, the priority to the video path is canceled and the path is relinquished.

Figure 21:
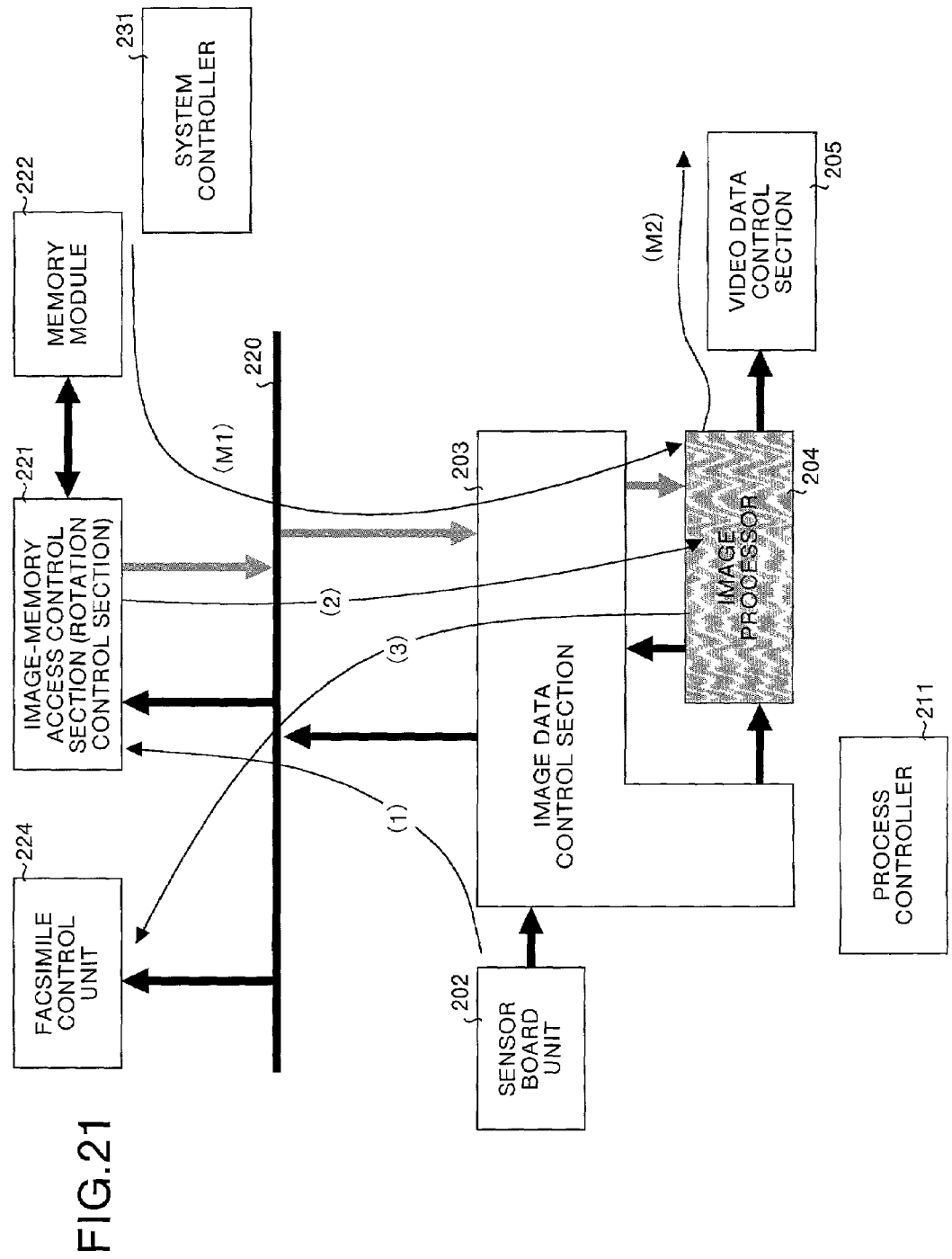
FIG. 21 is a block diagram for explaining respective flows of contents of concurrent operation (Processing 8): facsimile transmission of an image subjected to scaling processing in the image-memory access control section, and printout of an image stored in the memory after being subjected to image processing in the image processing apparatus according to the embodiment.

Eighth Example of the Processing:

Contents of concurrent operation: facsimile transmission of an image subjected to scaling processing in the image-memory access control section 221 and performance of image processing on an image stored in the memory and printout of the image, are explained below. FIG. 21 shows respective flows of the concurrent operation in the block diagram, and FIG. 22 is a flowchart showing the flows of the concurrent operation.

This chart shows the concurrent operation of the processing shown in FIG. 9 and FIG. 10 and the processing shown in FIG. 13 and FIG. 14. When the two jobs conflict with each other for the video path from the image-memory access control section 221 to the image data control section 203 via the parallel bus 220 and for the arithmetic processing in the image processor 204, in order to perform the concurrent operation, the system controller 231 controls the access to the path, while the process controller 211 controls the operation in the image processor 204.

Figure 22:
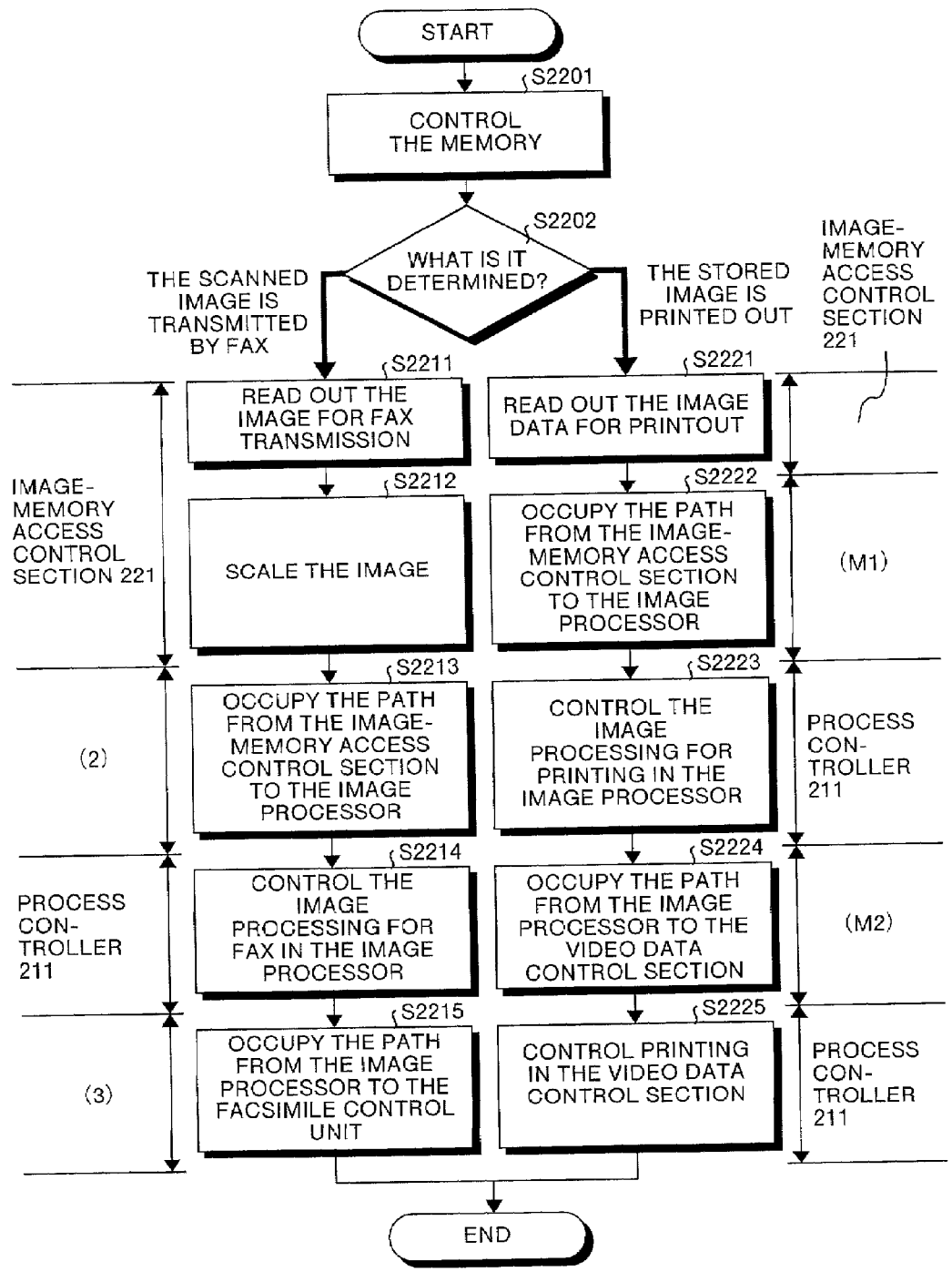
FIG. 22 is a flowchart showing the flow of the contents of the concurrent operation (Processing 8): facsimile transmission of an image subjected to scaling processing in the image-memory access control section, and printout of an image stored in the memory after being subjected to image processing in the image processing apparatus according to the embodiment.

In FIG. 21 and FIG. 22, the system controller 231 controls the memory module 222 via the image-memory access control section 221 (step S2201). The system controller 231 then determines whether memory access is made for scaling of an image at the time of facsimile transmission or for reading data from the memory at the time of printing out (step S2202).

When the read-out image is to be transmitted by facsimile, the video path for which a conflict occurs is relinquished for facsimile transmission. That is, the image-memory access control section 221 reads out an image for facsimile transmission from the memory module 222 (step S2211) and performs two-dimensional scaling on the image according to an instruction for arithmetic of the system controller 231 (step S2212).

The image data is given, by the system controller 231, the occupation of the video path from the image-memory access control section 221 to the image data control section 203 (step S2213), and also the occupation of the path from the image data control section 203 to the image processor 204 (step S2213) and is transferred to the image processor 204.

The image processor 204 downloads the parameters of the image processing for facsimile based on the instruction by the process controller 211 and performs the operation (step S2214). The data is given, by the system controller 231, the occupation of the video path from the image processor 204 to the facsimile control unit 224 (step S2215). The image data on which the operation has been performed is transferred from the image processor 204 to the facsimile control unit 224 via the image data control section 203 through the parallel bus 220, and the facsimile control unit 224 transmits the image data by facsimile. It is required to occupy also the parallel bus 220, therefore, the processing for printing out is not executed during the processing for facsimile transmission.

On the other hand, when the stored image is to be printed out, the image-memory access control section 221 reads out the image data for printout from the memory module 222 (step S2221). The image data is given, by the system controller 231, the occupation of the video path from the image-memory access control section 221 to the image data control section 203 and also the occupation of the video path from the image data control section 203 to the image processor 204 (step S2222), and the image data for printout is transferred.

By an instruction from the process controller 211, the occupation of the image processor 204 which performs image processing for printing out is given to the data, so that the image processor 204 downloads the parameters of the image processing for printing out and performs arithmetic processing on the data according to an instruction of the process controller 211 (step S2223) The image data is given the occupation of the video path from the image processor 204 to the video data control section 205 (step S2224), and the image data, on which the arithmetic has been performed, is transferred from the image processor 204 to the video data control section 205.

The video data control section 205 provides pulse controls for pixels for printing out under the control of the process controller 211 (step S2225), and the video data control section 205 and the image formation unit 206 reproduce the image. After the preferential time based on the time division has elapsed, the occupation of the video path and the image processor 204 is canceled, and the path and the image processor 204 are relinquished.

As explained above, according to the embodiment, the image processing apparatus comprises the image data control section 203 and the system controller 231. More specifically, the image data control section 203 is connected to the scanning unit 201/the sensor board unit 202 for scanning image data, and/or the image-memory access control section 221 for controlling the image memory so as to write or read image data in or from the image memory, and/or the image processor 204 for subjecting image data to image processing such as editing. The image data control section 203 is also connected to the video data control section 205/the image formation unit 206 for writing image data on paper or the like, and/or the facsimile control unit 224 for transmitting and receiving image data with an external device. The image data control section 203 receives first image data scanned-in by the scanning unit 201/the sensor board unit 202, and/or second image data read-out by the image-memory access control section 221, and/or third image data subjected to image processing by the image processor 204, and/or fourth image data received by the facsimile control unit 224. The image data control section 203 transmits the first image data and/or the second image data and/or the third image data and/or the fourth image data to the image-memory access control section 221 and/or the image processor 204 and/or the video data control section 205 and/or the facsimile control unit 224. Further, the system controller 231 controls so as to switch an access right of the path to be used when image data is transmitted or received between the units.

Therefore, when image data to be subjected to different operations is transmitted or received, collision between the image data is avoided, so that the image data can efficiently be transmitted or received and its transmission/reception time can be reduced. Accordingly, the processing can efficiently be performed on the image data in the case of concurrent operation.

According to the embodiment, the image-memory access control section 221 subjects the image data to be written in or the read-out image data to image processing such as editing. Therefore, pre-processing for the image processing can be performed on the image data before being stored in the memory module 222, or the image data stored in the memory module 222 before it is transmitted to another unit.

Further, the image-memory access control section 221 subjects the image data to be written in or the read-out image data to the processing for image rotation. Therefore, the image-memory access control section 221 shares a part of the image processing that should be performed by the image processor 204, so that the load on the image processor 204 can be reduced by the shared amount, thus reducing the processing time as the entire processing.

Further, the image-memory access control section 221 subjects the image data to be written in or the read-out image data to scaling processing. Therefore, the image-memory access control section 221 shares a part of the image processing that should be performed by the image processor 204, so that the load on the image processor 204 can be reduced by the shared amount, thus reducing the processing time as the entire processing.

Further, when accesses to the path by different image data conflict with one another, the path is switched based on time division according to an instruction of the system controller 231. Therefore, the image data in conflict with one another can efficiently be transmitted or received, thus reducing the transmission or reception time.

Further, the image processor 204 controls image processing based on time division when accesses to the path by different image data conflict with one another. Therefore, the image processing can efficiently be performed on the image data in conflict with one another, thus reducing the processing time.

Further, the system controller 231 provides controls for switching of the video path, and the process controller 211 controls image processing. Therefore, the two controllers can share the control for switching and the control for image processing.

Figure 23:
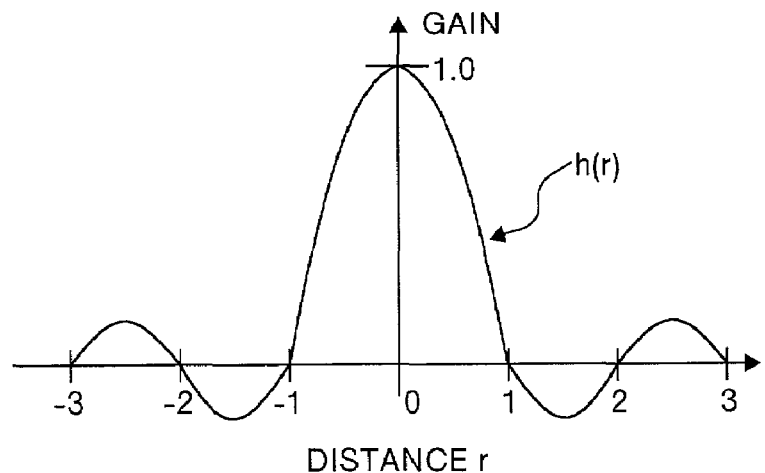
FIG. 23 shows the outline of an interpolation function.

The interpolation function may be explained as follows. FIG. 23 shows the outline of the interpolation function. Sampling of analog signals are performed based on a sampling theorem at a repetition frequency more than twice of the maximum frequency included by a continuous time signal, and reflected distortion is not produced.

Scaling of the image data is performed by interpolating required data through re-sampling of the sampling signals. If convolution arithmetic is performed by a sampling function h(r) shown in FIG. 23, a continuous signal is completely restored. In the processing for enlargement, numbers of re-sampling points are set and data is restructured. In a case of reduction, the sampling space is widened and sampling data is reduced.

A sampling point r takes a discrete value in the digitized data, but a variance sampling point r' is not necessarily an integer. Assuming that digitized input data is f(r) and re-sampling data is g(r), g(r) is calculated by the following equation.

$$g(r)=f*h(r)$$

Where the sign * represents convolution arithmetic. The value is the total sum of products obtained between the sampling function and respective peripheral data.

The values are one-dimensionally shown in FIG. 23, but a gain characteristic concerning a distance r is held in a two-dimensional plane. If this was shown although it is not shown in the figure, a stereoscopic three-dimensional form would be obtained.

There are some approximation methods for generating interpolation data other than calculation based on the sampling function. In many cases, an approximation equation is used in particular because of restriction by the configuration of hardware. For example, as one of the approximation methods, there is a method for replacing proximate pixels. There are also a method for linearly distributing an inter-proximate pixel distance or a tertiary-function convolution arithmetic method concerning the sampling function.

The method for replacing proximate pixels is performed by replacing data at the re-sampled point with original input data the closest to the point. The method for linearly distributing an inter-proximate pixel distance is performed by distributing a density level according to a re-sampled point and a distance between adjacent pixels of the original image data. The tertiary-function convolution arithmetic method is performed by making approximations of the sampling function based on a trigonometric function with the tertiary function, and using the values for interpolation calculation of the density distribution to adjacent pixels with respect to a re-sampled position. This is approximation calculation for configuring hardware and based on trading off of image quality against the amount of hardware configurations.

Figure 24:
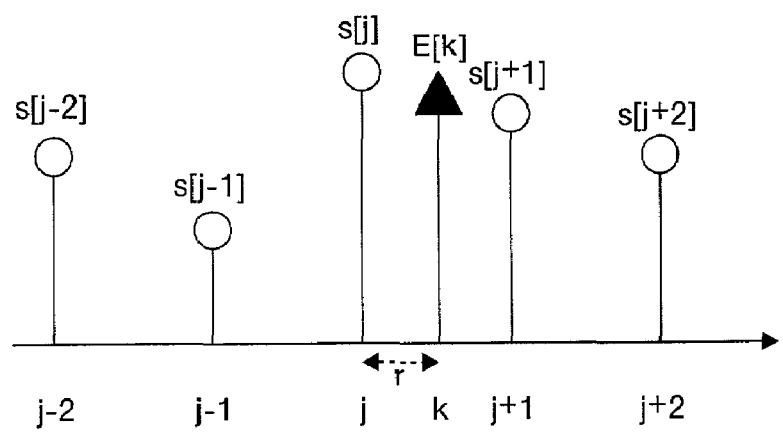
FIG. 24 shows the outline of interpolation for one-dimensional sampling positions.
Figure 25:
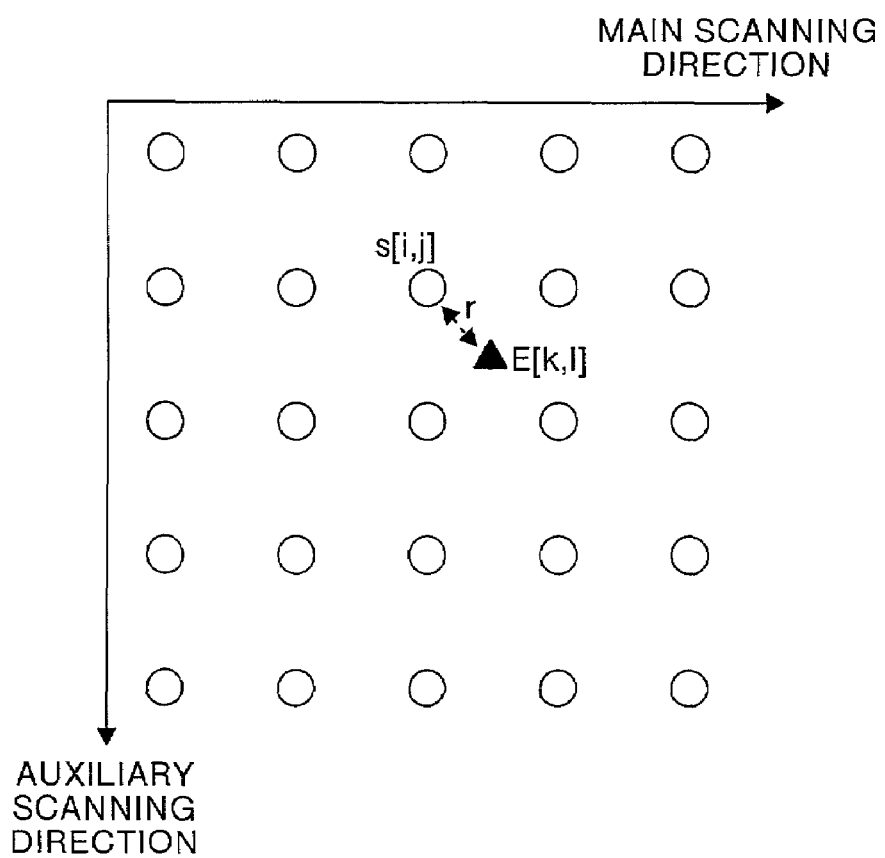
FIG. 25 shows the outline of interpolation for two-dimensional sampling positions.

FIG. 24 and FIG. 25 show respective outlines of interpolation for one-dimensional sampling positions and two-dimensional sampling positions. Restriction to approximation by the hardware configuration is eliminated in arithmetic processing by using an arithmetic processor and a controller. A range of compensation for arithmetic accuracy in a calculation time is restricted, but accuracy in calculation is improved in a programmable configuration. However, a pre-processing circuit within the image data control section 203 is configured with hardware, therefore, the arithmetic accuracy does not always match the processing for programmable arithmetic.

In FIG. 24, a white circle represents original image data, and the density at its position j is represented by S[j]. A black triangle indicates interpolation data E[k] at a re-sampled point k. The data E[k] is obtained by multiplying S[j] by a weight factor h(r) based on a distance r between k and j and obtaining the total sum of products obtained within a range as far as there is a particular correlation between pixels.

In FIG. 25, the original image S[i, j] is sampled equally spaced in the main scanning direction and the auxiliary scanning direction. An interpolation pixel E [k, l] at a sampling point is represented by a black triangular point.

The pixel E[k, l] is obtained by multiplying S[i, j] by a weight factor h(r) based on each distance r from E[k, l] to S[i, j], and obtaining the total sum of products obtained within a range of a plane as far as there is a correlation between the pixel and peripheral pixels.

D The distance r is divided in the main scanning direction and the auxiliary scanning direction, and can be represented by a product between a sampling function concerning the main scanning direction and a sampling function for the auxiliary scanning direction. Vector information for the distance is divided, weights based on the sampling functions for the axial directions are calculated to obtain a product of them. In the range where there is the pixel correlation, weight calculation for the original image is performed to obtain the total sum of the values, thus interpolation data is calculated.

A re-sampled position is calculated for enlargement or reduction, weight calculation based on a sampling function is performed, and convolution arithmetic is executed. For a range of calculation, when the programmable processor is used, restriction to the calculation due to restriction by the hardware does not occur, so that re-sampling calculation with high accuracy can be performed.

Figure 26:
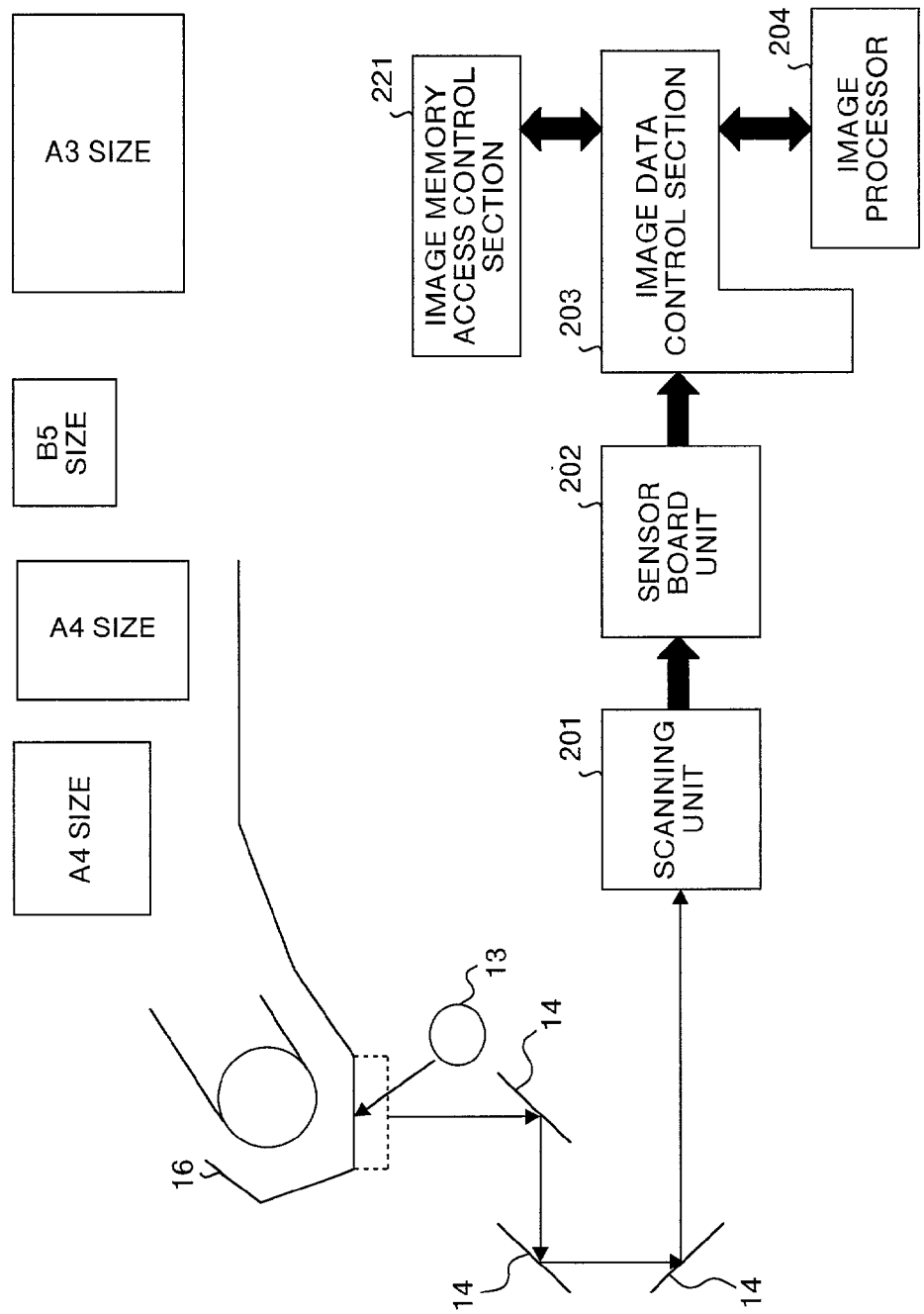
FIG. 26 schematically shows a flow of data when documents of different sizes are scanned by using the sheet-through type auto document feeder in the embodiment.

The outline of the processing for scanning a document using the sheet-through type auto document feeder in the embodiment is explained below. FIG. 26 schematically shows a flow of data when documents of different sizes are scanned in by using the sheet-through type auto document feeder in the embodiment.

Figure 27:
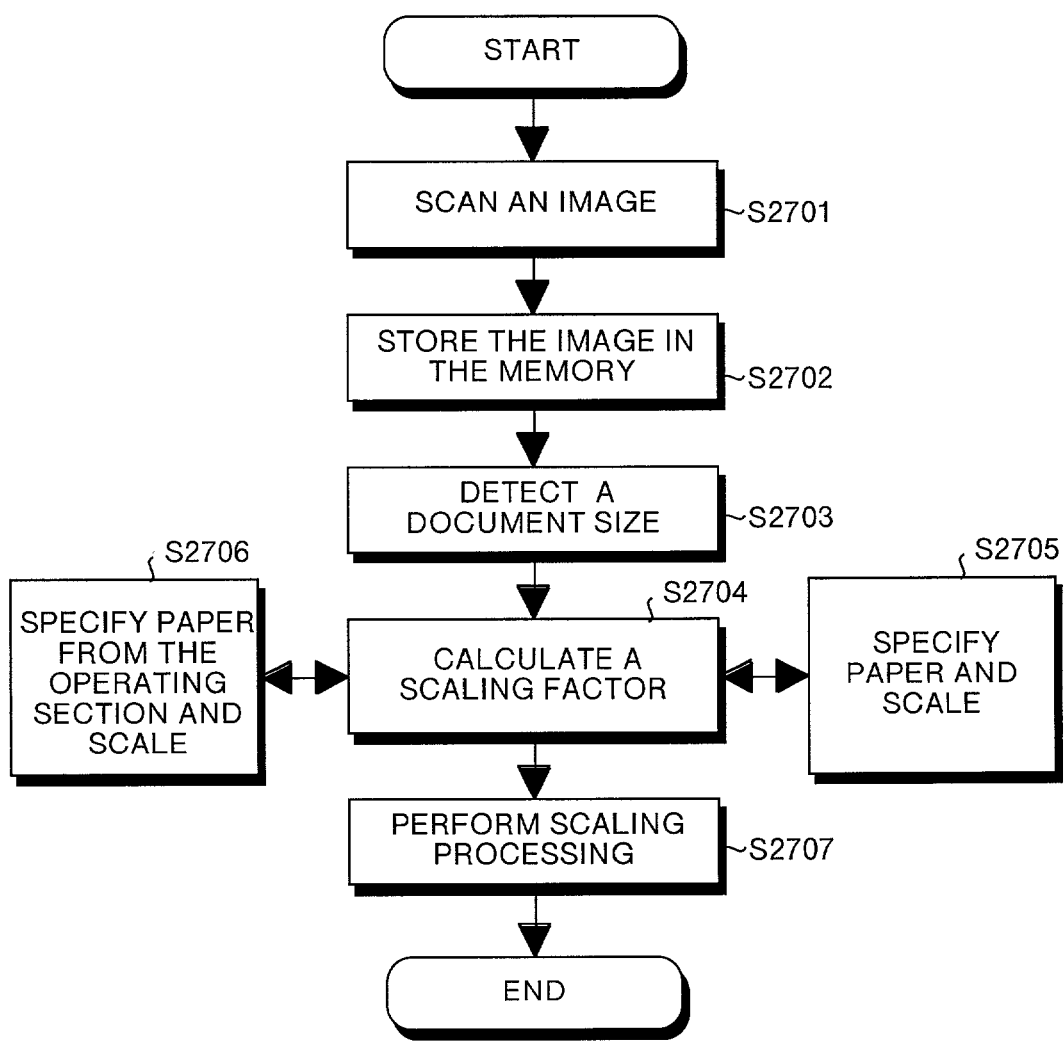
FIG. 27 is a flowchart showing the processing for scanning documents of different sizes by using the sheet-through type auto document feeder in the embodiment.

In FIG. 26, reference numeral 13 represents the illumination lamp, reference numeral 14 represents the mirror group, and reference numeral 16 represents the sheet-through type auto document feeder. FIG. 27 is a flowchart showing the processing for scanning in documents of different sizes by using the sheet-through type auto document feeder in the embodiment.

As shown in FIG. 26, when documents of different sizes like A4 lateral, A4 longitudinal, B5 lateral, or A3 lateral are loaded on the sheet-through type auto document feeder, setting of a scaling mode is not generally initialized even if the document size is changed. Therefore, in the embodiment, as shown in FIG. 27, all the documents are scanned in their unmagnified sizes (step S2701). The image data of the scanned documents are stored in the memory module 222 (step S2702).

At that time, information for the scanned document size is detected, and the information is stored in the memory module 222 together with the corresponding image data. For example, the size information is extracted by a mechanical sensor of the document feeder. The extracted size information is added to the image data as an index. Alternatively, the document size is detected based on a difference between image density and background density on the scanned surface of the document, and the detected document size is added to the image data as a signal indicating a region.

In order to calculate a desired scaling factor, the size information added to the image data is extracted from the memory module 222 (step S2703). The scaling factor is calculated based on the document size (step S2704). The scaling factor is set based on two types of specifying methods. One of them is setting for scaling by specifying paper (step S2705).

In the case of paper-specified scaling, scaling factors in the main scanning and the auxiliary scanning are calculated from the scanned document size so as to be adequate to paper size specified for a destination of output. The other one is setting of a scaling factor by being specified through the operation panel 234 of the operating section (step S2706).

When the scaling factor is calculated, parameters for scaling control are set in a processing module based on the scaling factor, and the image data is interpolated and scaled (step S2707). If the document is reduced to 50% in the main and the auxiliary scanning directions, pixels are re-sampled every other pixel in the respective directions. If the document is enlarged to 200% in the main and the auxiliary scanning directions, pixels are re-sampled at ½ of a pitch between pixels in the respective directions.

Figure 28:
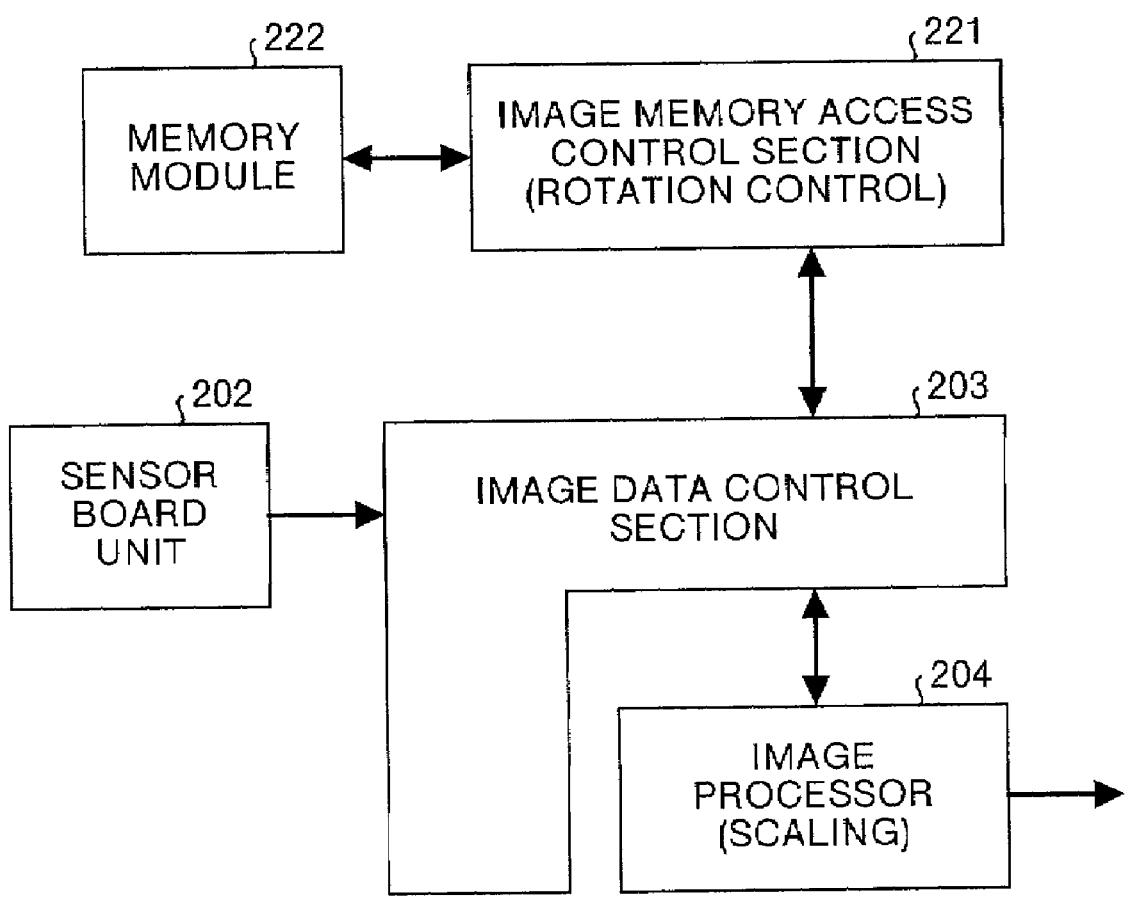
FIG. 28 schematically shows a flow of data in the electrical scaling processing in the embodiment.

The processing for electrical scaling (first example) of the embodiment is explained in detail below. FIG. 28 schematically shows a flow of data in the electrical scaling processing in the embodiment. The image processor 204 has a built-in convolution arithmetic module for performing scaling processing in a one-dimensional direction. This convolution arithmetic module is configured in a programmable system.

Thus, the image processor 204 has a function of a re-arranged data calculation unit (scaling unit). The image data control section 203 performs only a function of data interface. The image-memory access control section 221 controls memory access and rotates image data 90 degrees. Thus, the image-memory access control section 221 has a function of an image rotation unit.

Figure 29:
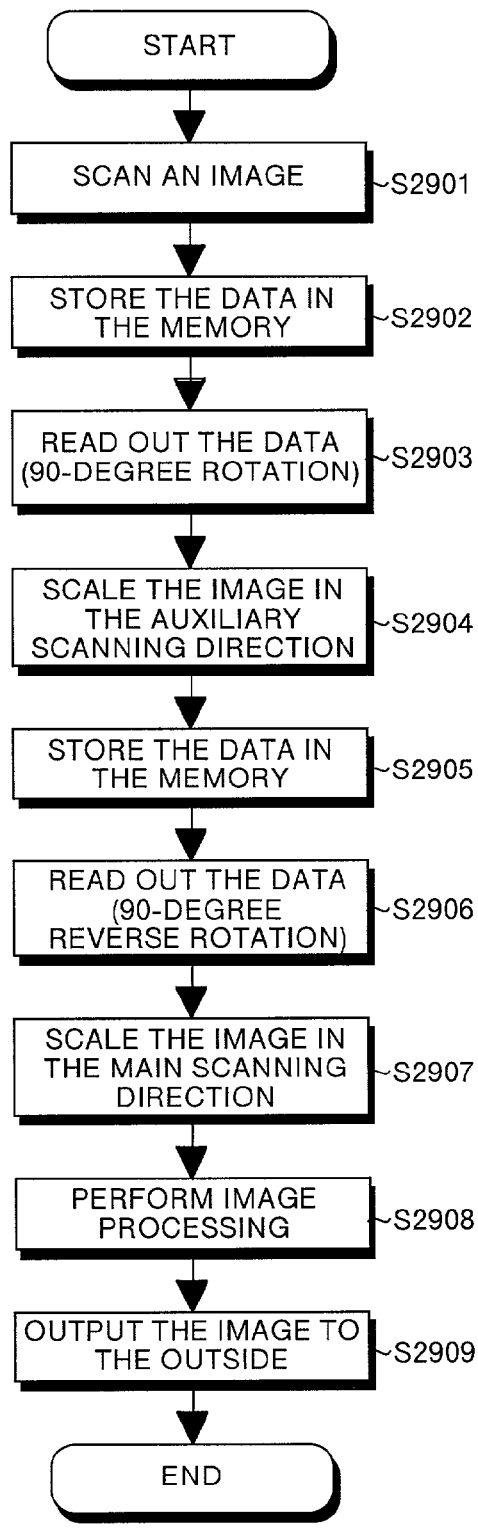
FIG. 29 is a flowchart showing a sequence of the electrical scaling processing in the embodiment.

FIG. 29 is a flowchart showing a sequence of the electrical scaling processing (first example) of the embodiment. The sensor board unit 202 scans all documents in their unmagnified sizes (step S2901). At that time, the sensor board unit 202 previously corrects degradation in images due to non-uniformity of illumination by executing shading correction on the images.

The scanned image data is stored in the memory module 222 managed by the image-memory access control section 221 (step S2902). At that time, the image-memory access control section 221 detects a document size, and stores the document size as additional information in the memory module 222 together with its image data.

When reading image data (step S2903), the image-memory access control section 221 rotates the read-out image data 90 degrees. When the document is scanned using the sheet-though type auto document feeder, the image-memory access control section 221 performs the processing for mirroring on the image reversed left to right, and then rotates the image 90 degrees.

The image-memory access control section 221 transfers the rotated image data to the image processor 204 via the image data control section 203. The image processor 204 performs interpolation arithmetic for a re-sampled position, and executes scaling processing in the auxiliary scanning direction (step S2904). The process controller 211 calculates parameters of interpolation arithmetic based on how the image data is stored and its scaling range, and previously completes desired settings within the image processor 204. Thus, the process controller 211 has a function of a scaling factor calculation unit.

The image data on which interpolation arithmetic has been performed is again stored in the memory module 222 controlled by the image-memory access control section 221 via the image data control section 203 (step S2905). At this time, the image-memory access control section 221 can perform the processing for MTF correction in the same direction as the scaling direction on the data.

The image data (which has been scaled only in the auxiliary scanning direction) stored in the memory module 222 is again read out for scaling in the main scanning direction (step S2906). The read-out image data is the data rotated 90 degrees at step S2903, therefore, the image-memory access control section 221 reversely rotates the data 90 degrees. That is, the image data is corrected to the same orientation as that of the original document.

The image-memory access control section 221 transfers the image data to the image processor 204 via the image data control section 203, and the image processor 204 performs scaling processing on the image in the main scanning direction (step S2907). The scaling processing is performed by downloading setting values for scaling in the main scanning from the process controller 211 and calculating the image data based on the processing for interpolation arithmetic.

The image processor 204 performs image processing such as MTF correction or gradation processing on the image data, on which the electrical scaling processing in the main and the auxiliary scanning directions has been finished, in the programmable arithmetic processor by downloading a required sequence of processing from the process controller 211 (step S2908). The image processor 204 then outputs the data on which the image processing has been completed to the outside thereof (step S2909). When the image data is output to paper, the video data control section 205 provides pulse controls and the image formation unit 206 forms an image.

As explained above, according to the first example, documents of different sizes are scanned in the scanning unit 201 and the sensor board unit 202, the scanned image data is once stored in the memory module 222, and the image data is electrically scaled in the main and the auxiliary scanning directions. Therefore, even if there are documents of different sizes, the documents can be scanned by using the sheet-though type auto document feeder. Thus, a conventional mechanical scaling mechanism which controls a document feed rate is no longer needed.

Further, according to the first example, the image processor 204 performs scaling processing in a one-dimensional direction on the image, while the image-memory access control section 221 rotates the image data 90 degrees, therefore, a scaling mechanism can be integrated into one unit. Thus, making effective use of the processing module.

Figure 30:
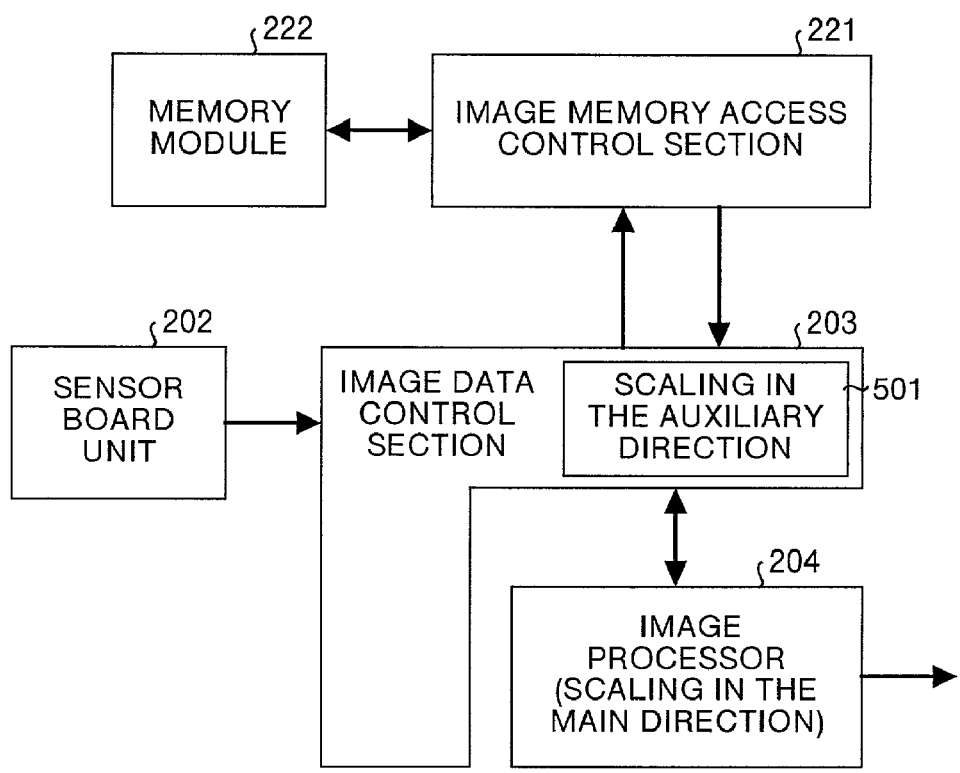
FIG. 30 schematically shows a flow of data in another type of electrical scaling processing in the embodiment.

FIG. 30 schematically shows a flow of data in another type of electrical scaling processing (second example) of the embodiment. The second example is different from the first example in points that the image data control section 203 has a built-in module 501 for performing scaling processing in the auxiliary scanning direction, the module 501 performs scaling processing in the auxiliary scanning direction, the image processor 204 performs scaling processing in the main scanning direction, and the image-memory access control section 221 does not control rotation of the image data.

Accordingly, in the second example, the module 501 has a function of a first re-arranged data calculation unit, while the image processor 204 has a function of a second re-arranged data calculation unit. The rest of the configuration is the same as that of the first example, thus overlapping explanation is omitted, and only different points are explained below.

Figure 31:
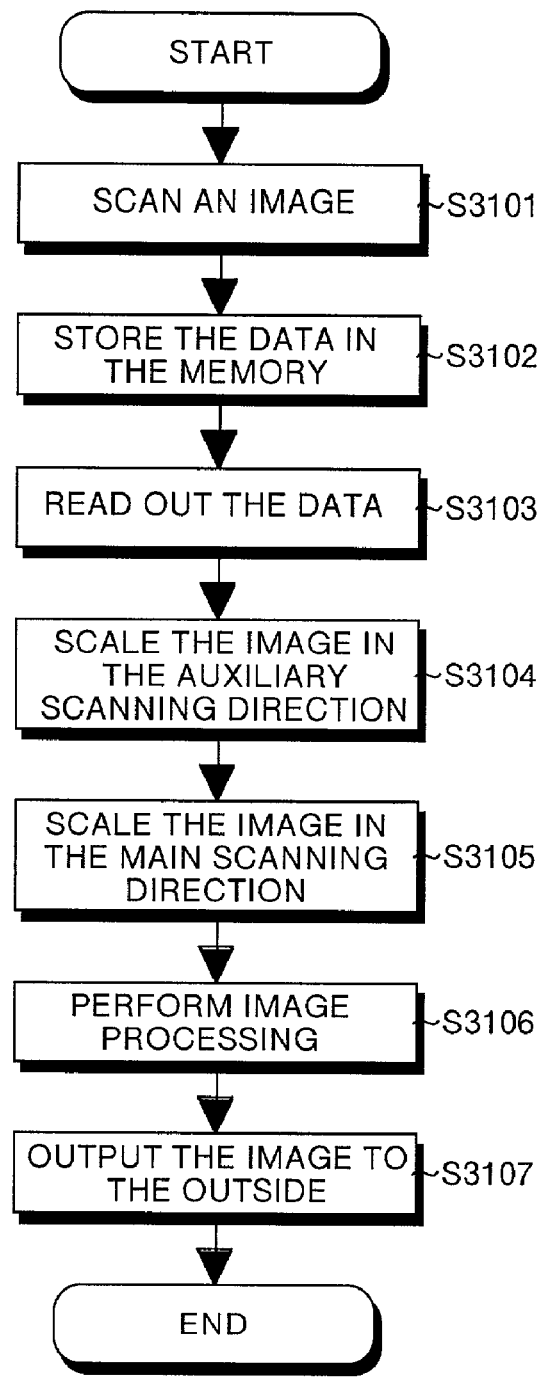
FIG. 31 is a flowchart showing a sequence of another type of electrical scaling processing in the embodiment.

FIG. 31 is a flowchart showing a sequence of electrical scaling processing as a third example. No matter which is used: the sheet-though type auto document feeder and the platen mode, a document is scanned in its unmagnified size (step S3101). The scanned image data is stored in the memory module 222 through the image data control section 203 and the image-memory access control section 221 (step S3102). At that time, the image-memory access control section 221 detects the size of the document and stores the information concerning the document size as an index in the memory module 222 together with the corresponding image data. The process controller 211 calculates parameters for arithmetic processing from the size information concerning the index and specified conditions concerning scaling, and sets the parameters in the image data control section 203 and the image processor 204.

The image-memory access control section 221 reads out the image data stored in the memory module 222 (step S3103). The image data control section 203 performs scaling processing in the auxiliary scanning direction on the read-out image data (step S3104). The image data control section 203 then transfers the image data to the image processor 204, where scaling processing in the main scanning direction is performed on the image data (step S3105).

The arithmetic processor of the image processor 204 performs specified image processing on the image data, on which scaling processing in the main and the auxiliary scanning directions has been performed, based on another image processing program set by the process controller 211 (step S3106). The image processor 204 then outputs the data on which image processing has been completed to the outside thereof (step S3107).

As explained above, according to the second example, the image data control section 203 performs scaling processing in the auxiliary scanning direction on data, while the image processor 204 performs scaling processing in the main scanning direction on the data, therefore, the scaling processing in the auxiliary scanning direction and the scaling processing in the main scanning direction can concurrently be carried out. Accordingly, the concurrent operation of the system can be managed without reduction of the processing performance, thus controlling efficiency of the concurrent operation.

More specifically, supposing two sheets of document are scanned, when scaling processing in the auxiliary scanning direction on a primarily scanned first document is finished and the image data is transferred from the image data control section 203 to the image processor 204, the image data control section 203 can immediately perform scaling processing in the auxiliary scanning direction on a second document subsequently scanned.

When the image-memory access control section 221 is configured to control rotation of image data in the same manner as the first example, while the image processor 204 is executing the image processing on the first document, the image data control section 203 may transfer the image data whose scaling processing in the auxiliary scanning direction has been finished to the image-memory access control section 221, where the image data is rotated 90 degrees, and then the image data control section 203 may perform again scaling processing in the main scanning direction on the image data.

Figure 32:
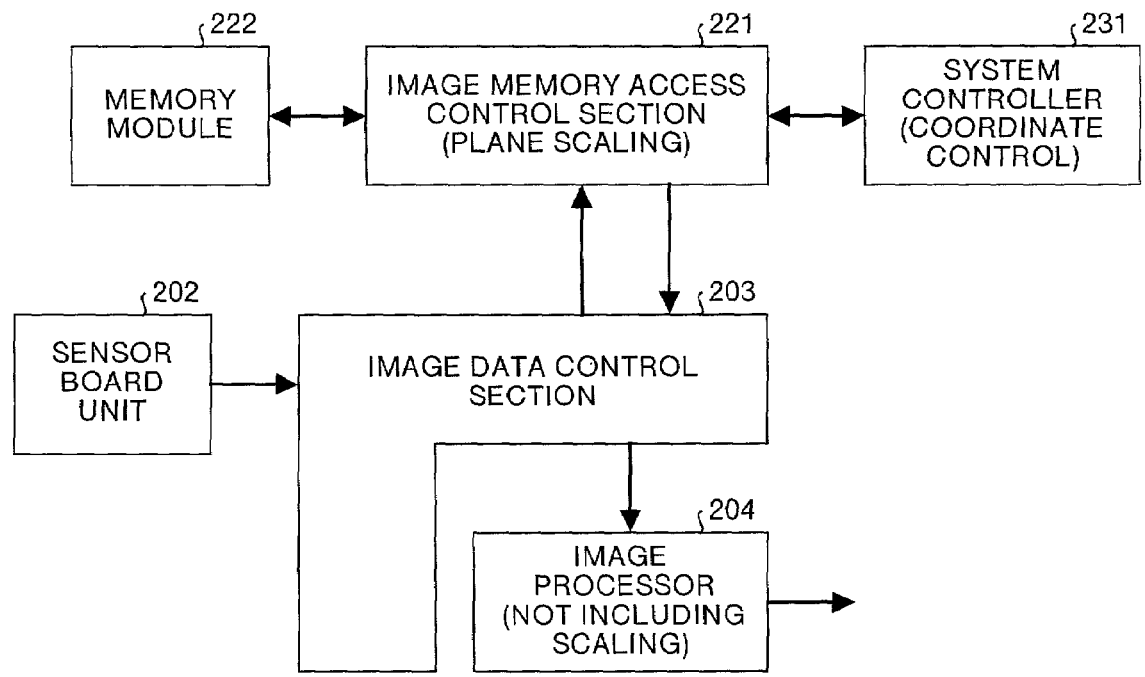
FIG. 32 schematically shows a flow of data in still another type of electrical scaling processing in the embodiment.

FIG. 32 schematically shows a flow of data in another type of electrical scaling processing (third example) of the embodiment. The third example is different from the first example in points that the image-memory access control section 221 does not control image rotation, the image processor 204 does not perform scaling processing, and the system controller 231 performs plane scaling processing based on controls for coordinates provided for re-sampling and controls for memory access by the image-memory access control section 221.

Thus, in the third example, the image-memory access control section 221 and the system controller 231 function as a scaling unit. The rest of the configuration is the same as that of the embodiment, therefore, overlapping explanation is omitted, and only different points are explained below.

Figure 33:
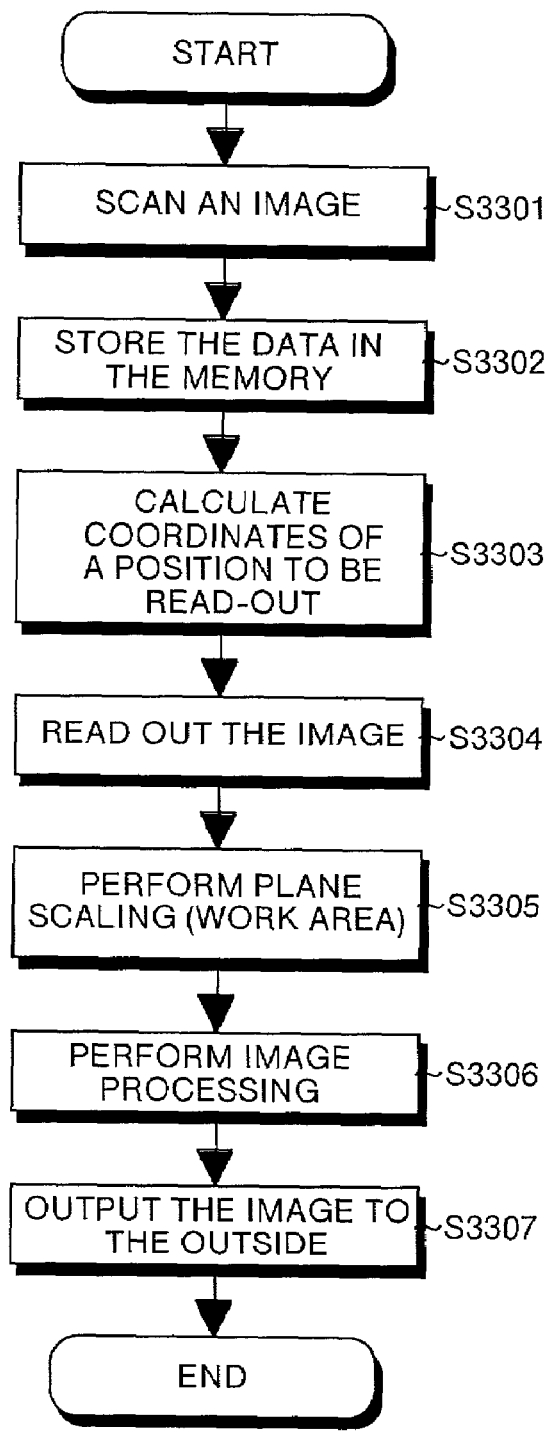
FIG. 33 is a flowchart showing a sequence of still another type of electrical scaling processing in the embodiment.

FIG. 33 is a flowchart showing a sequence of electrical scaling processing as the third example. A document is scanned in its unmagnified size (step S3301). The scanned image data is stored in the memory module 222 through the image data control section 203 and the image-memory access control section 221 (step S3302).

At that time, the image-memory access control section 221 detects the size of the document and stores the information concerning the document size as an index in the memory module 222 together with the corresponding image data. The system controller 231 calculates and obtains the position of a pixel to be read out for re-sampling from the index concerning the image size and specified conditions for scaling (step S3303).

The image-memory access control section 221 then reads out the original image data remaining two-dimensionally arranged from the memory module 222 (step S3304). The arithmetic processing for plane scaling processing is programmably performed based on arithmetic processing in the system controller 231 and controls for memory access in the image-memory access control section 221 (step S3305).

The image-memory access control section 221 transfers the image data whose scaling processing has been finished to the image processor 204 via the image data control section 203, and the arithmetic processor executes image processing on the image data (step S3306). The image processor 204 then outputs the image data to the outside thereof (step S3307).

According to the third example, the jobs are divided and shared so that the system controller 231 and the image-memory access control section 221 perform plane scaling processing and the image processor 204 performs image processing such as MTF correction and gradation processing. Therefore, the system performance can be maintained in pipeline processing of the image data.

The system controller 231 and the process controller 211 can control the division of the system for concurrent operation. Thus, the load of the processing is decentralized and efficiency of the whole processing is improved.

Figure 34:
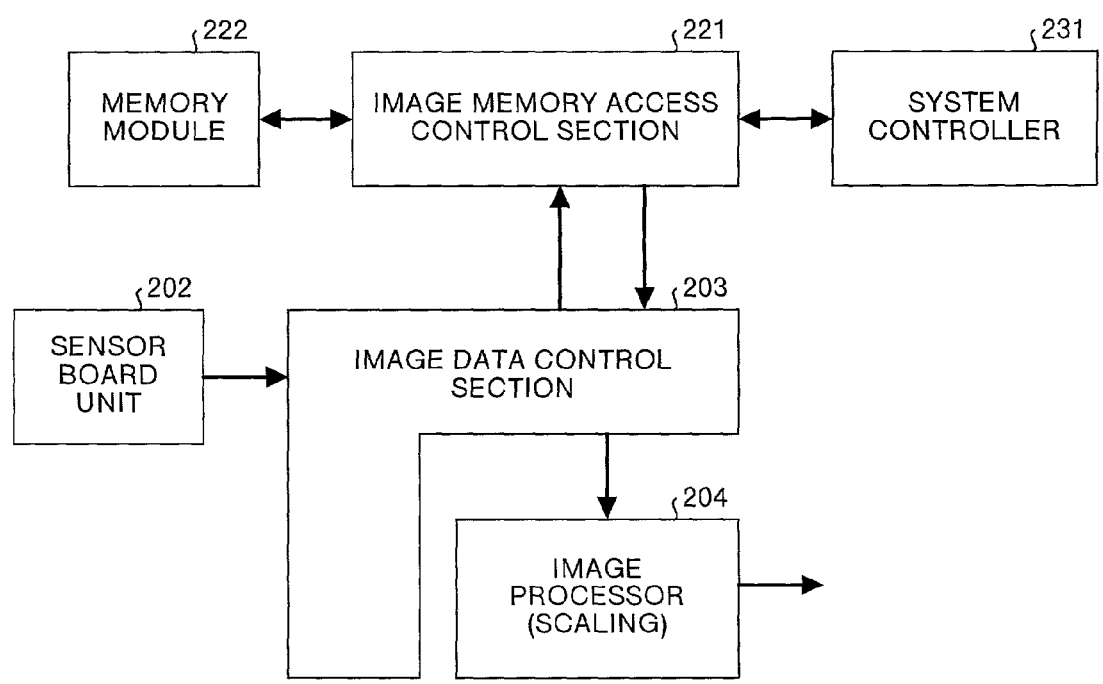
FIG. 34 schematically shows a flow of data in still another type of electrical scaling processing in the embodiment.

FIG. 34 schematically shows a flow of data in another type of electrical scaling processing (fourth example) of the embodiment. The fourth example is different from the first example in points that the image-memory access control section 221 does not control image rotation and the system controller 231 calculates coordinates to be read-out for computation of re-sampling data.

Thus, the system controller 231 has a function of a reference data reading unit. The rest of the configuration is the same as the first example, therefore, overlapping explanation is omitted, and only different points are explained below.

Figure 35:
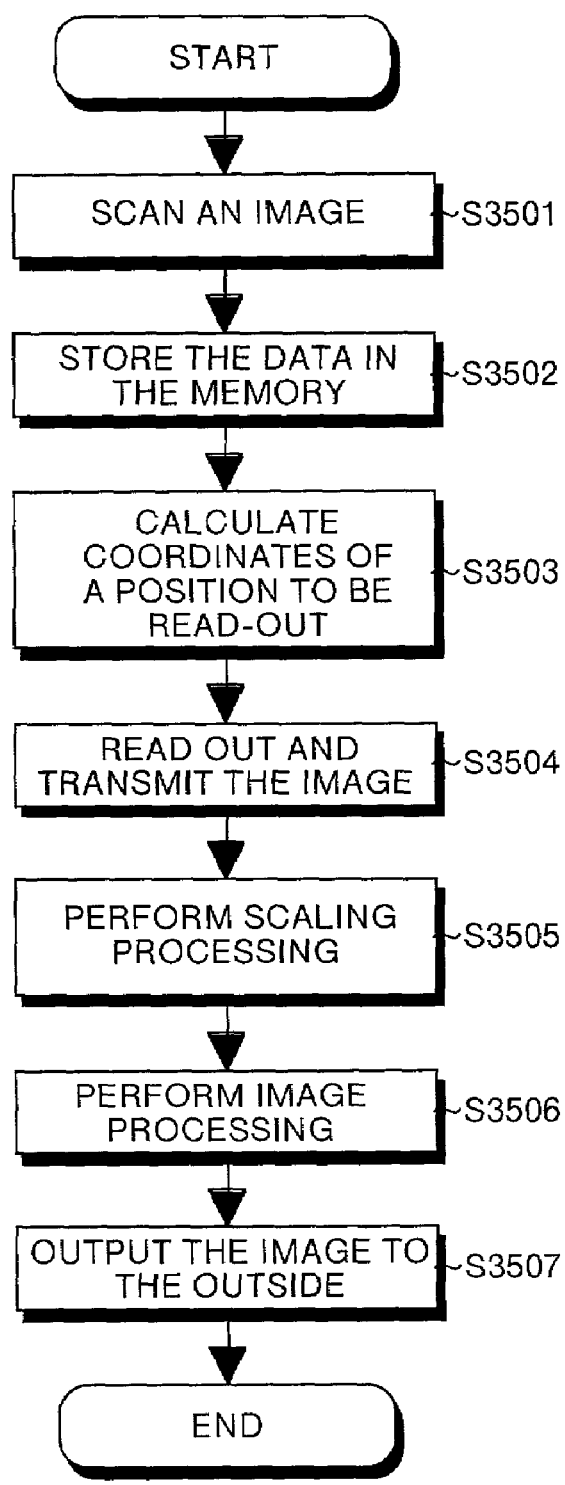
FIG. 35 is a flowchart showing a sequence of still another type of electrical scaling processing in the embodiment.

FIG. 35 is a flowchart showing a sequence of electrical scaling processing as the fourth example. A document is scanned in its unmagnified size (step S3501). The scanned image data is stored in the memory module 222 through the image data control section 203 and the image-memory access control section 221 (step S3502).

At that time, the image-memory access control section 221 detects the size of the document and stores the information concerning the document size as an index in the memory module 222 together with the corresponding image data. This information for the image size is used for calculation of a scaling factor provided for scaling when paper is specified. Subsequently, the system controller 231 calculates address of a reference pixel for computation of re-sampling data from specified conditions for scaling (step S3503).

The image-memory access control section 221 reads out the image data for target address based on the address, and transfers the data to the image processor 204 via the image data control section 203 (step S3504). The image-memory access control section 221 also has a function of the reference data reading unit the same as the system controller 231.

The image processor 204 downloads a weight factor for the required pixel from the process controller 211, and its arithmetic processor performs scaling processing (step S3505). That is, the arithmetic processor extends plane scaling for the main scanning and the auxiliary scanning in the respective axial directions, and executes convolution arithmetic. The image processor 204 performs predetermined image processing on the image data on which scaling processing has been finished (step S3506) and outputs the image data to the outside thereof (step S3507).

According to the fourth example, the processor is dedicated to arithmetic based on an SIMD type or a sequential type of DSP, therefore, high-speed processing can be performed. The system controller 231 calculates the address of a reference pixel for computing re-sampling data, the image-memory access control section 221 controls memory access, and the image processor 204 performs scaling processing and image processing. Therefore, the respective processing can be shared between the perfectly optimal processing units. Thus, improving the processing speed.

Figure 36:
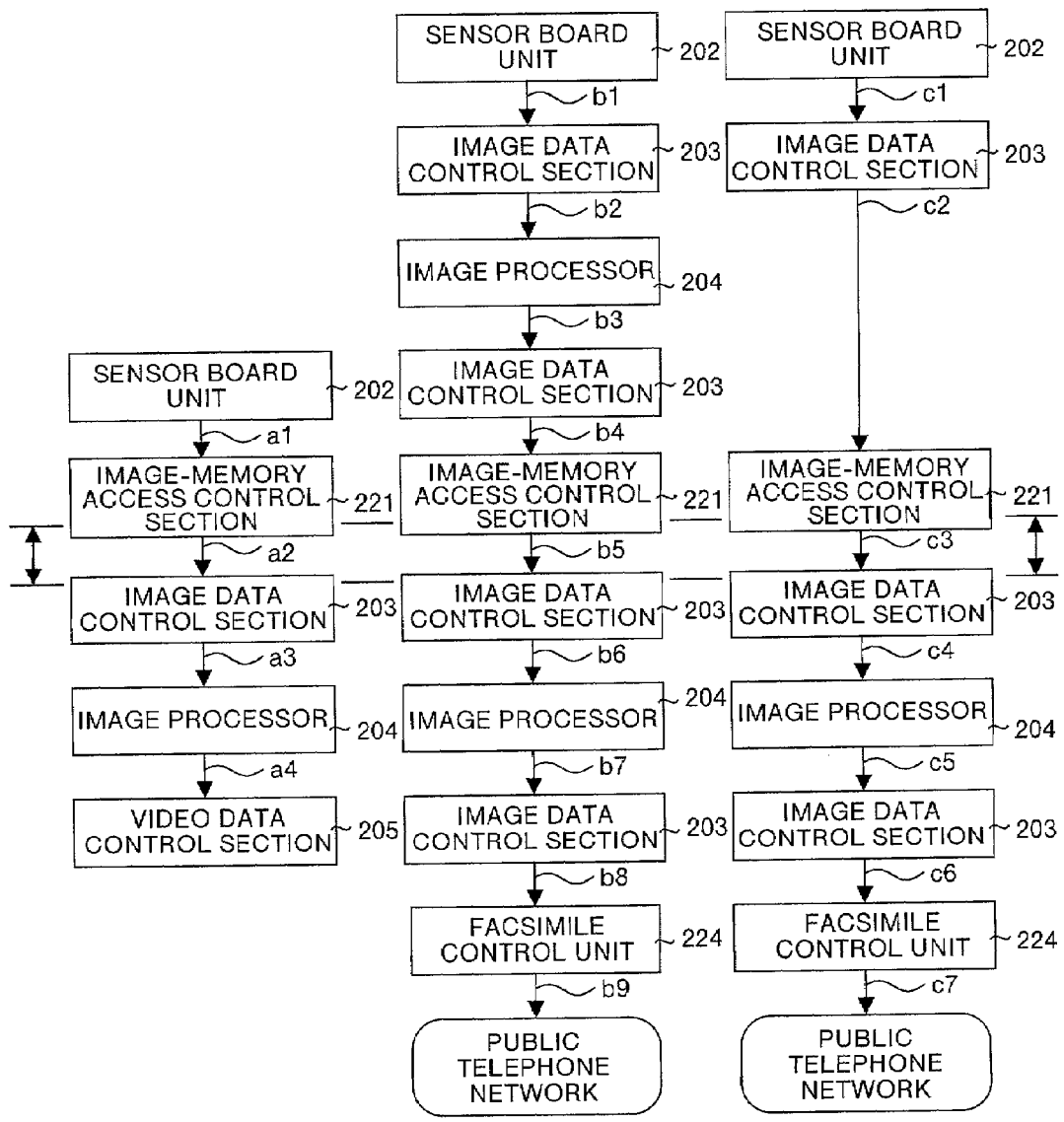
FIG. 36 shows a relation between the many image data processing performed in the image processing apparatus according to the embodiment.

The contents of concurrent operation of the processing for image data is explained below. FIGS. 36A, 36B, and 36C show flows of a plurality of image data processing in the image processing apparatus according to the embodiment. The left column in FIG. 36 shows a flow of image data when the image data stored in the memory module 222 is read out to perform a reproduction image. On the other hand, the middle and right column shows flows of image data when documents of different sizes are transmitted by facsimile.

As shown in the left column in FIG. 36, the concurrent operation of the processing for reading out image data stored in the memory module 222 and forming a reproduction image and the processing for transmitting the documents of different sizes by facsimile is represented by the flows of image data as shown in the left and middle columns or left and right columns in FIG. 36. For example, a path a2 from the image-memory access control section 221 to the image data control section 203 is always used for the operation of reading out the image data stored in the memory module 222 to form a reproduction image.

As shown in the middle column in FIG. 36, a path b5 from the image-memory access control section 221 to the image data control section 203 is used for transfer of an image which has been rotated 90 degrees to the image data control section 203. Likewise, as shown in the right column in FIG. 36, a path c3 from the image-memory access control section 221 to the image data control section 203 is used for performing scaling in the auxiliary scanning on the data.

In these cases, a plurality of image data are multiplexed under the control of the system controller 231 as a multiplexing control unit. Accordingly, the concurrent operation can be achieved without having to increase the number of ports of the parallel bus 220 between the image-memory access control section 221 and the image data control section 203.

Figure 37:
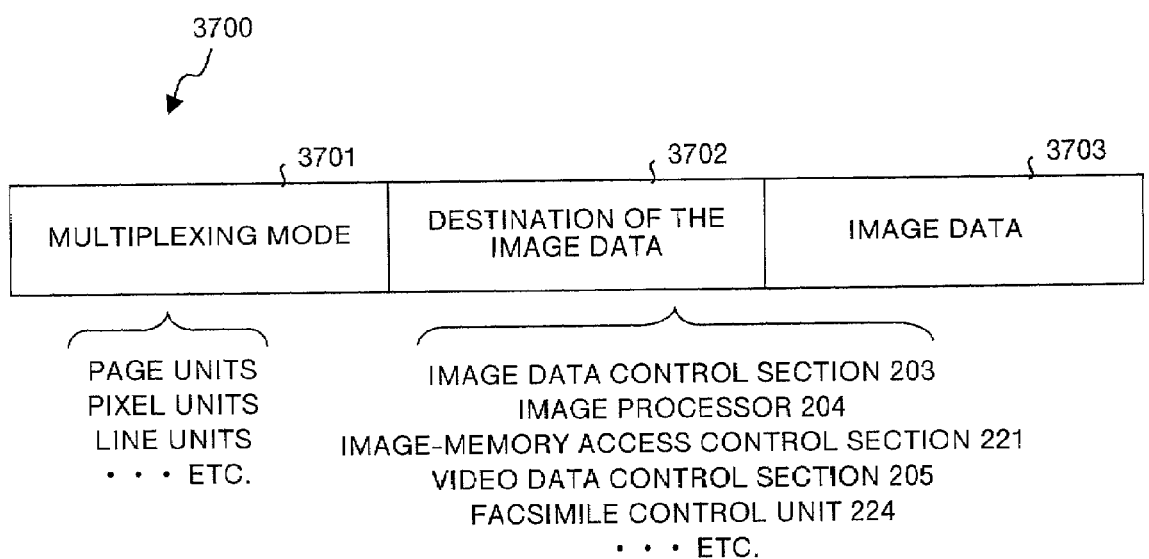
FIG. 37 shows an example of data structure of multiplexed image data and control data in the image processing apparatus according to the embodiment.

FIG. 37 shows an example of data structure for multiplexed image data and control data in the image processing apparatus according to the embodiment. In FIG. 37, information 3701 for a multiplexing mode and information 3702 for destination of image data are added to the multiplexed image data 3703.

The information 3701 for a multiplexing mode stores information for contents about how data is multiplexed such as page by page, pixel by pixel, or line by line. The multiplexing mode can be determined based on the types of image data to be multiplexed, the amount of image data, and usage patterns of the units, or the like. Alternately, an operator may determine a multiplexing mode by issuing an instruction through the operation panel 234.

The information 3702 for destination of image data stores information about which unit the image data is to be transmitted to. The destination includes the image data control section 203, the image processor 204, the image-memory access control section 221, the video data control section 205, or the facsimile control unit 224.

Figure 38:
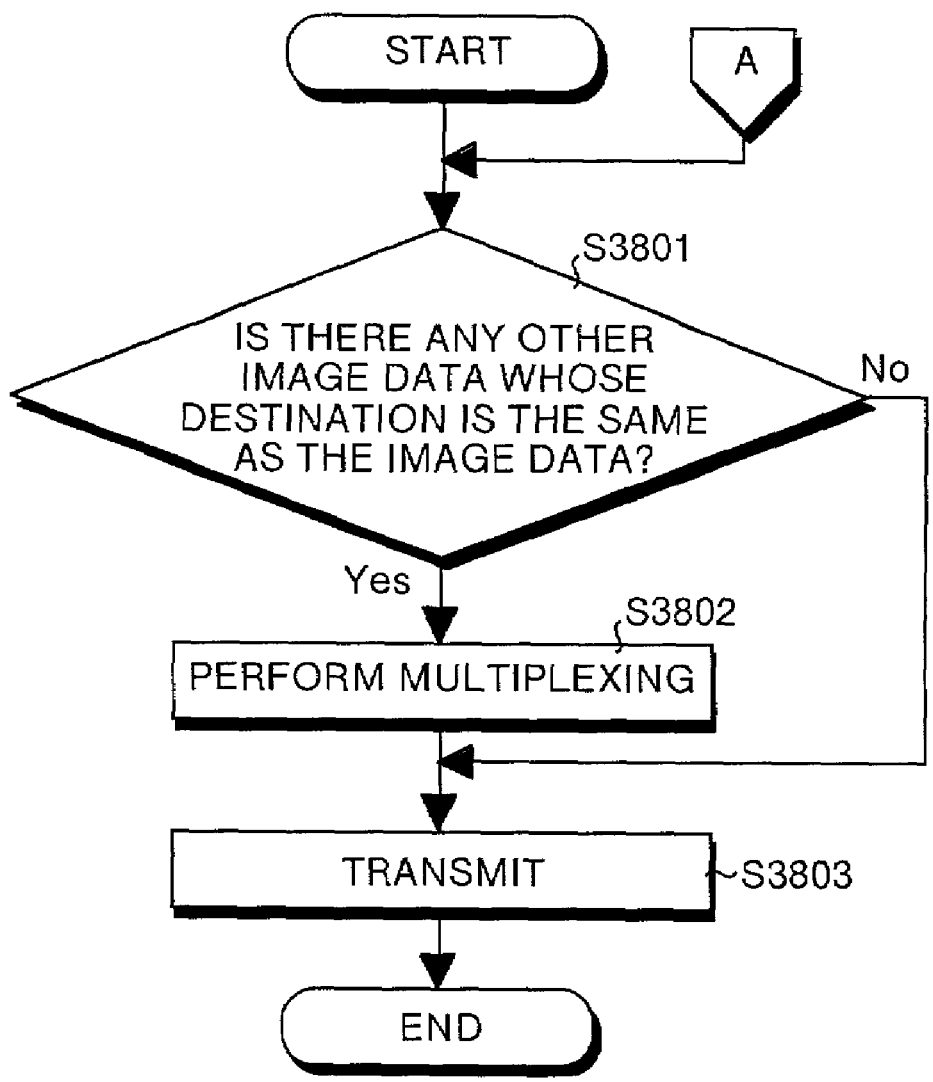
FIG. 38 is a flowchart showing contents of the processing for multiplexing image data in the image processing apparatus according to the embodiment.

The contents of the processing for multiplexing image data is explained below. FIG. 38 is a flowchart showing the contents of the processing for multiplexing image data in the image processing apparatus according to the embodiment. In the flowchart in FIG. 38, when image data is to be transmitted to another unit, it is determined whether there is any other image data whose destination is the same as that of the image data (step S3801). When there is no such image data (step S3801, No), the processing proceeds to step S3803 without execution of any other operation.

On the other hand, at step S3801, when there is any other image data whose destination is the same as the image data (step S3801, Yes), these image data are multiplexed (step S3802). At step S3803, the image data is transmitted to the specified destination (step S3803).

Figure 39:
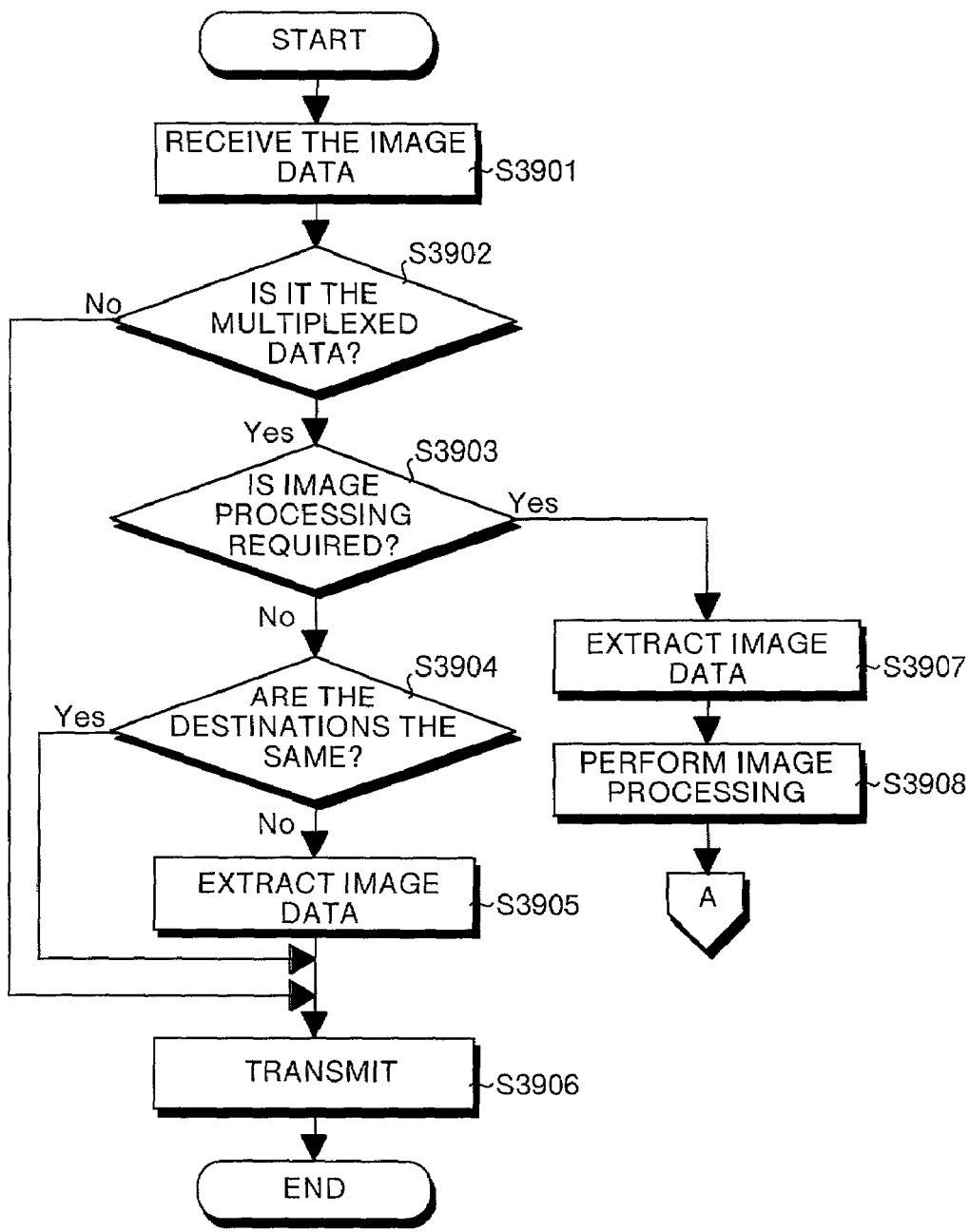
FIG. 39 is a flowchart showing a sequence of the processing for controlling transmission of the multiplexed image data in the image processing apparatus according to the embodiment.
Figure 40:
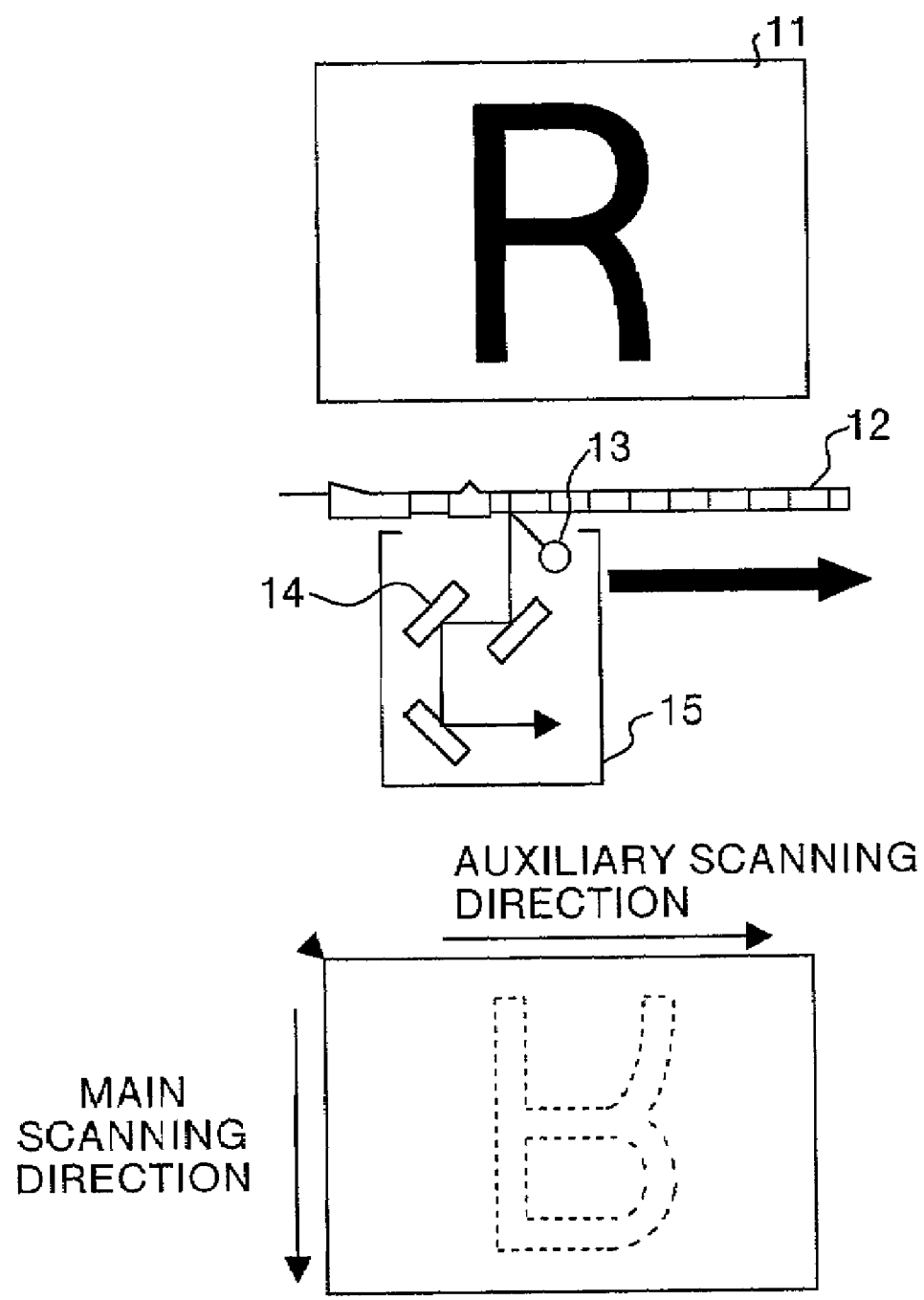
FIG. 40 schematically shows a scanning mechanism by an ordinary document scanning unit.

The contents of the processing for controlling transmission of the multiplexed image data is explained below. FIG. 39 is a flowchart showing a sequence of processing for controlling transmission of the multiplexed image data in the image processing apparatus according to the embodiment. In the flowchart in FIG. 39, image data is received from another unit (step S3901). It is determined here whether the received image data has been multiplexed (step S3902).

At step S3902, when the received image data has not been multiplexed (step S3902, No), the processing proceeds to step S3906 without execution of any other operation. On the other hand, when the received image data has been multiplexed (step S3902, Yes), it is then determined whether the image data requires any image processing in the received unit (step S3903).

At step S3903, when it is determined that no image processing is required (step S3903, No), it is then determined whether respective destinations of the multiplexed image data are the same (step S3904). When the destinations are the same (step S3904, Yes), the processing proceeds to step S3905. On the other hand, when the destinations are not the same (step S3904, No), discrete image data is extracted from the multiplexed image data (demultiplexed) (step S3905). At step S3906, each of the image data is transferred to a specified destination (step S3906).

Further, at step S3903, when it is determined that the image processing is required (step S3903, Yes), discrete image data is extracted from the multiplexed image data (demultiplexed) (step S3907), and any required image processing is performed on the extracted image data (step S3908). The processing then proceeds to step S3901 shown in FIG. 38.

As explained above, multiplexed data is used for the concurrent operation, and non-multiplexed data is used when the operation is not concurrently performed. Therefore, even during concurrent operation, the image processing (electrical scaling processing or the like) can efficiently be performed without having to increase the number of ports of the bus.

According to the embodiment, the image processing apparatus comprises the image data control section 203 and the system controller 231. More specifically, the image data control section 203 is connected to the scanning unit 201/the sensor board unit 202 for scanning image data, and/or the image-memory access control section 221 for controlling image memory so as to write or read image data in or from the image memory, and/or the image processor 204 for subjecting image data to image processing such as editing. The image data control section 203 is also connected to the video data control section 205/the image formation unit 206 for writing image data onto paper or the like, and/or the facsimile control unit 224 for transmitting and receiving image data with an external device. The image data control section 203 receives first image data scanned-in by the scanning unit 201/the sensor board unit 202, and/or second image data read-out by the image-memory access control section 221, and/or third image data subjected to image processing by the image processor 204, and/or fourth image data received by the facsimile control unit 224. The image data control section 203 transmits the first image data and/or the second image data and/or the third image data and/or the fourth image data to the image-memory access control section 221 and/or the image processor 204 and/or the video data control section 205 and/or the facsimile control unit 224. Further, the system controller 231 multiplexes, when image data to be transmitted to the image data control section 203 conflicts with one another, the image data in conflict with one another. The image data control section 203 then receives the multiplexed image data. Therefore, the image data in conflict with one another can be multiplexed at the time of its transmission between the processing units. Accordingly, the number of ports for transmitting image data can be reduced, thus efficiently transmitting the image data during concurrent operation.

According to the embodiment, control data for controlling multiplexed image data is added to the multiplexed image data, thus accurately transmitting the multiplexed image data.

According to the embodiment, the control data includes information for the multiplexing mode for the multiplexed image data and/or information for respective destinations of the multiplexed image data. Therefore, the multiplexed image data can accurately be transmitted, and discrete image data can easily be extracted from the multiplexed image data.

According to the embodiment, the image processing method comprises the step of receiving multiplexed image data from any of a plurality types of processing unit to perform different processing on image data such as reading, storage, image processing (processing or editing) writing, or transmission/reception of the image data. This method also comprises the steps of acquiring image data control information including information concerning contents of the processing on the received multiplexed image data, determining a target processing unit to which the received image data is to be transmitted based on the acquired image data control information, and transmitting the multiplexed image data to the determined target processing unit. Therefore, the image data in conflict with one another can be multiplexed at the time of their transmission between units. Accordingly, the number of ports for transmitting the image data can be reduced, thus efficiently transmitting the image data during concurrent operation.

According to the embodiment, the image processing method comprises the step of receiving multiplexed image data from any of a plurality types of processing unit to perform different processing on image data such as reading, storage, image processing (processing or editing), writing, or transmission/reception of the image data. This method also comprises the steps of acquiring image data control information including information concerning contents of the processing on the received multiplexed image data, determining a target processing unit to which the received image data is to be transmitted based on the acquired image data control information, extracting discrete image data from the multiplexed image data, and transmitting the extracted image data to the determined target processing unit. Therefore, the image data in conflict with one another can be multiplexed at the time of their transmission between units and discrete image data can be extracted from the multiplexed image data.

According to the embodiment, the image processing method comprises the step of receiving image data from any of a plurality types of processing unit to perform different processing on image data such as reading, storage, image processing (processing or editing), writing, or transmission/reception of the image data. This method also comprises the steps of acquiring image data control information including information concerning contents of the processing on the received multiplexed image data, determining a target processing unit to which the received image data is to be transmitted based on the acquired image data control information, multiplexing the image data, and transmitting the multiplexed image data to the determined target processing unit. Therefore, the image data in conflict with one another can be multiplexed at the time of its transmission to another unit.

The image processing method explained in the embodiment can be realized by making a computer such as a personal computer or a work station execute a previously prepared program. This program is recorded in a computer-readable recording medium such as a hard disk, a floppy disk, a CD-ROM, an MO, or a DVD, and the program is read out from the recording medium by the computer to be executed. Further, this program can be distributed over a network such as the Internet via the recording medium or as a transmission medium.

As explained above, according to one aspect of this invention, when image data to be processed by different operation is transmitted or received, the image data can effectively be transmitted or received by avoiding corrosion of these image data, so that the time for its transmission or reception can be reduced. Accordingly, it is possible to obtain the image processing apparatus which can effectively perform processing on image data at the time of performing concurrent operation.

Further, pre-processing for image processing can be performed on image data to be stored, or image data stored in the memory before it is transmitted to another unit. Accordingly, it is possible to obtain the image processing apparatus which can effectively perform processing on image data at the time of performing concurrent operation.

Further, one of the units shares a part of the image processing that another unit (e.g., image processing unit) should perform, so that the load on the unit can be reduced by the shared amount and the time for processing as overall processing can be reduced. Accordingly, it is possible to obtain the image processing apparatus which can effectively perform processing on image data at the time of performing concurrent operation.

Further, one of the units shares a part of the image processing that another unit (e.g., image processing unit) should perform, so that the load on the unit can be reduced by the shared amount and the time for processing as overall processing can be reduced. Accordingly, it is possible to obtain the image processing apparatus which can effectively perform processing on image data at the time of performing concurrent operation.

Further, image data in conflict with one another can effectively be transmitted, so that the time for its transmission or reception can be reduced. Accordingly, it is possible to obtain the image processing apparatus which can effectively perform processing on image data at the time of performing concurrent operation.

Further, the image processing can effectively be performed on image data in conflict with one another, so that the time for processing can be reduced. Accordingly, it is possible to obtain the image processing apparatus which can effectively perform processing on image data at the time of performing concurrent operation.

Further, discrete units can share controls for the switching unit and controls for the image processing unit. Accordingly, it is possible to obtain the image processing apparatus which can effectively perform processing on image data at the time of performing concurrent operation.

According to another aspect of this invention, image data in conflict with one another can be multiplexed for its transmission between units. Accordingly, the number of ports for transmitting image data can be reduced, thus, it is possible to obtain the image processing apparatus which can effectively transmit image data during concurrent operation.

According to still another aspect of this invention, image data in conflict with one another can be multiplexed for its transmission between units including the image data transmission/reception unit. Accordingly, the number of ports for transmitting image data can be reduced, thus, it is possible to obtain the image processing apparatus which can effectively transmit image data during concurrent operation.

Further, multiplexed image data can surely be transmitted. Accordingly, the number of ports for transmitting image data can be reduced, thus, it is possible to obtain the image processing apparatus which can effectively transmit image data during concurrent operation.

Further, multiplexed image data can surely be transmitted and discrete image data can easily be extracted from the multiplexed image data. Accordingly, the number of ports for transmitting image data can be reduced, thus, it is possible to obtain the image processing apparatus which can effectively transmit image data during concurrent operation.

According to still another aspect of this invention, image data in conflict with one another can be multiplexed for its transmission between units. Accordingly, the number of ports for transmitting image data can be reduced, thus, it is possible to obtain the image processing method in which image data can effectively be transmitted during concurrent operation.

According to still another aspect of this invention, image data in conflict with one another can be multiplexed for its transmission between units, and discrete image data can be extracted from the multiplexed image data. Accordingly, the number of ports for transmitting image data can be reduced, thus, it is possible to obtain the image processing method in which image data can effectively be transmitted during concurrent operation.

According to still another aspect of this invention, image data in conflict with one another can be multiplexed for its transmission to another unit. Accordingly, the number of ports for transmitting image data can be reduced, thus, it is possible to obtain the image processing method in which image data can effectively be transmitted during concurrent operation.

According to still another aspect of this invention, by recording the program for making a computer execute the method according to the invention in a recording medium, the program becomes machine-readable. Accordingly, it is possible to obtain a recording medium through which the operation according to the invention is computer performable.

The present document incorporates by reference the entire contents of Japanese priority documents, 11-371897 filed in Japan on Dec. 27, 1999 and 2000-008375 filed in Japan on Jan. 17, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a process controller connected to a first bus and connected to at least one of a) an image reading unit for reading image data, b) an image processing unit for subjecting image data to image processing, and c) an image writing unit for writing image data onto a recording medium,
a system controller connected to a second bus and connected to at least one of d) an image memory control unit for controlling image memory so as to write or send image data in or from an image memory, and e) an image data transmission/reception unit for transmitting and receiving image data with an external device,
said process controller receiving first image data read-in by said image reading unit, and/or second image data subjected to image processing by said image processing unit, said system controller receiving third image data read-out by said image memory control unit, and/or fourth image data received by said image data transmission/reception unit, and said process controller and said system controller transmitting the first image data and/or the second image data and/or the third image data and/or the fourth image data to said image memory control unit and/or said image processing unit and/or said image writing unit and/or said image data transmission/reception unit; and
a switching unit which provides controls for switching an access right to a path to be used when image data is transmitted or received between said image data control unit, said image reading unit, said image memory control unit, said image processing unit, said image writing unit, or said image data transmission/reception unit,
wherein both the system controller and the process controller provide controls for allocation of jobs.

2. The image processing apparatus according to claim 1, wherein said image memory control unit subjects the image data to be written in or the read-out image data to image processing of editing.

3. The image processing apparatus according to claim 2, wherein said image memory control unit subjects the image data to be written in or the read-out image data to the processing for rotation of the image.

4. The image processing apparatus according to claim 2, wherein said image memory control unit subjects the image data to be written in or the read-out image data to the processing for scaling the image.

5. The image processing apparatus according to claim 1, wherein said switching unit switches a path based on time division when accesses to said path conflict with one another by different image data.

6. The image processing apparatus according to claim 1, wherein said image processing unit controls image processing based on time division when the image processing conflicts with one another by different image data.

7. The image processing apparatus according to claim 1, wherein said switching unit and said image processing unit are controlled by different control units.

8. An image processing apparatus comprising;
an image data control unit which is connected to at least one of a) an image reading unit for reading image data, b) an image memory control unit for controlling image memory so as to write or read image data in or from the image memory, c) an image processing unit for subjecting image data to image processing, and d) an image writing unit for writing image data onto a recording medium, said image data control unit receiving first image data read-in by said image reading unit, and/or second image data read-out by said image memory control unit, and/or third image data subjected to image processing by said image processing unit, and said image data control unit transmitting the first image data and/or the second image data and/or the third image data to said image memory control unit and/or said image processing unit and/or said image writing unit; and
a multiplexing control unit which, when image data to be transmitted to said image data control unit conflicts with one another, multiplexes the image data in conflict with one another,
wherein said image data control unit receives the image data multiplexed by said multiplexing control unit.

9. The image processing apparatus according to claim 8, wherein said multiplexing control unit adds control data for controlling the multiplexed image data to the multiplexed image data.

10. The image processing apparatus according to claim 9, wherein the control data includes information concerning a multiplexing mode applied to the multiplexed image data, and/or information concerning respective destinations of the multiplexed image data.

11. An image processing apparatus comprising:
an image data control unit which is connected to at least one of a) an image reading unit for reading image data, b) an image memory control unit for controlling image memory so as to write or read image data in or from the image memory, c) an image processing unit for subjecting image data to image processing, d) an image writing unit for writing image data to a recording medium, and e) an image data transmission/reception unit for transmitting and receiving image data with an external device, said image data control unit receiving first image data read-in by said image reading unit, and/or second image data read-out by said image memory control unit, and/or third image data subjected to image processing by said image processing unit, and/or fourth image data received by said image data transmission/reception unit, and image control unit transmitting the first image data and/or the second image data and/or the third image data and/or the fourth image data to said image memory control unit and/or said image processing unit and/or said image writing unit and/or said image data transmission/reception unit; and a multiplexing control unit which, when image data to be transmitted to said image data control unit conflicts with one another, multiplexes the image data in conflict with one another, wherein said image data control unit receives the image data multiplexed by said multiplexing control unit.

12. The image processing apparatus according to claim 11, wherein said multiplexing control unit adds control data for controlling the multiplexed image data to the multiplexed image data.

13. The image processing apparatus according to claim 12, wherein the control data includes information concerning a multiplexing mode applied to the multiplexed image data, and/or information concerning respective destinations of the multiplexed image data.

14. An image processing apparatus comprising:

process control means connected a first bus and connected to at least one of a) reading means for reading image data, b) processing means for subjecting image data to image processing, and (c) writing means for writing image data onto a recording medium, system control means connected to a second bus and connected to at least one of d) an image memory control means for controlling image memory so as to write or send image data in or from an image memory, and e) transmission/reception means for transmitting and receiving image data with an external device, said process control means receiving first image data read-in by said reading means, and/or second image data subjected to image processing by said processing means, said system control means receiving third image data read-out by said image memory control unit, and/or fourth image data received by said transmission/reception means, and said process control means and system control means transmitting the first image data and/or the second image data and/or the third image data and/or the fourth image data to said memory control means and/or said processing means and/or said writing means and/or said transmission/reception means; and means for providing controls for switching an access right to a path to be used when image data is transmitted or received between said control means, said reading means, said memory control means, said processing means, said writing means, or said transmission/reception means, wherein both the system control means and the process control means provide controls for allocation of jobs.

15. The image processing apparatus according to claim 14, wherein said memory control means subjects the image data to be written in or the read-out image data to image processing of editing.

16. The image processing apparatus according to claim 15, wherein said memory control means subjects the image data to be written in or the read-out image data to the processing for rotation of the image.

17. The image processing apparatus according to claim 15, wherein said memory control means subjects the image data to be written in or the read-out image data to the processing for scaling the image.

18. The image processing apparatus according to claim 14, wherein said switching means switches a path based on time division when accesses to said path conflict with one another by different image data.

19. The image processing apparatus according to claim 14, wherein said processing means controls image processing based on time division when the image processing conflicts with one another by different image data.

20. The image processing apparatus according to claim 14, wherein said means for providing controls for switching and said processing means are controlled by different control means.

21. An image processing apparatus comprising:

control means which is connected to at least one of a) reading means for reading image data, b) memory control means for controlling image memory so as to write or read image data in or from the image memory, c) processing means for subjecting image data to image processing, and d) writing means for writing image data onto a recording medium, said control means receiving first image data read-in by said reading means, and/or second image data read-out by said memory control means, and/or third image data subjected to image processing by said processing means, and said control means transmitting the first image data and/or the second image data and/or the third image data to said memory control means and/or said processing means and/or said writing means; and means for, when image data to be transmitted to said control means conflicts with one another, multiplexing the image data in conflict with one another, wherein said control means receives the image data multiplexed by said means for multiplexing.

22. The image processing apparatus according to claim 21, wherein said means for multiplexing adds control data for controlling the multiplexed image data to the multiplexed image data.

23. The image processing apparatus according to claim 22, wherein the control data includes information concerning a multiplexing mode applied to the multiplexed image data, and/or information concerning respective destinations of the multiplexed image data.

24. An image processing apparatus comprising:

control means which is connected to at least one of a) reading means for reading image data, b) memory control means for controlling image memory so as to write or read image data in or from the image memory, c) processing means for subjecting image data to image processing, d) writing means for writing image data to a recording medium, and e) transmission/reception means for transmitting and receiving image data with an external device, said control means receiving first image data read-in by said reading means, and/or second image data read-out by said memory control means, and/or third image data subjected to processing by said processing means, and/or fourth image data received by said transmission/reception means, and said control means transmitting the first image data and/or the second image data and/or the third image data and/or the fourth image data to said memory control means and/or said processing means and/or said writing means and/or said transmission/reception means; and means for, when image data to be transmitted to said image data control means conflicts with one another, multiplexing the image data in conflict with one another, wherein said image data control means receives the image data multiplexed by said means for multiplexing.

25. The image processing apparatus according to claim 24, wherein said means for multiplexing adds control data for controlling the multiplexed image data to the multiplexed image data.

26. The image processing apparatus according to claim 25, wherein the control data includes information concerning a multiplexing mode applied to the multiplexed image data, and/or information concerning respective destinations of the multiplexed image data.

27. An image processing method comprising:

an image data receiving of receiving multiplexed image data at a same image data control unit from any one or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring; and a transmitting of transmitting the multiplexed image data to the target processing unit determined in the target processing unit determining.

28. An image processing method comprising:

an image data receiving of receiving multiplexed image data at a same image data control unit from any one or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring;

an extracting of extracting discrete image data from the multiplexed image data; and a transmitting of transmitting the image data extracted in the extracting to the target processing unit determined in the target processing unit determining.

29. An image processing method comprising:

an image data receiving of receiving multiplexed image data at a same image data control unit from any or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring;

a multiplexing of multiplexing the image data; and a transmitting of transmitting the image data multiplexed in the multiplexing to the target processing unit determined in the target processing unit determining.

30. A computer readable medium for storing instructions, which when executed by a computer, causes the computer to perform:

an image data receiving of receiving multiplexed image data at a same image data control unit from any one or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring; and a transmitting of transmitting the multiplexed image data to the target processing unit determined in the target processing unit determining.

31. A computer readable medium for storing instructions, which when executed by a computer, causes the computer to perform:

an image data receiving of receiving multiplexed image data at a same image data control unit from any one or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring;

an extracting of extracting discrete image data from the multiplexed image data; and a transmitting of transmitting the image data extracted in the extracting to the target processing unit determined in the target processing unit determining.

32. A computer readable medium for storing instructions, which when executed by a computer, causes the computer to perform:

an image data receiving of receiving multiplexed image data at a same image data control unit from any or plural processing units to perform different processing on image data including at least one of reading, storage, image processing, writing, or transmission/reception of the image data;

an image data control information acquiring of acquiring image data control information including information concerning contents of the processing on the multiplexed image data received in the image data receiving;

a target processing unit determining of determining a target processing unit, to which the image data received in the image data receiving is to be transmitted, based on the image data control information acquired in the image data control information acquiring;
a multiplexing of multiplexing the image data; and
a transmitting of transmitting the image data multiplexed in the multiplexing to the target processing unit determined in the target processing unit determining.

33. An image processing apparatus comprising:
an image data control unit connected to at least one of a) an image reading unit for reading image data, b) an image memory control unit for controlling image memory so as to write or read image data in or from the image memory, c) an image processing unit for subjecting image data to image processing, d) an image writing unit for writing image data onto a recording medium, and e) an image data transmission/reception unit for transmitting and receiving image data with an external device, said image data control unit receiving first image data read-in by said image reading unit, and/or second image data read-out by said image memory control unit, and/or third image data subjected to image processing by said image processing unit, and/or fourth image data received by said image data transmission/reception unit, and said image data control unit transmitting the first image data and/or the second image data and/or the third image data and/or the fourth image data to said image memory control unit and/or said image processing unit and/or said image writing unit and/or said image data transmission/reception unit; and
a switching unit which provides controls for switching an access right to a path to be used when image data is transmitted or received between said image data control unit, said image reading unit, said image memory control unit, said image processing unit, said image writing unit, or said image data transmission/reception unit,
wherein said image processing unit controls image processing based on time division when the image processing conflicts with one another by different image data.

34. The image processing apparatus according to claim 33, wherein said image memory control unit subjects the image data to be written in or the read-out image data to image processing of editing.

35. The image processing apparatus according to claim 34, wherein said image memory control unit subjects the image data to be written in or the read-out image data to the processing for rotation of the image.

36. The image processing apparatus according to claim 34, wherein said image memory control unit subjects the image data to be written in or the read-out image data to the processing for scaling the image.

37. The image processing apparatus according to claim 34, wherein said switching unit and said image processing unit are controlled by different control units.

38. An image processing apparatus comprising:
control means connected to at least one of a) reading means for reading image data, b) memory control means for controlling image memory so as to write or read image data in or from the image memory, c) processing means for subjecting image data to image processing, d) writing means for writing image data onto a recording medium, and e) an transmission/reception means for transmitting and receiving image data with an external device, said control means receiving first image data read-in by said reading means, and/or second image data read-out by said memory control means, and/or third image data subjected to processing by said processing means, and/or fourth image data received by said transmission/reception means, and said control means transmitting the first image data and/or the second image data and/or the third image data and/or the fourth image data to said memory control means and/or said processing means and/or said writing means and/or said transmission/reception means; and
means for providing controls for switching an access right to a path to be used when image data is transmitted or received between said control means, said reading means, said memory control means, said processing means, said writing means, or said transmission/reception means,
wherein said image processing means controls image processing based on time division when the image processing conflicts with one another by different image data.

39. The image processing apparatus according to claim 38, wherein said memory control means subjects the image data to be written in or the read-out image data to image processing of editing.

40. The image processing apparatus according to claim 39, wherein said memory control means subjects the image data to be written in or the read-out image data to the processing for rotation of the image.

41. The image processing apparatus according to claim 39, wherein said memory control means subjects the image data to be written in or the read-out image data to the processing for scaling the image.

42. The image processing apparatus according to claim 39, wherein said means for providing controls for switching and said processing means are controlled by different control means.

* * * * *